(12) United States Patent
Nomura

(10) Patent No.: US 11,301,958 B2
(45) Date of Patent: Apr. 12, 2022

(54) IMAGE PROCESSING APPARATUS, IMAGE PROCESSING METHOD, AND IMAGING APPARATUS

(71) Applicant: SONY SEMICONDUCTOR SOLUTIONS CORPORATION, Kanagawa (JP)

(72) Inventor: Yoshikuni Nomura, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 4 days.

(21) Appl. No.: 16/757,229

(22) PCT Filed: Jul. 26, 2018

(86) PCT No.: PCT/JP2018/028102
§ 371 (c)(1),
(2) Date: Apr. 17, 2020

(87) PCT Pub. No.: WO2019/082462
PCT Pub. Date: May 2, 2019

(65) Prior Publication Data
US 2021/0192685 A1   Jun. 24, 2021

(30) Foreign Application Priority Data
Oct. 26, 2017   (JP) .............................. JP2017-207369

(51) Int. Cl.
*G06T 3/40* (2006.01)
*G06T 7/13* (2017.01)
*G06T 5/50* (2006.01)

(52) U.S. Cl.
CPC .......... *G06T 3/4038* (2013.01); *G06T 3/4007* (2013.01); *G06T 3/4015* (2013.01);
(Continued)

(58) Field of Classification Search
CPC combination set(s) only.
See application file for complete search history.

(56) References Cited

U.S. PATENT DOCUMENTS 8,467,088 B2 *   6/2013   Hosaka .................. H04N 5/367
                                                        358/1.9
9,832,388 B2 *   11/2017  Motta .................... G06T 3/4069
(Continued)

FOREIGN PATENT DOCUMENTS

| CN | 104170376 A | 11/2014 |
| EP | 2833635 A1 | 2/2015 |

(Continued)

OTHER PUBLICATIONS

Extended European Search Report of EP Application No. 18870571.9, dated Oct. 2, 2020, 08 pages.
(Continued)

*Primary Examiner* — Zhiyu Lu
(74) *Attorney, Agent, or Firm* — Chip Law Group

(57) ABSTRACT

Provided are an image processing apparatus, an image processing method, and an imaging apparatus. An image processing apparatus includes a demosaic processing unit configured to apply demosaic processing to a mosaic image having a first number of colors to generate a multispectral image having a second number of colors equal to or more than three but less than the first number of colors.

13 Claims, 37 Drawing Sheets

(52) U.S. Cl.
CPC .............. _G06T 5/50_ (2013.01); _G06T 7/13_ (2017.01); _G06T 2207/10036_ (2013.01); _G06T 2207/20024_ (2013.01); _G06T 2207/20216_ (2013.01)

(56) References Cited

U.S. PATENT DOCUMENTS

| | | | |
|---|---|---|---|
| 10,165,242 B2 * | 12/2018 | Nonaka | H04N 5/2351 |
| 10,812,765 B2 * | 10/2020 | Taoka | H04N 5/2355 |
| 2007/0153335 A1 * | 7/2007 | Hosaka | H04N 5/367 |
| | | | 358/463 |
| 2010/0321522 A1 | 12/2010 | Seto | |
| 2013/0051700 A1 * | 2/2013 | Jo | G06T 5/003 |
| | | | 382/284 |
| 2015/0029358 A1 | 1/2015 | Kaizu | |
| 2016/0037044 A1 * | 2/2016 | Motta | G06T 5/007 |
| | | | 348/221.1 |
| 2016/0065926 A1 * | 3/2016 | Nonaka | H04N 9/735 |
| | | | 348/164 |
| 2017/0251188 A1 | 8/2017 | Kaizu | |
| 2020/0137368 A1 * | 4/2020 | Taoka | H04N 9/646 |

FOREIGN PATENT DOCUMENTS

| | | |
|---|---|---|
| JP | 11-234690 A | 8/1999 |
| JP | 2007-251393 A | 9/2007 |
| JP | 5546166 B2 | 7/2014 |
| JP | 2014-158267 A | 8/2014 |
| JP | 5935876 B2 | 6/2016 |
| RU | 2014138087 A | 4/2016 |
| WO | 2013/145487 A1 | 10/2013 |

OTHER PUBLICATIONS

International Search Report and Written Opinion of PCT Application No. PCT/JP2018/028102, dated Oct. 16, 2018, 09 pages of ISRWO.

* cited by examiner

FIG. 1

|   |   |   |   |
|---|---|---|---|
| R | G | R | G |
| G | B | G | B |
| R | G | R | G |
| G | B | G | B |

CFA31

|   |   |   |   |
|---|---|---|---|
| C1 | C3 | C2 | C4 |
| C5 | C7 | C6 | C8 |
| C2 | C4 | C1 | C3 |
| C6 | C8 | C5 | C7 |

CFA81

FIG. 8
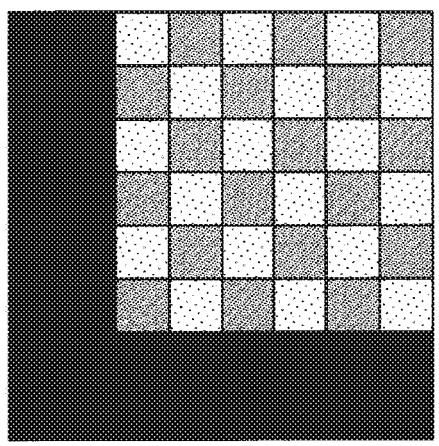
<BEFORE NOISE REDUCTION>
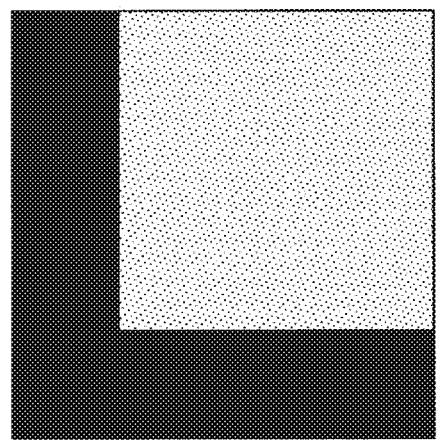
<AFTER NOISE REDUCTION>

FIG. 23

| CFA43 | | | | | CFA53 | | | | |
|---|---|---|---|---|---|---|---|---|---|
| | C2 | C4 | C2 | C4 | | C3 | C5 | C3 | C5 |
| | C1 | C3 | C1 | C3 | | C2 | C4 | C1 | C4 |
| | C2 | C4 | C2 | C4 | | C3 | C5 | C3 | C5 |
| | C1 | C3 | C1 | C3 | | C1 | C4 | C2 | C4 |

| CFA42 | | | | | CFA52 | | | | |
|---|---|---|---|---|---|---|---|---|---|
| | C3 | C4 | C3 | C4 | | C2 | C5 | C2 | C4 |
| | C2 | C3 | C1 | C3 | | C1 | C3 | C1 | C3 |
| | C3 | C4 | C3 | C4 | | C2 | C4 | C2 | C5 |
| | C1 | C3 | C2 | C3 | | C1 | C3 | C1 | C3 |

| CFA41 | | | | | CFA51 | | | | |
|---|---|---|---|---|---|---|---|---|---|
| | C2 | C4 | C2 | C3 | | C3 | C5 | C3 | C4 |
| | C1 | C2 | C1 | C2 | | C2 | C3 | C1 | C3 |
| | C2 | C3 | C2 | C4 | | C3 | C4 | C3 | C5 |
| | C1 | C2 | C1 | C2 | | C1 | C3 | C2 | C3 |

FIG. 24

CFA61

| C3 | C6 | C3 | C5 |
|---|---|---|---|
| C2 | C4 | C1 | C4 |
| C3 | C5 | C3 | C6 |
| C1 | C4 | C2 | C4 |

CFA101

| C6 | C10 | C5 | C9 |
|---|---|---|---|
| C2 | C8 | C4 | C7 |
| C5 | C9 | C6 | C10 |
| C1 | C7 | C3 | C8 |

CFA102

| C4 | C9 | C3 | C8 |
|---|---|---|---|
| C2 | C6 | C1 | C5 |
| C3 | C7 | C4 | C10 |
| C1 | C5 | C2 | C6 |

CFA121

| C6 | C11 | C5 | C10 |
|---|---|---|---|
| C3 | C8 | C2 | C7 |
| C5 | C9 | C6 | C12 |
| C1 | C7 | C4 | C8 |

CFA122

| C5 | C12 | C4 | C11 |
|---|---|---|---|
| C2 | C9 | C1 | C8 |
| C3 | C11 | C6 | C12 |
| C1 | C7 | C2 | C10 |

CFA161

| C7 | C15 | C6 | C14 |
|---|---|---|---|
| C3 | C11 | C2 | C10 |
| C5 | C13 | C8 | C16 |
| C1 | C9 | C4 | C12 |

IMAGE PROCESSING APPARATUS, IMAGE PROCESSING METHOD, AND IMAGING APPARATUS

CROSS REFERENCE TO RELATED APPLICATIONS

This application is a U.S. National Phase of International Patent Application No. PCT/JP2018/028102 filed on Jul. 26, 2018, which claims priority benefit of Japanese Patent Application No. JP 2017-207369 filed in the Japan Patent Office on Oct. 26, 2017. Each of the above-referenced applications is hereby incorporated herein by reference in its entirety.

TECHNICAL FIELD

The present disclosure relates to an image processing apparatus, an image processing method, and an imaging apparatus.

BACKGROUND ART

In a case where a color filter in which one of a plurality of kinds of filters having different spectral characteristics is arranged to correspond to each pixel of a single-plate imaging element is used, the imaging element can obtain only one color per pixel. Therefore, an image acquired by the imaging element is a mosaic image having a mosaic shape regarding color. In view of this, a single-plate color imaging apparatus including such an imaging element generates an image having all colors in all pixels from such a mosaic image by performing interpolation processing, called demosaic processing, using color information obtained from surrounding pixels.

Such a single-plate color imaging apparatus generally uses a color filter having three colors of red (R), green (G), and blue (B). Meanwhile, some color filters have more than three colors as described in, for example, Patent Document 1 cited below. Further, in some cases, such a color filter having a predetermined number of colors more than three is used to acquire a mosaic image having the predetermined number of colors, and the demosaic processing is applied to the mosaic image to generate an image having all the predetermined number of colors in all pixels. Such an image having all of a plurality of colors in all the pixels is called a multispectral image. Further, linear matrix processing is applied to the multispectral image to generate an RGB image of three colors.

CITATION LIST

Patent Document

Patent Document 1: Japanese Patent Application Laid-Open No. 2007-251393

SUMMARY OF THE INVENTION

Problems to be Solved by the Invention

However, the number of pixels per color is decreased as the number of colors of a color filter included in an imaging element is increased. Thus, aliasing (turning back of high-frequency components to a low-frequency region) tends to occur in each color of a multispectral image obtained by demosaic processing. Aliasing in an image leads to generation of a color that does not originally exist, and such a color that does not originally exist, which is generated due to aliasing, is called a false color. Further, as a result, a false color may also be generated in an RGB image generated from the multispectral image.

In view of this, the present disclosure proposes an image processing apparatus, an image processing method, and an imaging apparatus capable of suppressing generation of a false color.

Solutions to Problems

The present disclosure provides an image processing apparatus including a demosaic processing unit configured to apply demosaic processing to a mosaic image having a first number of colors to generate a multispectral image having a second number of colors equal to or more than three but less than the first number of colors.

Further, the present disclosure provides an image processing method including, by a processor, applying demosaic processing to a mosaic image having a first number of colors to generate a multispectral image having a second number of colors equal to or more than three but less than the first number of colors.

Further, the present disclosure provides an imaging apparatus including: an imaging unit including a color filter in which one of a plurality of kinds of filters having different spectral characteristics is allocated to each pixel position and configured to acquire a mosaic image having a first number of colors that is the same as the number of kinds of the filters; and a demosaic processing unit configured to apply demosaic processing to the mosaic image to generate a multispectral image having a second number of colors equal to or more than three but less than the first number of colors.

Effects of the Invention

As described above, the present disclosure can suppress generation of a false color.

Note that the above effects are not necessarily limited, and any of the effects described in this specification or other effects that can be grasped from this specification may be exerted in addition to or in place of the above effects.

BRIEF DESCRIPTION OF DRAWINGS

FIG. 1 is an explanatory diagram showing an example of a color filter array.

FIG. 8 schematically shows an example of luminance signals before and after noise reduction.

FIG. 23 is an explanatory diagram showing examples of a color filter array of an imaging element 12.

FIG. 24 is an explanatory diagram showing examples of a color filter array of the imaging element 12.

MODE FOR CARRYING OUT THE INVENTION

Hereinafter, a preferred embodiment of the present disclosure will be described in detail with reference to the accompanying drawings. Note that, in this specification and the drawings, components having substantially the same functional configurations will be denoted by the same reference signs, and repeated description thereof will be omitted.

Note that description will be provided in the following order.

<<1. Background>>
<<2. Configuration example of imaging apparatus>>
<<3. Signal processing unit>>
<3-1. First example of signal processing unit>
<3-2. Second example of signal processing unit>
<3-3. Modification examples>
<<4. Imaging element>>
<4-1. Example of color filter array of imaging element>
<4-2. Configuration example of circuit of imaging element>
<4-3. First configuration example of imaging element>
<4-4. Second configuration example of imaging element>
<4-5. Third configuration example of imaging element>
<<5. Application examples>>
<5-1. Example of application to endoscopic surgery system>
<5-2. Example of application to moving object>
<5-3. Other application examples>
<<6. Hardware configuration example>>
<<7. Conclusion>>

1. BACKGROUND

First, a background of the embodiment of the present disclosure will be described before detailed description of the embodiment of the present disclosure. First, an array of a color filter used in a single-plate color imaging apparatus will be described with reference to FIG. 1. FIG. 1 is an explanatory diagram showing an example of a color filter array.

A color filter array CFA31 shown in FIG. 1 is a so-called Bayer array, which is widely used in single-plate color imaging apparatuses and in which green (G) filters are arranged in a checkered pattern and exist with a density twice as high as those of red (R) and blue (B) filters. It is known that horizontal and vertical resolutions can be increased by performing demosaic processing with the use of the fact that the green (G) filters are arranged in a checkered pattern.

Meanwhile, it is known that color reproduction and wavelength resolution can be improved by using a color filter having more than three colors. An imaging apparatus according to an embodiment of the present disclosure described below includes a color filter having more than three colors. A color filter array CFA81 shown in FIG. 1 is an example of the color filter array according to the embodiment of the present disclosure. As shown in FIG. 1, a filter having one of colors C1 to C8 is allocated to each pixel position in the color filter array CFA81. An imaging element having a color filter array of more than three colors, such as the color filter array CFA81, is called multispectral image sensor.

Figure 2:
FIG. 2 is an explanatory diagram showing an example of a series of processing for generating an RGB image from a mosaic image having the number of colors M more than three.

Further, it is also possible to generate an RGB image having three colors from a mosaic image having more than three colors acquired by the multispectral image sensor. FIG. 2 is an explanatory diagram showing an example of a series of processing for generating an RGB image from a mosaic image having the number of colors M (where M is an integer) more than three.

Referring to FIG. 2, first, demosaic processing is applied to the mosaic image having the number of colors M more than three (S910), and a multispectral image having the number of colors M is generated. Further, when linear matrix processing for converting a color space represented by the number of colors M into an RGB color space (e.g., sRGB color space) is applied to the multispectral image (S920), an RGB image is generated.

When the RGB image is generated from the mosaic image having more than three colors as described above, color reproduction is expected to be higher than when an RGB image is generated from a mosaic image having three colors obtained by using the color filter array CFA31 shown in FIG. 1. As described above, it is desirable to increase the number of colors of the color filter in order to further improve color reproduction. Meanwhile, the number of pixels per color is decreased as the number of colors is increased, and a sampling interval of each color is increased. It is generally known that a phenomenon called aliasing in which high-frequency components turn back to a low-frequency region occurs in a case where the sampling interval is insufficient for frequency components included in a signal.

Figure 3:
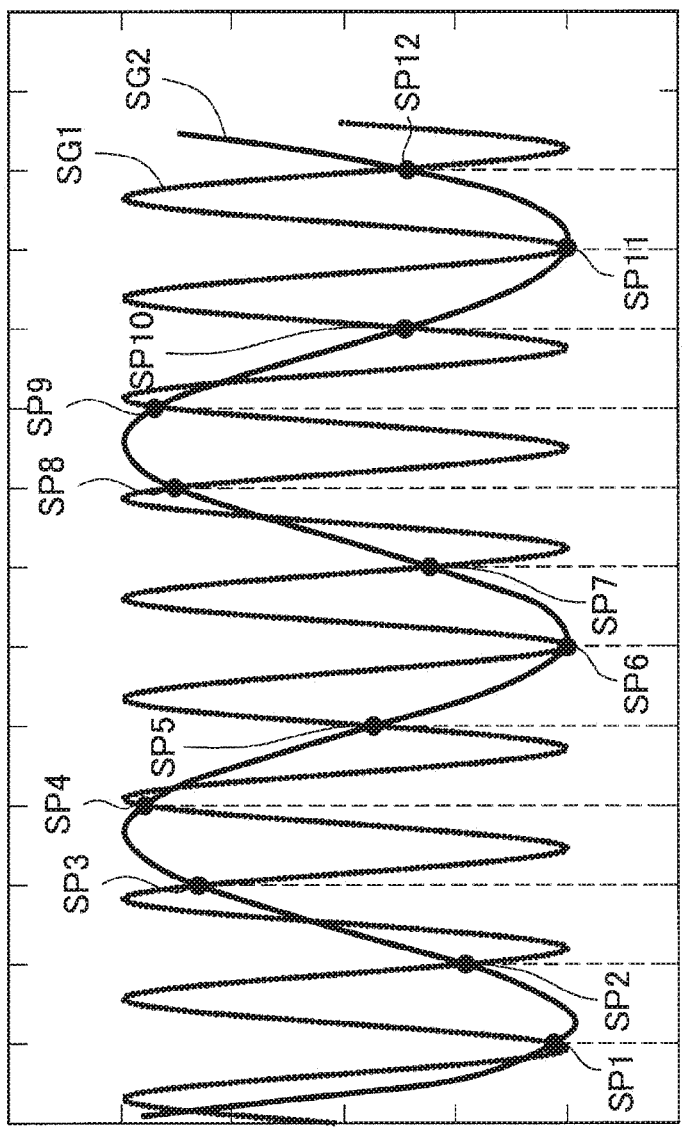
FIG. 3 is an explanatory diagram of aliasing.

FIG. 3 is an explanatory diagram of aliasing. FIG. 3 shows an original signal SG1 and a restoration signal SG2 reconstructed from sampling points SP1 to SP12 obtained by sampling the original signal SG1 at predetermined sampling intervals. Herein, it is known that the original signal SG1 and the restoration signal SG2 match if a sampling frequency fs that is the reciprocal of the sampling interval is twice or more as high as a maximum frequency included in the original signal SG1. However, in a case where the original signal SG1 has a frequency f higher than a frequency fs/2 that is half the sampling frequency fs and is called Nyquist frequency, a false frequency fs-f that does not exist in the original signal SG1 is generated in the restoration signal SG2 as aliasing. As a result, as shown in FIG. 3, the original signal SG1 and the restoration signal SG2 do not match.

Aliasing in an image leads to generation of a color that does not originally exist, and such a color that does not originally exist generated due to aliasing is called a false color. A spatial sampling interval of each color is increased as the number of colors of the color filter is increased, and, as a result, a false color tends to be generated in a region containing high-frequency components. Further, in a case where a false color is generated in a multispectral image, the false color is also generated in an RGB image generated from the multispectral image.

As described above, aliasing does not occur if the sampling frequency is twice or more as high as the maximum frequency included in the original signal. Therefore, generation of a false color can be suppressed by sampling each color at sufficiently small sampling intervals. Meanwhile, in a single-plate multispectral image sensor, the number of colors and the sampling interval are in a trade-off relationship, and, in order to reduce the sampling interval, the number of colors is reduced. This leads to reduction in color reproduction.

Thus, the present disclosers have made an embodiment of the present disclosure in view of the above circumstances. The imaging apparatus according to the embodiment of the present disclosure described below applies demosaic processing to a mosaic image having the number of colors M, thereby generating not only a multispectral image having the number of colors M, but also a multispectral image having the number of colors N more than three but less than the number of colors M. The demosaic processing (S910) shown in FIG. 2 is processing for generating a multispectral image having the number of colors M from a mosaic image having the number of colors M. Therefore, regarding this point, the demosaic processing according to this embodiment is different from the demosaic processing (S910) shown in FIG. 2. Further, the imaging apparatus according to this embodiment applies linear matrix processing to each of the multispectral image having the number of colors M and the multispectral image having the number of colors N, thereby generating RGB images. That is, when compared to the example shown in FIG. 2, the only method of reducing the number of colors is linear matrix processing (S920) in the example shown in FIG. 2, but, according to this embodiment, the number of colors can be reduced by performing demosaic processing and linear matrix processing in cooperation. Then, the imaging apparatus according to this embodiment combines the RGB image generated from the multispectral image having the number of colors M with the RGB image generated from multispectral image having the number of colors N on the basis of edge information indicating saturation and high-frequency components contained in the image, or the like. With such a configuration, it is possible to suppress generation of a false color while improving color reproduction. Hereinafter, the embodiment of the present disclosure having the above effects will be described in detail.

2. CONFIGURATION EXAMPLE OF IMAGING APPARATUS

Figure 4:
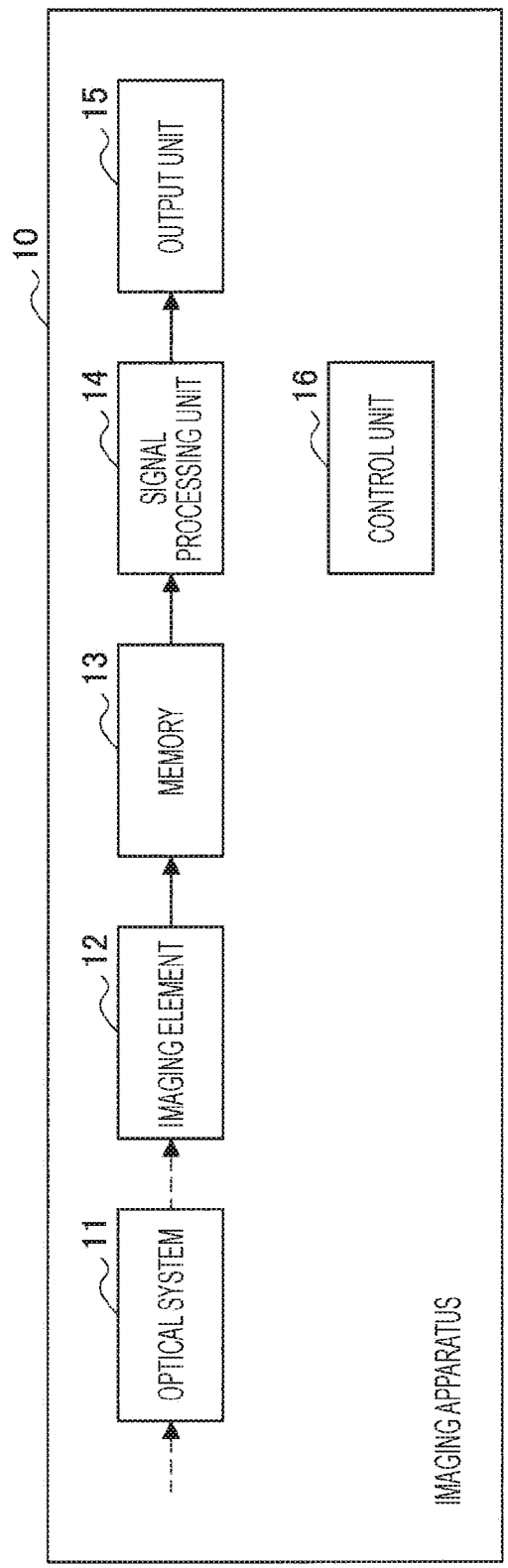
FIG. 4 is a block diagram showing a configuration example of an imaging apparatus 10 (an example of an image processing apparatus) according to an embodiment of the present disclosure.

FIG. 4 is a block diagram showing a configuration example of an imaging apparatus 10 (an example of an image processing apparatus) according to the embodiment of the present disclosure. The imaging apparatus 10 in FIG. 1 is, for example, a digital camera capable of capturing both still images and moving images (hereinafter, also simply and collectively referred to as images in some cases). Further, the imaging apparatus 10 is, for example, a multispectral camera capable of detecting light (multispectrum) in four or more wavelength bands (four or more bands) more than three wavelength bands (three bands) of red (R), green (G), and blue (B), or yellow (Y), magenta (M), and cyan (C).

As shown in FIG. 4, the imaging apparatus 10 includes an optical system 11, an imaging element 12 (an example of an imaging unit), a memory 13, a signal processing unit 14, an output unit 15, and a control unit 16.

The optical system 11 includes, for example, a zoom lens, a focus lens, a diaphragm, and the like (not shown), and allows external light to enter the imaging element 12. Further, the optical system 11 also includes various filters such as a polarizing filter as necessary.

The imaging element 12 is, for example, an imaging unit including a complementary metal oxide semiconductor (CMOS) image sensor. The imaging element 12 is a single-plate multispectral image sensor, and a color filter array of the imaging element 12 may be, for example, the color filter array CFA81 shown in FIG. 1. The imaging element 12 receives incident light from the optical system 11, performs photoelectric conversion, acquires a mosaic image corresponding to the incident light, and outputs the mosaic image to the memory 13.

Note that, in the following description, the number of colors of a color filter included in the imaging element 12, i.e., the number of colors of the mosaic image acquired by the imaging element 12, is referred to as a first number of colors M, or simply a first number of colors in some cases. Further, a detailed configuration example of the imaging element 12 will be described below in more detail with reference to FIGS. 23 to 35.

The memory 13 temporarily stores the mosaic image output by the imaging element 12.

The signal processing unit 14 generates an image by applying signal processing to the mosaic image acquired by the imaging element 12 and stored in the memory 13 and supplies the image to the output unit 15.

The output unit 15 outputs the image generated by the signal processing unit 14. For example, the output unit 15 includes a display (not shown) made from a liquid crystal or the like, and displays a spectrum corresponding to the image output from the signal processing unit 14 as a so-called through image. For example, the output unit 15 includes a driver (not shown) for driving a recording medium such as a semiconductor memory, a magnetic disk, or an optical disk, and records image data from the signal processing unit 14 on the recording medium. For example, the output unit 15 functions as a communication interface for communicating with an external device (not shown), and transmits the image from the signal processing unit 14 to an external apparatus wirelessly or by wire.

The control unit 16 controls each unit of the imaging apparatus 10 in response to user operation or the like.

3. SIGNAL PROCESSING UNIT

Hereinabove, the configuration example of the imaging apparatus 10 according to the embodiment of the present disclosure has been described. Next, the signal processing unit 14 according to this embodiment included in the imaging apparatus 10 will be described with reference to FIGS. 5 to 22.

3-1. First Example of Signal Processing Unit

Configuration Example

Figure 5:
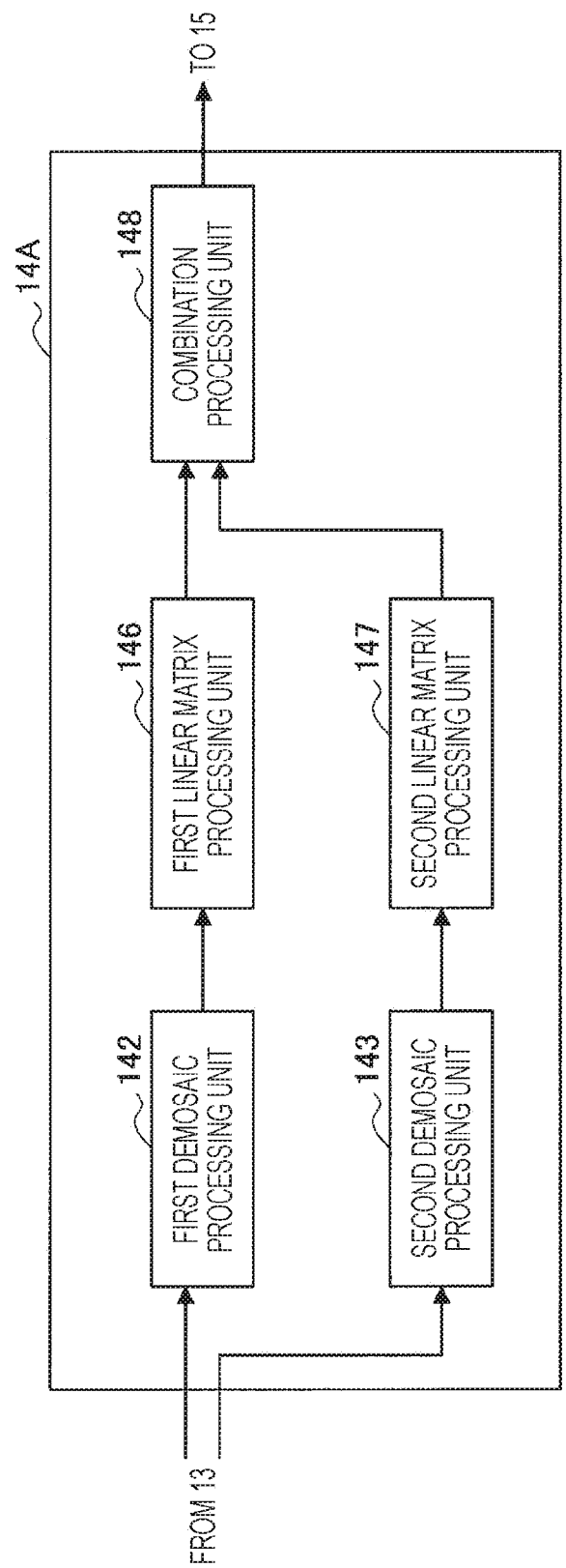
FIG. 5 is a block diagram showing a configuration of a signal processing unit 14A that is a first example of a signal processing unit 14 in FIG. 4.

FIG. 5 is a block diagram showing a configuration of a signal processing unit 14A that is a first example of the signal processing unit 14 in FIG. 4. As shown in FIG. 5, the signal processing unit 14A includes a first demosaic processing unit 142, a second demosaic processing unit 143, a first linear matrix processing unit 146, a second linear matrix processing unit 147, and a combination processing unit 148.

The first demosaic processing unit 142 and the second demosaic processing unit 143 apply demosaic processing to the mosaic image having the first number of colors acquired by the imaging element 12 and stored in the memory 13, thereby generating multispectral images. Hereinafter, functional configurations of the first demosaic processing unit 142 and the second demosaic processing unit 143 will be sequentially described. Note that the first demosaic processing unit 142 and the second demosaic processing unit 143 is simply and collectively referred to as demosaic processing units included in the signal processing unit 14A in some cases.

The first demosaic processing unit 142 applies demosaic processing to the mosaic image having the first number of colors M provided from the memory 13, thereby generating a multispectral image having the first number of colors M.

Figure 6:
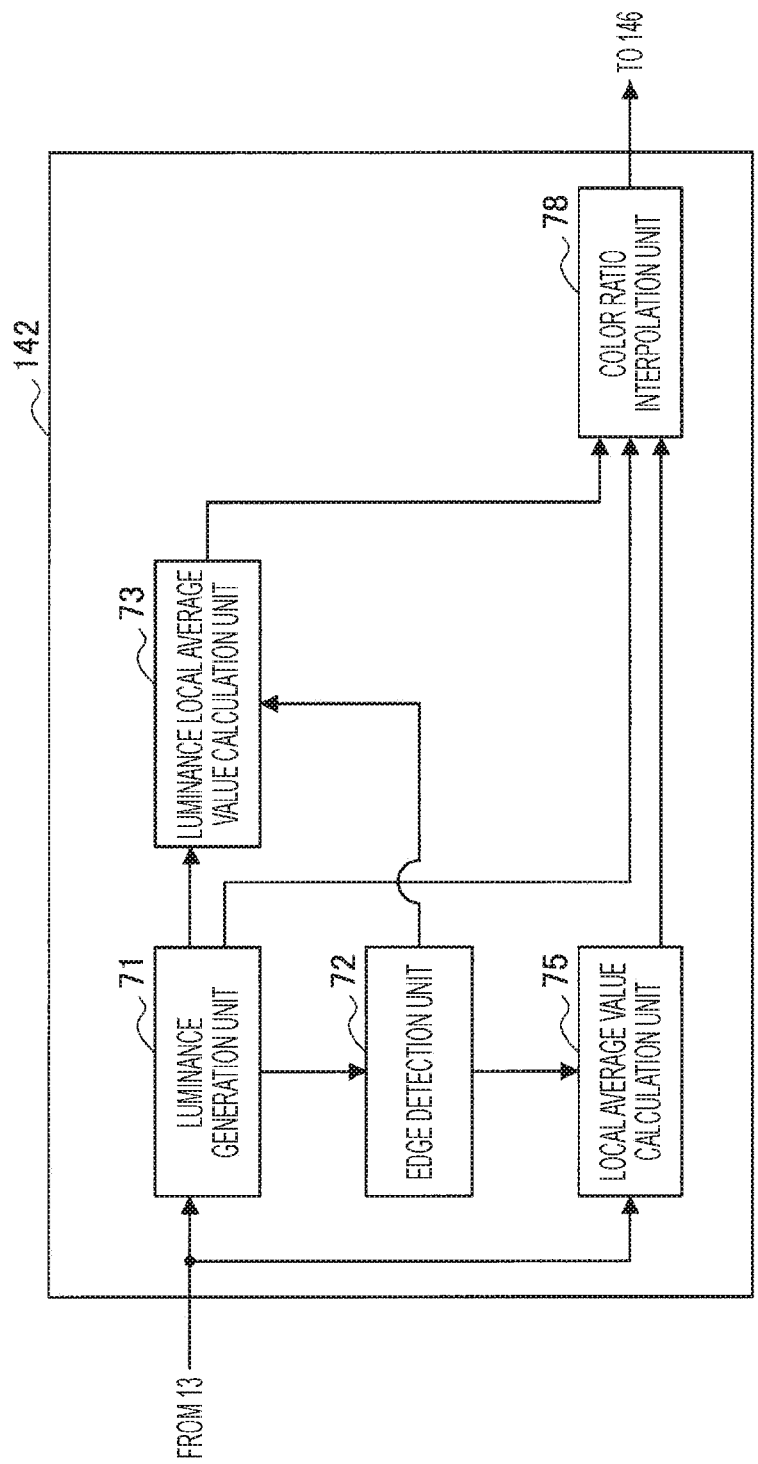
FIG. 6 is a block diagram showing a configuration example of a first demosaic processing unit 142.

FIG. 6 is a block diagram showing a configuration example of the first demosaic processing unit 142. As shown in FIG. 6, the first demosaic processing unit 142 includes a luminance generation unit 71, an edge detection unit 72, a luminance local average value calculation unit 73, a local average value calculation unit 75, and a color ratio interpolation unit 78. Note that processing performed by the luminance generation unit 71, the edge detection unit 72, the luminance local average value calculation unit 73, the local average value calculation unit 75, and the color ratio interpolation unit 78 will be collectively referred to as first demosaic processing performed by the first demosaic processing unit 142.

The luminance generation unit 71 generates luminance signals on the basis of the mosaic image provided from the memory 13. The luminance generation unit 71 may generate luminance signals by, for example, applying a predetermined filter to the mosaic image.

The predetermined filter applied to the mosaic image by the luminance generation unit 71 may be, for example, a box filter of 2×2 pixels. A frequency characteristic of the box filter of 2×2 pixels is a low-pass filter in which a null point occurs at the Nyquist frequency. Therefore, luminance signals, which are generated by applying the box filter of 2×2 pixels under the condition that similar signals are obtained for all colors, such as a condition that a subject is gray, are expected to contain high-frequency components up to near the Nyquist frequency. In other words, adoption of the box filter of 2×2 pixels can make the luminance signals less blurred.

For example, a case where colors included in a range of the 2×2 pixels are one red-based color, one blue-based color, and two green-based colors, no matter which 2×2 pixels are selected in the color filter array CFA81 of FIG. 1 is considered hereinafter. By applying the box filter of 2×2 pixels to a mosaic image obtained on the basis of such a color filter array CFA81, luminance signals in which red-based, blue-based, and green-based colors are mixed are obtained in any 2×2 pixels.

Figure 7:
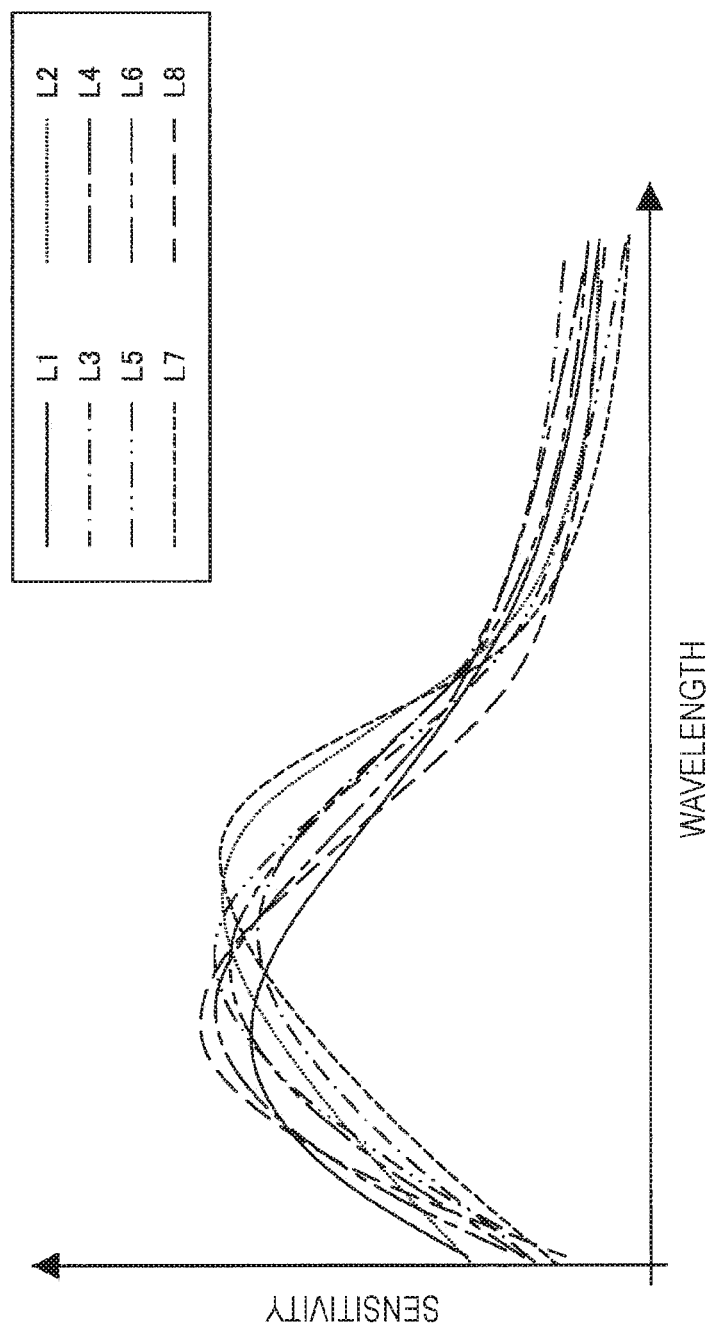
FIG. 7 is a graph showing an example of spectral characteristics of signals in which 2×2 pixels are mixed in a color filter array CFA81.

FIG. 7 is a graph showing an example of spectral characteristics of signals in which 2×2 pixels are mixed in the color filter array CFA81. Different colors are mixed at each pixel position, and thus mixed spectra have a plurality of patterns. There are eight patterns for selecting 2×2 pixels in the color filter array CFA81, and the patterns correspond to spectral characteristic curves L1 to L8, respectively, of the graph shown in FIG. 7. As is clear from FIG. 7, it can be seen that the spectral characteristic curves L1 to L8 generally have similar characteristics. Therefore, the luminance signals can be easily generated by applying the box filter of 2×2 pixels to the mosaic image obtained on the basis of such a color filter array CFA81.

However, because the mixed spectra have the plurality of patterns as described above, a checkered pattern noise is generated in the luminance signals in some cases. Thus, the luminance generation unit 71 may apply noise reduction processing to the luminance signals generated by applying a predetermined filter. The noise reduction processing applied by the luminance generation unit 71 may be, for example, edge-preserving smoothing processing.

FIG. 8 is a diagram schematically showing an example of luminance signals before and after noise reduction. As shown in FIG. 8, the checkered pattern noise can be reduced by the edge-preserving smoothing processing, without blurring edges.

Note that the above description provides an example where the luminance generation unit 71 applies the box filter of 2×2 pixels to a mosaic image. However, the filter applied by the luminance generation unit 71 is not limited to the box filter of 2×2 pixels, and other filters may be used.

Referring back to FIG. 6, description will be continued. The edge detection unit 72 performs edge detection by using the luminance signals generated by the luminance generation unit 71. The edge detection unit 72 supplies edge information obtained by the edge detection and including information indicating presence or absence of an edge and information indicating strength of the edge to the luminance local average value calculation unit and the local average value calculation unit 75. Note that a stronger edge means a higher spatial frequency, and thus the edge information indicates high-frequency components contained in the image.

The luminance local average value calculation unit 73 calculates an average value of the luminance signals included in a local region around each pixel (hereinafter, also referred to as luminance local average value in some cases). Further, a size of the local region may be determined in advance, for example. Further, the luminance local average value calculation unit 73 may simply average the luminance signals of the respective pixels, or may set a weight for each pixel and perform weighted averaging.

Further, the luminance local average value calculation unit 73 may calculate the luminance local average value on the basis of the edge information supplied from the edge detection unit 72. A region where the edge is detected is a region containing a large number of high-frequency components. Thus, the above-described aliasing tends to occur, and color ratio interpolation may not be correctly performed by a color ratio interpolation unit 79 described below. Thus, for example, the luminance local average value calculation unit 73 may calculate the luminance local average value in pixels other than a pixel in which the edge exists.

Further, because the strength of the edge indicates an intensity of the high-frequency component, the luminance local average value calculation unit 73 may set the weight of each pixel on the basis of the strength of the edge so that the weight is reduced as the edge is stronger and calculate the luminance local average value by performing weighted averaging.

With such a configuration, it is possible to reduce occurrence of aliasing and generation of a false color.

The local average value calculation unit 75 calculates an average value of pixel values included in the local region around each pixel (hereinafter, also referred to as local average value in some cases) for each color. The local average value calculation unit 75 may simply average the pixel values of the respective pixels, or may set a weight for each pixel and perform weighted averaging.

Further, the local average value calculation unit 75, as well as the luminance local average value calculation unit 73, may calculate the local average value on the basis of the edge information supplied from the edge detection unit 72. For example, the local average value calculation unit 75 may calculate the local average value in the pixels other than the pixel in which the edge exists. Alternatively, the local average value calculation unit 75 may set the weight of each pixel on the basis of the strength of the edge so that the weight is reduced as the edge is stronger and calculate the local average value by performing weighted averaging.

With such a configuration, it is possible to reduce occurrence of aliasing and generation of a false color.

The color ratio interpolation unit 78 interpolates (estimates) the pixel value of each pixel by using the luminance signals generated by the luminance generation unit 71, the luminance local average value calculated by the luminance local average value calculation unit 73, and the local average value calculated by the local average value calculation unit 75.

Note that the color ratio interpolation unit 78 may interpolate only pixel values of colors that are not obtained in the mosaic image, i.e., pixel values of unknown colors, or may interpolate the pixel values of the unknown colors as well as pixel values of colors that are obtained in the mosaic image. In any case, by interpolating the pixel values as described above, the color ratio interpolation unit 78 can generate a multispectral image having pixel values of the respective colors corresponding to the first number of colors M, i.e., having the first number of colors M for each pixel. The generated multispectrum having the first number of colors M is supplied to the first linear matrix processing unit 146.

Hereinafter, a case of interpolating (estimating) a pixel value C(x) of an unknown color C at a pixel position x will be described. When a local average value of the color C at the pixel position x is denoted by mC(x), a luminance signal at the pixel position x is denoted by Y(x), and a luminance local average value is denoted by mY(x), the pixel value C(x) of the unknown color C at the pixel position x can be interpolated as in Expression (1) below.

[Math. 1]

$$C(x) = Y(x)\frac{mC(x)}{mY(x)} \qquad (1)$$

Note that Expression (1) above is an interpolation formula using the fact that luminance signals and color signals have a strong positive correlation in the local region, and uses the fact that a ratio between average values of the two signals in the local region is substantially equal to a ratio between the two signals. Interpolation using the fact that the ratio between the average values of the two signals in the local region is substantially equal to the ratio between the two signals as described above is called color ratio interpolation. The luminance signals are used in the above description. However, interpolation can also be similarly performed by using other spectrally close color signals (having a high correlation of spectral sensitivity between colors) which are strongly expected to have a positive correlation.

Hereinabove, the first demosaic processing unit 142 and the demosaic processing performed by the first demosaic processing unit 142 have been described. Next, the second demosaic processing unit 143 will be described with reference to FIG. 9. The second demosaic processing unit 143 applies demosaic processing to the mosaic image having the first number of colors M provided from the memory 13, thereby generating a multispectral image having a second number of colors N (where N is an integer) more than three but less than the first number of colors M.

Figure 9:
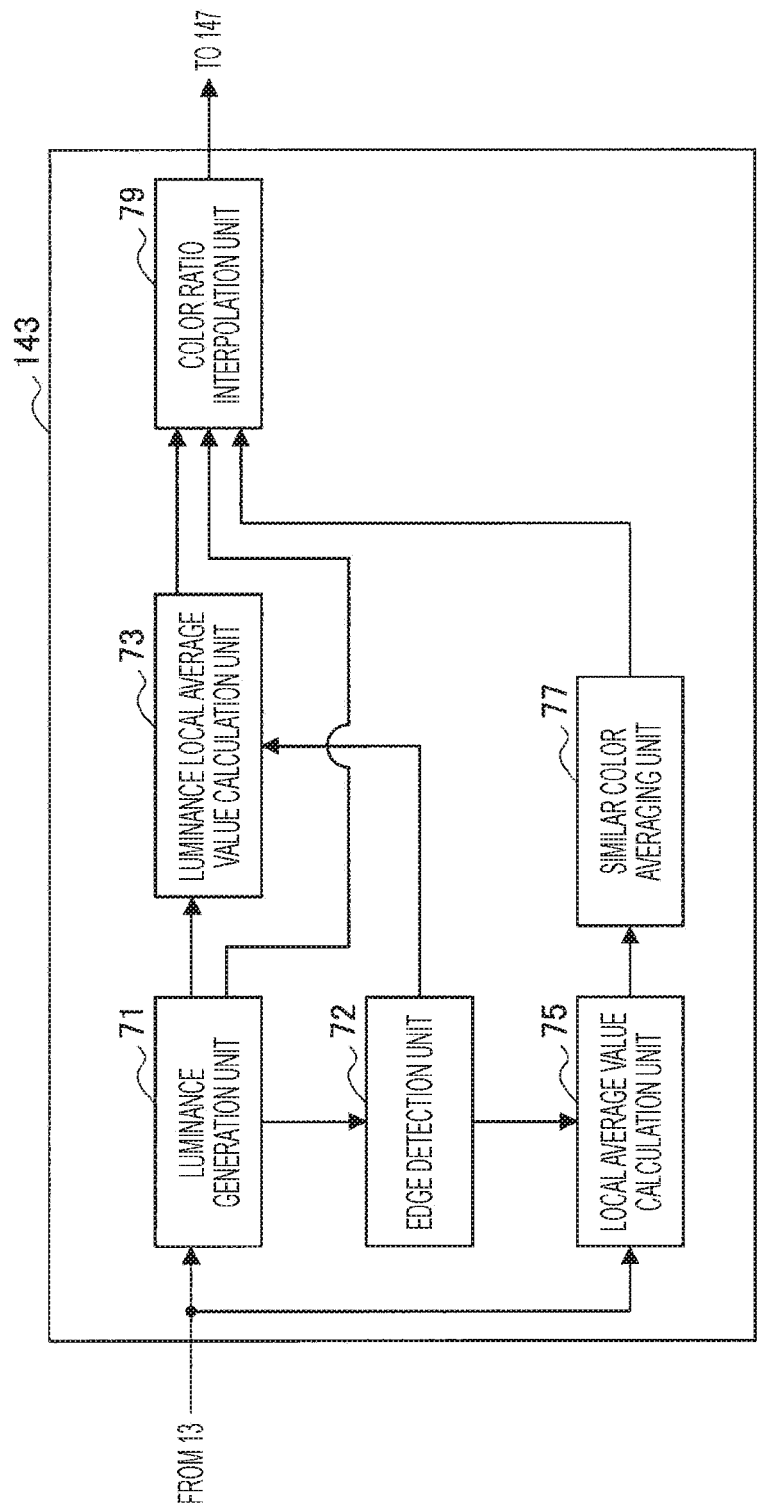
FIG. 9 is a block diagram showing a configuration of a second demosaic processing unit 143.

FIG. 9 is a block diagram showing a configuration of the second demosaic processing unit 143. As shown in FIG. 9, the second demosaic processing unit 143 includes the luminance generation unit 71, the edge detection unit 72, the luminance local average value calculation unit 73, the local average value calculation unit 75, a similar color averaging unit 77, and the color ratio interpolation unit 79. Note that processing performed by the luminance generation unit 71, the edge detection unit 72, the luminance local average value calculation unit 73, the local average value calculation unit 75, the similar color averaging unit 77, and the color ratio interpolation unit 79 will be collectively referred to as demosaic processing performed by the second demosaic processing unit 143. Further, among the configurations shown in FIG. 9, configurations having substantially the same functional configurations as the configurations shown in FIG. 6 will be denoted by the same reference signs, and description thereof will be appropriately omitted. Hereinafter, the similar color averaging unit 77 and the color ratio interpolation unit 79 will be mainly described.

The similar color averaging unit 77 regards a plurality of spectrally close colors (similar color) as the same color, and performs similar color averaging processing of averaging the local average values calculated by the local average value calculation unit 75 for each similar color, thereby calculating a local average value in which the number of colors is reduced from the first number of colors M to the second number of colors N. That is, by the similar color averaging processing performed by the similar color averaging unit 77, the second demosaic processing unit 143 calculates the local average value for each color obtained by averaging a plurality of colors included in the first number of colors so as to correspond to the second number of colors N.

Further, the spectrally close colors may be, for example, colors having a high correlation of spectral sensitivity between the colors. In other words, the correlation of the spectral sensitivity between the plurality of colors averaged in the similar color averaging processing performed by the similar color averaging unit 77 is desirably higher than a correlation of spectral sensitivity between other colors included in the first number of colors M.

However, a required wavelength region and resolution of colors are different depending on an application. Thus, a combination of similar colors to be averaged may be determined in accordance with the application. Alternatively, the combination of the similar colors to be averaged may be determined in advance in accordance with the color filter array, may be determined in accordance with input by the user, or may be automatically determined in accordance with spectral sensitivity of colors included in the color filter array.

Figure 10:
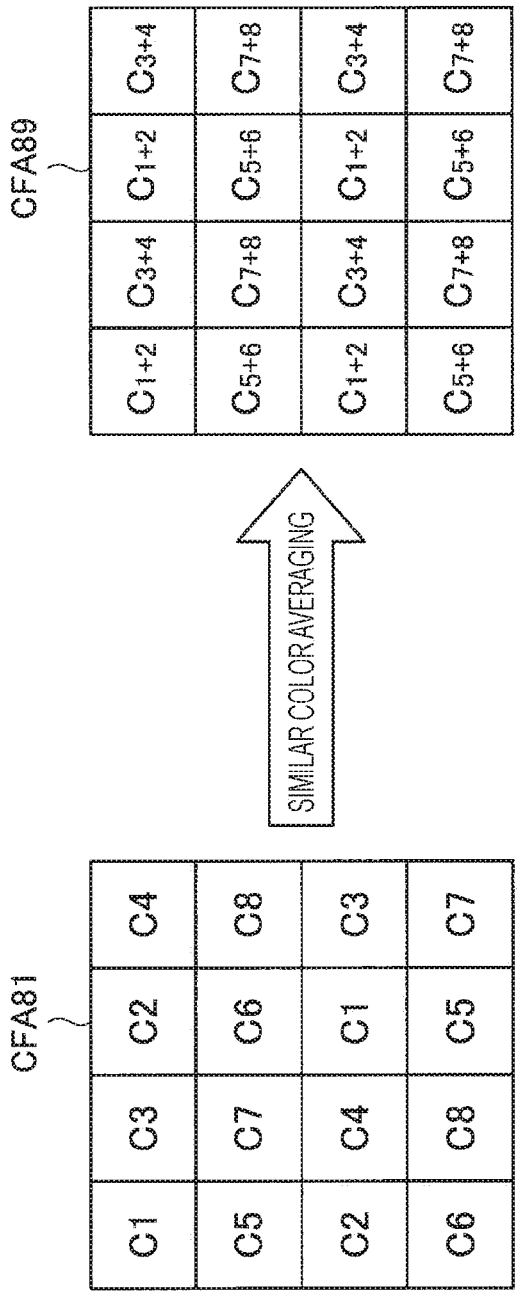
FIG. 10 is an explanatory diagram schematically showing an example where similar color averaging processing is applied in the color filter array CFA81 in FIG. 1.

Note that the similar color averaging processing performed by the similar color averaging unit 77 means that the color filter array of the first number of colors M is regarded as a color filter array of the second number of colors N in a pseudo manner. FIG. 10 is an explanatory diagram schematically showing an example where the similar color averaging processing is applied to the color filter array CFA81 in FIG. 1. For example, in FIG. 10, the colors C1 and C2, the colors C3 and C4, the colors C5 and C6, and the colors C7 and C8 are spectrally closer to each other than other colors. As described above, a correlation of spectral sensitivity between the colors C1 and C2, a correlation of spectral sensitivity between the colors C3 and C4, a correlation of spectral sensitivity between the colors C5 and C6, and a correlation of spectral sensitivity between the colors C7 and C8 are desirably higher than correlations of spectral sensitivity between other colors.

When an averaged color of C1 and C2 is $C_{1+2}$, an averaged color of C3 and C4 is $C_{3+4}$, an averaged color of C5 and C6 is $C_{5+6}$, and an averaged color of C7 and C8 is $C_{7+8}$, as shown in FIG. 10, approximate values of results of calculation of local average values in the color filter array CFA89 can be obtained by applying the similar color averaging processing in the color filter array CFA81. When comparing the color filter array CFA81 and the color filter array CFA89, it can be seen that the number of pixels per color is improved in the color filter array CFA89. The improvement in the number of pixels per color means reduction in the sampling interval of each color. This makes it possible to suppress a false color as described above.

Figure 11:
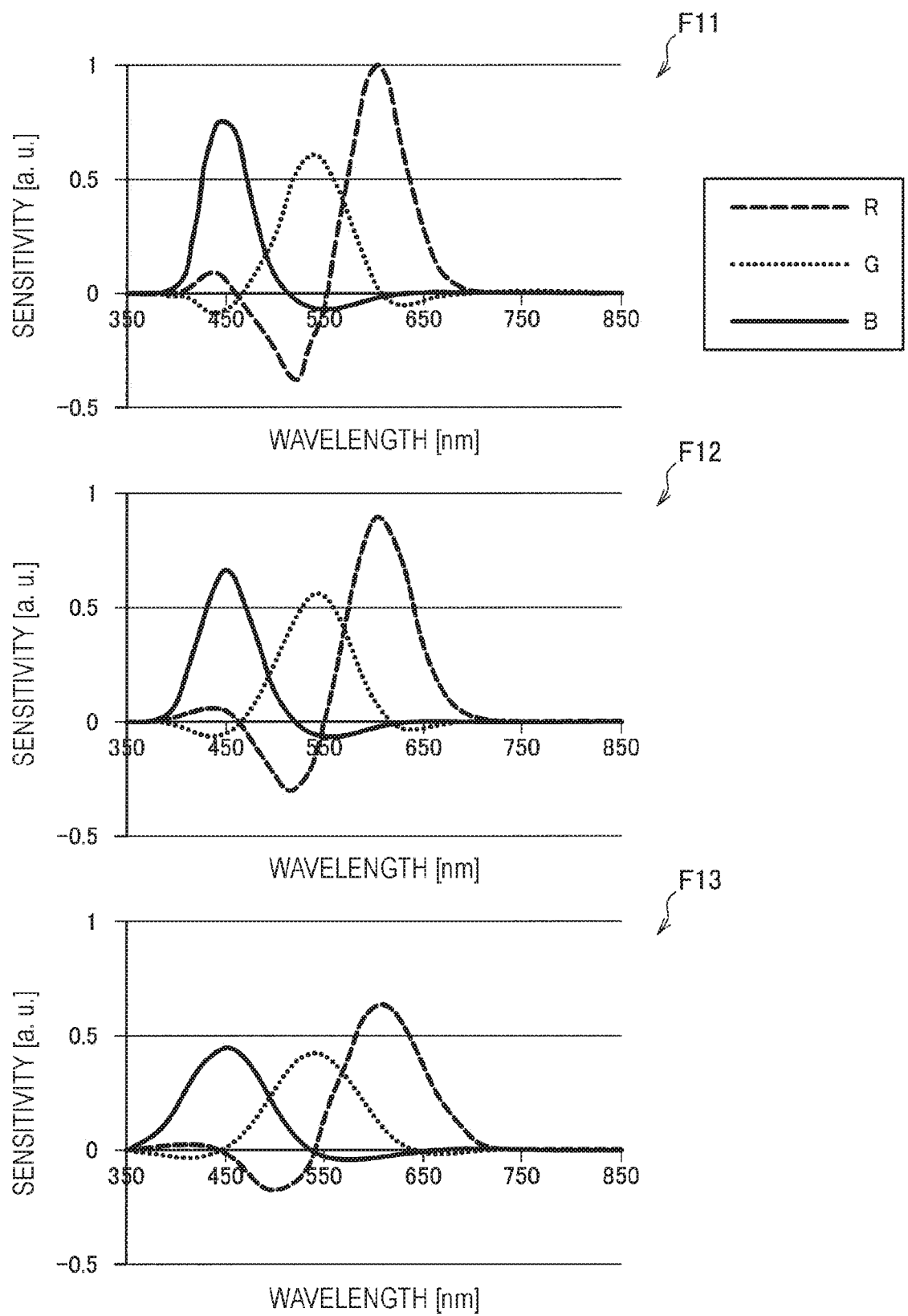
FIG. 11 is a graph showing a difference in reproducibility of a color matching function depending on the number of colors.

Meanwhile, in view of a color reproduction performance, the color reproduction performance may be reduced if the number of colors is reduced in a pseudo manner. FIG. 11 is a graph showing a difference in reproducibility of a color matching function depending on the number of colors. Graphs F11, F12, and F13 shown in FIG. 11 show a color matching function in an sRGB color space, an example of reproducing the color matching function in sixteen colors, and an example of reproducing the color matching function in pseudo four colors, respectively. The color matching function expresses sensitivity of human eyes, and it can be said that an image sensor has higher color reproduction as the color matching function is closer to this spectral shape. As shown in FIG. 11, the graph F12 that reproduces the color matching function in the sixteen colors is closer to the graph F11 showing the color matching function in the sRGB color space than the graph F13 that reproduces the color matching function in the four pseudo colors. Thus, it can be seen that reproducibility of the color matching function is higher and color reproduction is higher in the sixteen colors than that in the pseudo four colors.

Therefore, when comparing image quality of an RGB image generated without reducing the number of colors with that of an RGB image generated by reducing the number of colors in a pseudo manner, a result as shown in Table 1 below is obtained.

TABLE 1

Table 1. Comparison between the number of colors and image quality

| | Case where the number of colors is not reduced | Case where the number of colors is reduced in a pseudo manner |
|---|---|---|
| Case where subject contains high-frequency components | Large number of false colors | Small number of false colors |
| Case where subject contains no high-frequency components | High color reproduction | Low color reproduction |

As shown in Table 1 above, in a case where a subject contains high-frequency components, a false color is generated due to occurrence of aliasing. Thus, in a case where the subject contains high-frequency components, the number of colors is desirably reduced in a pseudo manner. Meanwhile, in a case where the subject contains no high-frequency component, it is desirable not to reduce the number of colors in view of color reproduction. Characteristics shown in Table 1 become more remarkable as the number of colors reduced in a pseudo manner (second number of colors N) is smaller than the original number of colors (first number of colors M). Therefore, it is desirable that, considering the high-frequency components contained in the subject, the second number of colors N be set in advance so that degradation of color reproduction obtained in a case where the number of colors is reduced in a pseudo manner has an advantage over degradation of color reproduction caused by a false color generated in a case where the number of colors is not reduced. For example, the second number of colors N may be appropriately set by gradually reducing the number of colors while checking tendencies of deterioration of the color reproduction and the false color by using both a color chart and a resolution chart.

Referring back to FIG. 9, description will be continued. The color ratio interpolation unit 79, as well as the color ratio interpolation unit 78 described with reference to FIG. 6, interpolates a pixel value of each pixel by using the luminance signals, the luminance local average value, and the local average value. However, the color ratio interpolation unit 79 is different from the color ratio interpolation unit 78 in that the color ratio interpolation unit 79 interpolates the pixel value of each pixel by using the local average value averaged for each similar color by the similar color averaging unit 77. Further, the pixel value interpolated by the color ratio interpolation unit 79 is a pixel value of a color averaged for each similar color in the similar color averaging processing performed by the similar color averaging unit 77.

Therefore, the color ratio interpolation unit 79 can generate a multispectral image having a pixel value of each of colors corresponding to the second number of colors N in each pixel, i.e., having the second number of colors N. The generated multispectrum having the second number of colors N is supplied to the second linear matrix processing unit 147.

Note that the color ratio interpolation unit 79, as well as the color ratio interpolation unit 78, may interpolate an unknown color (color averaged for each similar color) in each pixel by using Expression (1) above.

Hereinabove, the configuration of the demosaic processing unit included in the signal processing unit 14A has been described. Referring back to FIG. 5, description of the signal processing unit 14A will be continued.

The first linear matrix processing unit 146 and the second linear matrix processing unit 147 apply linear matrix processing to the multispectral images to generate RGB images. Note that, in this specification, the first linear matrix processing unit 146 and the second linear matrix processing unit 147 is simply and collectively referred to as linear matrix processing units according to this embodiment in some cases. Further, the linear matrix processing applied by the first linear matrix processing unit 146 is referred to as first linear matrix processing, and the linear matrix processing applied by the second linear matrix processing unit 147 is referred to as second linear matrix processing in some cases.

The linear matrix processing is matrix operation for converting a certain color space into another color space. The linear matrix processing performed by the linear matrix processing units according to this embodiment is processing for converting a color space represented by three or more colors (also referred to as multicolor color space in some cases) into an RGB color space (e.g., sRGB color space).

The first linear matrix processing unit 146 applies the linear matrix processing to the multispectral image having the first number of colors M supplied from the first demosaic processing unit 142 to generate an RGB image having three colors (third number of colors) of R, G, and B. Further, the second linear matrix processing unit 147 applies the linear matrix processing to the multispectral image having the second number of colors N supplied from the second demosaic processing unit 143 to generate an RGB image having three colors (third number of colors) of R, G, and B. Note that, in order to distinguish the RGB images generated by the respective first linear matrix processing unit 146 and second linear matrix processing unit 147, the RGB image generated by the first linear matrix processing unit 146 may also be referred to as first RGB image (first image), and the RGB image generated by the second linear matrix processing unit 147 is referred to as second RGB image (second image) hereinafter in some cases.

Pixel values of R, G, and B obtained by the linear matrix processing applied by the linear matrix processing unit according to this embodiment are represented by, for example, Expression (2) below. Note that, in Expression (2) below, n denotes the number of colors of the multispectral image, $a_{ij}$ (i=1, 2, 3, j=1, 2, . . . , n) each denotes a coefficient of the linear matrix, and $C_k$ each denotes a pixel value of the k-th (k=1, 2, . . . , n) color.

[Math. 2]

$$\begin{pmatrix} R \\ G \\ B \end{pmatrix} = \begin{pmatrix} a_{11} & a_{12} & a_{13} & \ldots & a_{1n} \\ a_{21} & a_{22} & a_{23} & \ldots & a_{2n} \\ a_{31} & a_{32} & a_{33} & \ldots & a_{3n} \end{pmatrix} \begin{pmatrix} C_1 \\ C_2 \\ C_3 \\ \vdots \\ C_n \end{pmatrix} \qquad (2)$$

Note that the coefficient $a_{ij}$ of the linear matrix may be obtained in advance. For example, the coefficient $a_{ij}$ of the linear matrix can be obtained by the least squares method by using a color chart expressed in each color space. Alternatively, the coefficient of the linear matrix may also be obtained by using a spectrum of each color in the multicolor color space so as to approximate the color matching function expressed in the sRGB color space.

The combination processing unit 148 performs combination processing for the first RGB image generated by the first linear matrix processing unit 146 and the second RGB image generated by the second linear matrix processing unit 147. Hereinafter, a detailed configuration of the combination processing unit 148 will be described with reference to FIG. 12.

Figure 12:
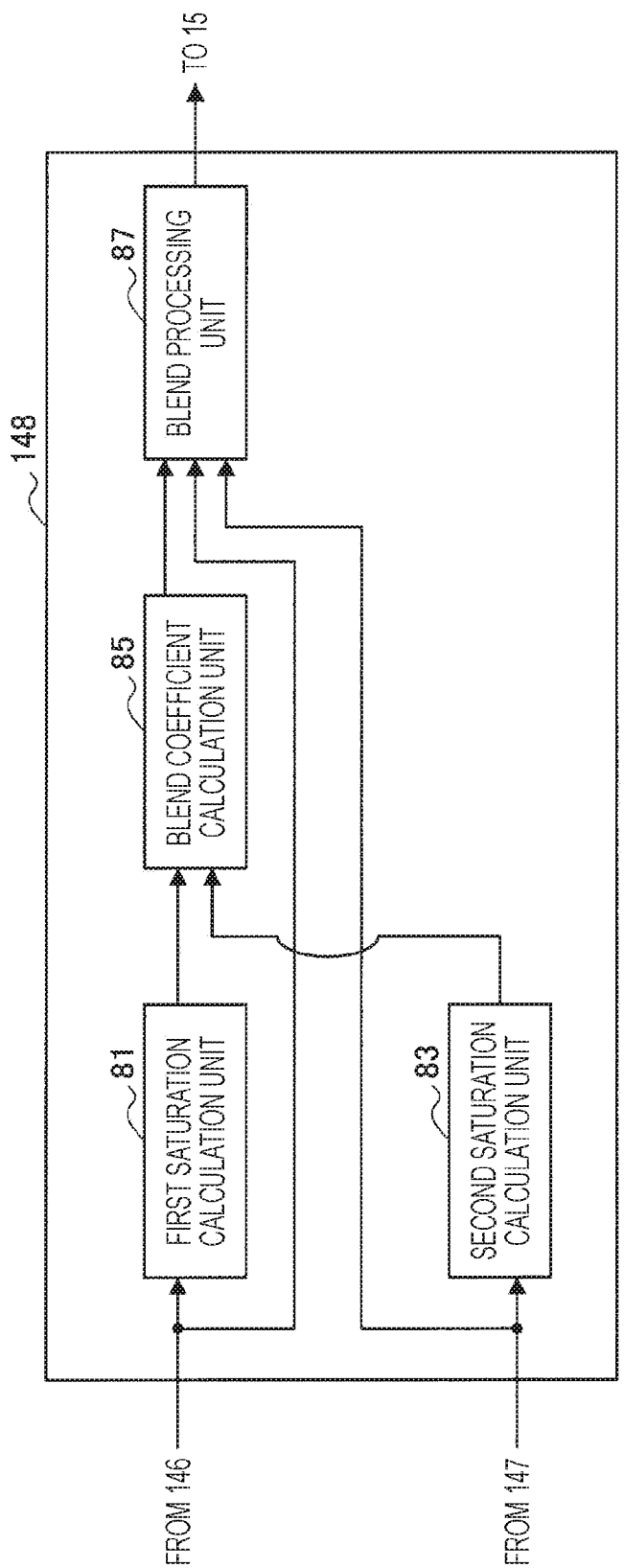
FIG. 12 is a block diagram showing a detailed configuration of a combination processing unit 148.

FIG. 12 is a block diagram showing the detailed configuration of the combination processing unit 148. As shown in FIG. 12, the combination processing unit 148 includes a first saturation calculation unit 81, a second saturation calculation unit 83, a blend coefficient calculation unit 85, and a blend processing unit 87. Note that processing performed by the first saturation calculation unit 81, the second saturation calculation unit 83, the blend coefficient calculation unit 85, and the blend processing unit 87 will be collectively referred to as combination processing performed by the combination processing unit 148.

The first saturation calculation unit 81 and the second saturation calculation unit 83 calculate saturations from the RGB images. The first saturation calculation unit 81 calculates a saturation of the first RGB image (hereinafter, also referred to as first saturation in some cases), and the second saturation calculation unit 83 calculates a saturation of the second RGB image (hereinafter, also referred to as second saturation in some cases). For example, the first saturation calculation unit 81 and the second saturation calculation unit 83 may calculate the saturations for each pixel.

The blend coefficient calculation unit 85 calculates (determines) a blend coefficient to be used in blend processing performed by the blend processing unit 87 described below on the basis of the first saturation calculated by the first saturation calculation unit 81 and the second saturation calculated by the second saturation calculation unit 83. For example, the blend coefficient calculation unit 85 may calculate the blend coefficient for each pixel.

In a case where a false color is generated, the generated false color tends to have a high saturation. Therefore, a false color is less likely to be generated in a pixel where the saturation of the first RGB image is close to the saturation of the second RGB image. Meanwhile, a false color is likely to be generated in a case where the saturation of the first RGB image (first saturation) is higher than the saturation of the second RGB image (second saturation). Thus, the blend coefficient calculation unit 85 may calculate the blend coefficient so that, for example, the second RGB image is prioritized in a case where a value obtained by subtracting the second saturation from the first saturation is larger than a predetermined threshold and the first RGB image is prioritized in a case where the value is equal to or smaller than the predetermined threshold. Alternatively, the blend coefficient calculation unit 85 may calculate the blend coefficient so that the second RGB image is prioritized more as the value obtained by subtracting the second saturation from the first saturation is larger.

With such a configuration, regarding pixels of the first RGB image in which a false color is likely to be generated, the second RGB image in which generation of the false color is suppressed is preferentially used for the blend processing. Further, regarding pixels of the first RGB image in which the false color is less likely to be generated, the first RGB image having high color reproduction is preferentially used for the blend processing.

The blend processing unit 87 performs the blend processing of blending the first RGB image and the second RGB image in accordance with the blend coefficient calculated by the blend coefficient calculation unit 85. The blend processing performed by the blend processing unit 87 may be, for example, processing of performing alpha blending by using the blend coefficient calculated for each pixel as an a value. The RGB image obtained by the blend processing by the blend processing unit 87 is supplied to the output unit 15.

Operation Example

Figure 13:
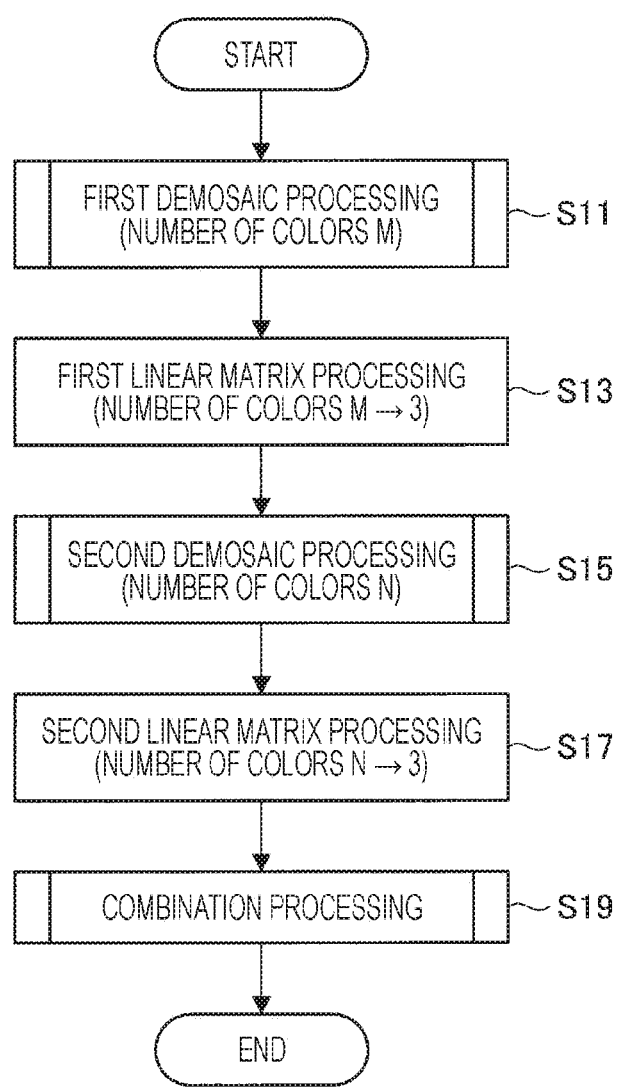
FIG. 13 is a flowchart showing an example of operation of the signal processing unit 14A.

Hereinabove, the configuration example of the signal processing unit 14A has been described. Next, an operation example of the signal processing unit 14A will be described with reference to FIGS. 13 to 16. FIG. 13 is a flowchart showing an example of operation of the signal processing unit 14A.

First, the first demosaic processing unit 142 applies the first demosaic processing to a mosaic image having the first number of colors M to generate a multispectral image having the first number of colors M (S11). Note that details of the first demosaic processing in step S11 will be described below with reference to FIG. 14.

Then, the first linear matrix processing unit 146 applies the first linear matrix processing to the multispectral image having the first number of colors M generated in step S11 to generate a first RGB image having three colors of R, G, and B (S13).

Further, the second demosaic processing unit 143 applies the second demosaic processing to the mosaic image having the first number of colors M to generate a multispectral image having the second number of colors N (S15). Note that details of the second demosaic processing in step S15 will be described below with reference to FIG. 15.

Then, the second linear matrix processing unit 147 applies the second linear matrix processing to the multispectral image having the second number of colors N generated in step S15 to generate a second RGB image having three colors of R, G, and B (S17).

Then, the combination processing unit 148 performs combination processing of the first RGB image generated in step S13 and the second RGB image generated in step S17 to generate an RGB image to be supplied to the output unit 15 (S19). Details of the combination processing in step S19 will be described below with reference to FIG. 16.

Hereinabove, the operation example of the signal processing unit 14A has been described. Note that the order in which the processing in steps S11 to S13 and the processing in steps S15 to S17 described above are executed is arbitrary, and the processing may be executed in parallel.

Figure 14:
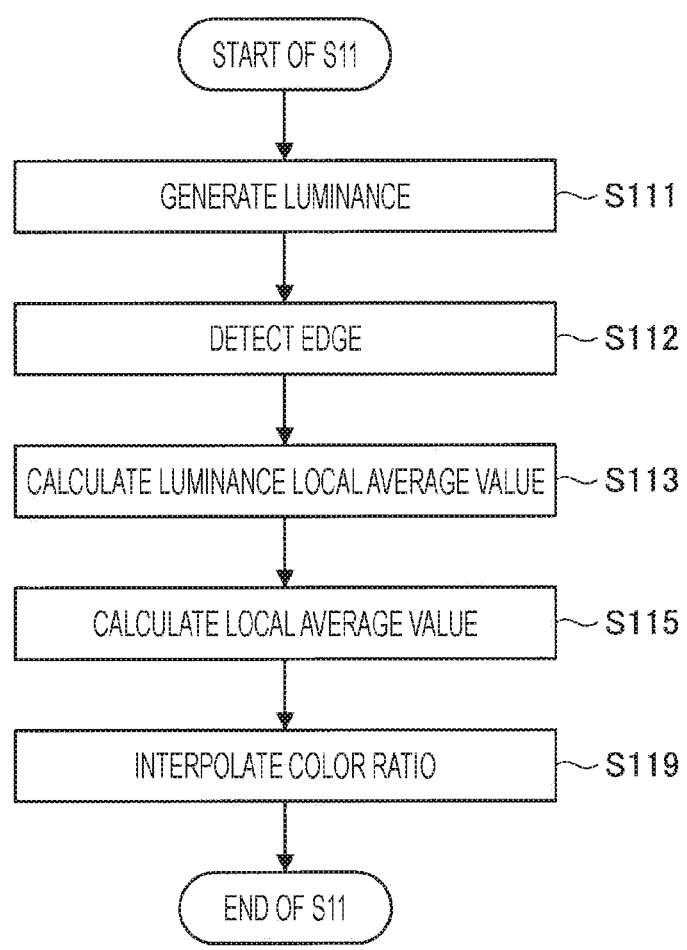
FIG. 14 is a flowchart showing details of first demosaic processing in step S11.

Next, details of the first demosaic processing in step S11 of FIG. 13 will be described with reference to FIG. 14. FIG. 14 is a flowchart showing the details of the first demosaic processing in step S11.

First, the luminance generation unit 71 of the first demosaic processing unit 142 generates luminance signals from a mosaic image having the first number of colors M (S111). Then, the edge detection unit 72 of the first demosaic processing unit 142 performs edge detection by using the luminance signals generated in step S111, thereby obtaining edge information (S112).

Then, the luminance local average value calculation unit 73 of the first demosaic processing unit 142 calculates a luminance local average value on the basis of the luminance signals generated in step S111 and the edge information obtained in step S112 (S113). Further, the local average value calculation unit 75 of the first demosaic processing unit 142 calculates a local average value on the basis of the mosaic image having the first number of colors M and the edge information obtained in step S112 (S115).

Then, the color ratio interpolation unit 78 of the first demosaic processing unit 142 interpolates a pixel value of each pixel for each color on the basis of the luminance signals generated in step S111, the luminance local average value calculated in step S113, and the local average value calculated in step S115 to generate a multispectral image having the first number of colors M (S119).

Hereinabove, the details of the first demosaic processing in step S11 have been described. Note that the order in which the processing in step S113 and the processing in step S115 described above are executed is arbitrary, and the processing may be executed in parallel.

Figure 15:
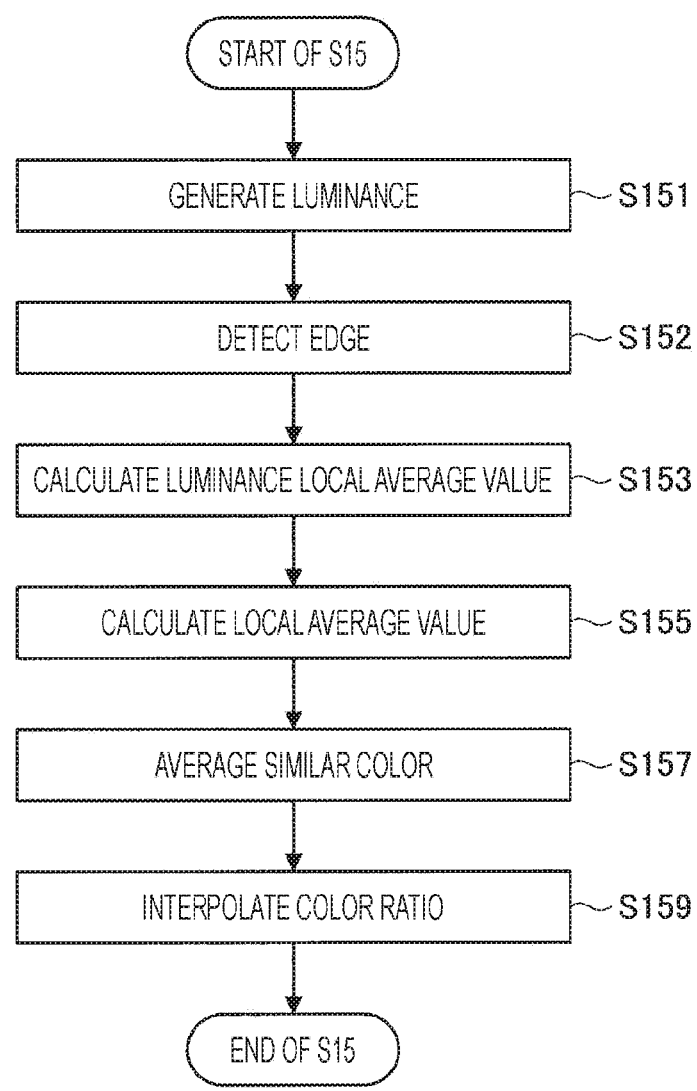
FIG. 15 is a flowchart showing details of second demosaic processing in step S15.

Next, details of the second demosaic processing in step S15 of FIG. 13 will be described with reference to FIG. 15. FIG. 15 is a flowchart showing the details of the second demosaic processing in step S15.

First, the luminance generation unit 71 of the second demosaic processing unit 143 generates luminance signals from the mosaic image having the first number of colors M (S151). Then, the edge detection unit 72 of the second demosaic processing unit 143 performs edge detection by using the luminance signals generated in step S151, thereby obtaining edge information (S152).

Then, the luminance local average value calculation unit 73 of the second demosaic processing unit 143 calculates a luminance local average value on the basis of the luminance signals generated in step S151 and the edge information obtained in step S152 (S153). Further, the local average value calculation unit 75 of the second demosaic processing unit 143 calculates local average values on the basis of the mosaic image having the first number of colors M and the edge information obtained in step S152 (S155).

Then, the similar color averaging unit 77 of the second demosaic processing unit 143 averages the local average values calculated in step S155 for each similar color, and calculates a local average value for each color averaged for each similar color (S157).

Then, the color ratio interpolation unit 79 of the second demosaic processing unit 143 interpolates a pixel value of each pixel for each color averaged for each similar color on the basis of the luminance signals generated in step S151, the luminance local average value calculated in step S153, and the local average value calculated in step S157 to generate a multispectral image having the second number of colors N (S159).

Hereinabove, the details of the second demosaic processing in step S15 have been described. Note that the order in which the processing in step S153 and the processing in steps S155 to S157 described above are executed is arbitrary, and the processing may be executed in parallel.

Figure 16:
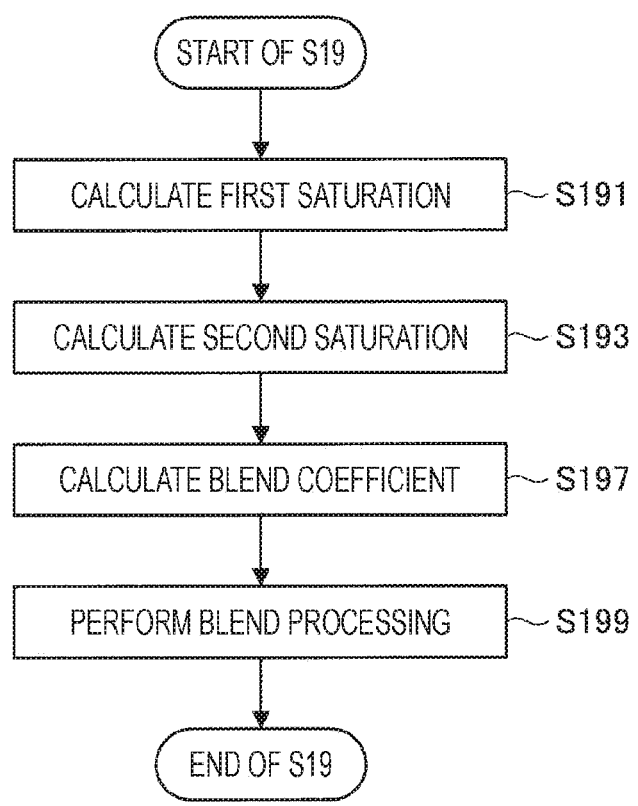
FIG. 16 is a flowchart showing details of combination processing in step S19.

Next, details of the combination processing in step S19 of FIG. 13 will be described with reference to FIG. 16. FIG. 16 is a flowchart showing the details of the combination processing in step S19.

First, the first saturation calculation unit 81 of the combination processing unit 148 calculates a saturation of the first RGB image (first saturation) generated in step S13 of FIG. 13 (S191). Further, the second saturation calculation unit 83 of the combination processing unit 148 calculates a saturation of the second RGB image (second saturation) generated in step S17 of FIG. 13 (S193).

Then, the blend coefficient calculation unit 85 of the combination processing unit 148 calculates a blend coefficient on the basis of the first saturation calculated in step S191 and the second saturation calculated in step S193 (S197).

Further, the blend processing unit 87 performs blend processing of blending the first RGB image and the second RGB image in accordance with the blend coefficient calculated in step S197 (S199).

Hereinabove, the details of the combination processing in step S19 have been described. Note that the order in which the processing in step S191 and the processing in step S193 are executed is arbitrary, and the processing may be executed in parallel.

(Effects)

Hereinabove, the configuration and operation of the signal processing unit 14A that is the first example of the signal processing unit 14 according to this embodiment have been described. As described above, according to the signal processing unit 14A, it is possible to suppress generation of a false color by reducing the number of colors in a pseudo manner. Further, it is also possible to achieve both improvement in color reproduction and suppression of generation of a false color by combining the first RGB image generated without reducing the number of colors and the second RGB image generated by reducing the number of colors in a pseudo manner on the basis of the saturations.

3-2. Second Example of Signal Processing Unit

Next, a signal processing unit 14B that is a second example of the signal processing unit 14 in FIG. 4 will be described. In the signal processing unit 14A described above, the first RGB image and the second RGB image are combined on the basis of the saturations. Meanwhile, the signal processing unit 14B described below, which is a second configuration example of the signal processing unit 14, combines the first RGB image and the second RGB image on the basis of not only the saturations but also luminance signals, thereby achieving both improvement in color reproduction and suppression of generation of a false color with higher accuracy.

Configuration Example

Figure 17:
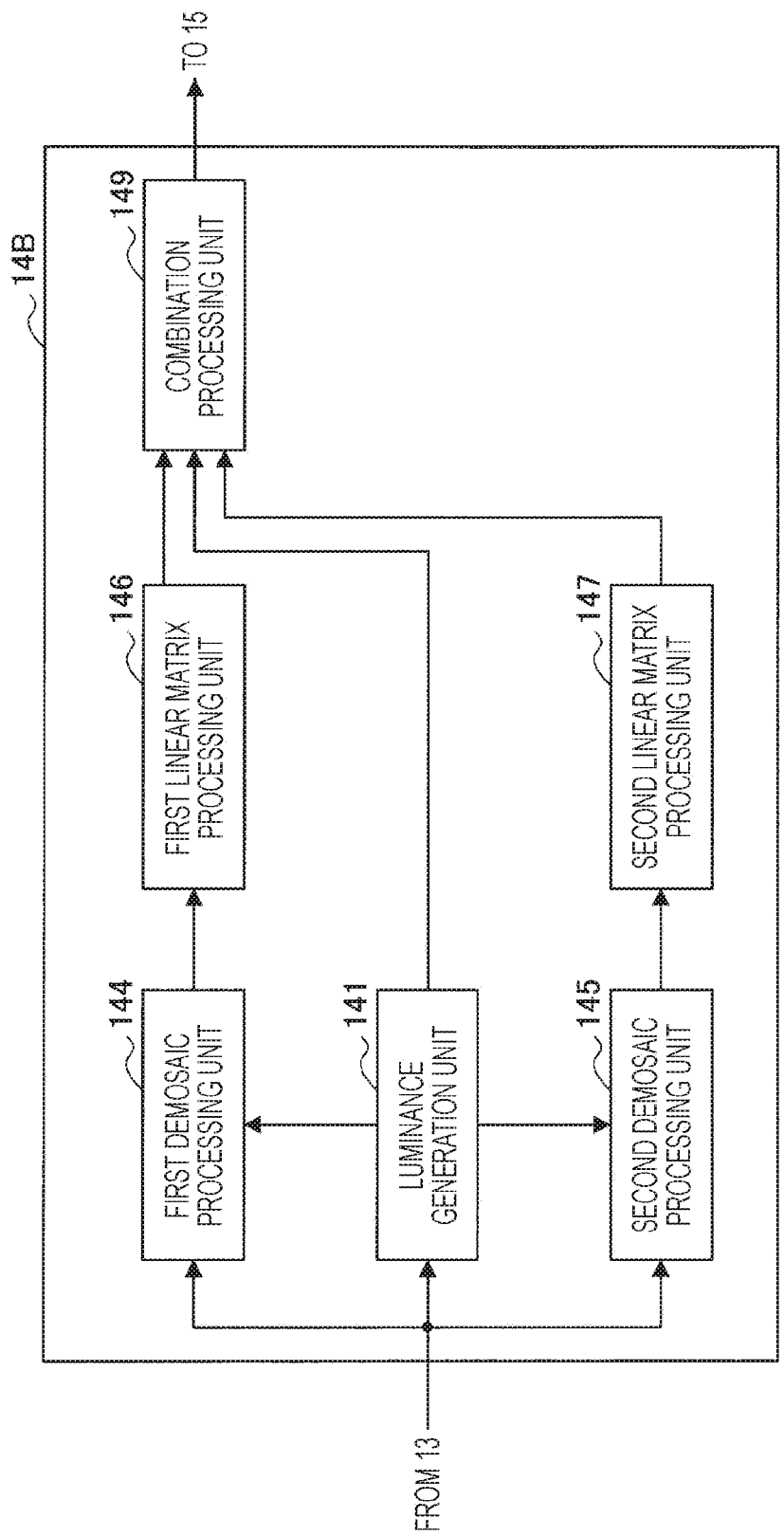
FIG. 17 is a block diagram showing a configuration of a signal processing unit 14B that is a second example of the signal processing unit 14 in FIG. 4.

FIG. 17 is a block diagram showing a configuration of the signal processing unit 14B that is the second example of the signal processing unit 14 in FIG. 4. As shown in FIG. 17, the signal processing unit 14B includes a luminance generation unit 141, a first demosaic processing unit 144, a second demosaic processing unit 145, a first linear matrix processing unit 146, and a second linear matrix processing unit 147, and a combination processing unit 149. Note that, among the configurations shown in FIG. 17, configurations having substantially the same functional configurations as the configurations shown in FIG. 5 will be denoted by the same reference signs, and description thereof will be appropriately omitted.

The luminance generation unit 141, as well as the luminance generation unit 71 described with reference to FIG. 6, generates luminance signals on the basis of a mosaic image provided from the memory 13. The luminance generation unit 141 supplies the generated luminance signals to the first demosaic processing unit 144 and the second demosaic processing unit 145.

The first demosaic processing unit 144 and the second demosaic processing unit 145 apply demosaic processing to the mosaic image having the first number of colors acquired by the imaging element 12 and stored in the memory 13, thereby generating multispectral images. Note that the first demosaic processing unit 144 and the second demosaic processing unit 145 is simply and collectively referred to as demosaic processing units included in the signal processing unit 14B in some cases.

Figure 18:
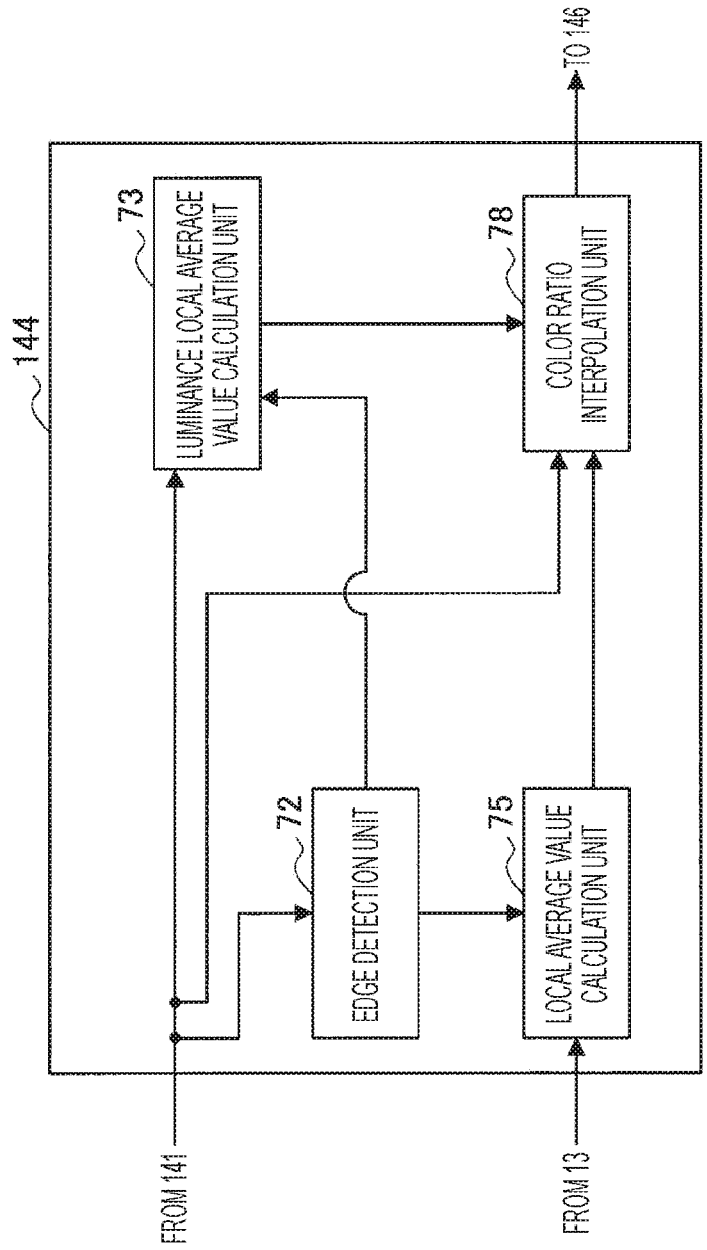
FIG. 18 is a block diagram showing a configuration of a first demosaic processing unit 144.

The first demosaic processing unit 144 applies the demosaic processing to the mosaic image having the first number of colors M provided from the memory 13, thereby generating a multispectral image having the first number of colors M. FIG. 18 is a block diagram showing a configuration of the first demosaic processing unit 144.

Figure 19:
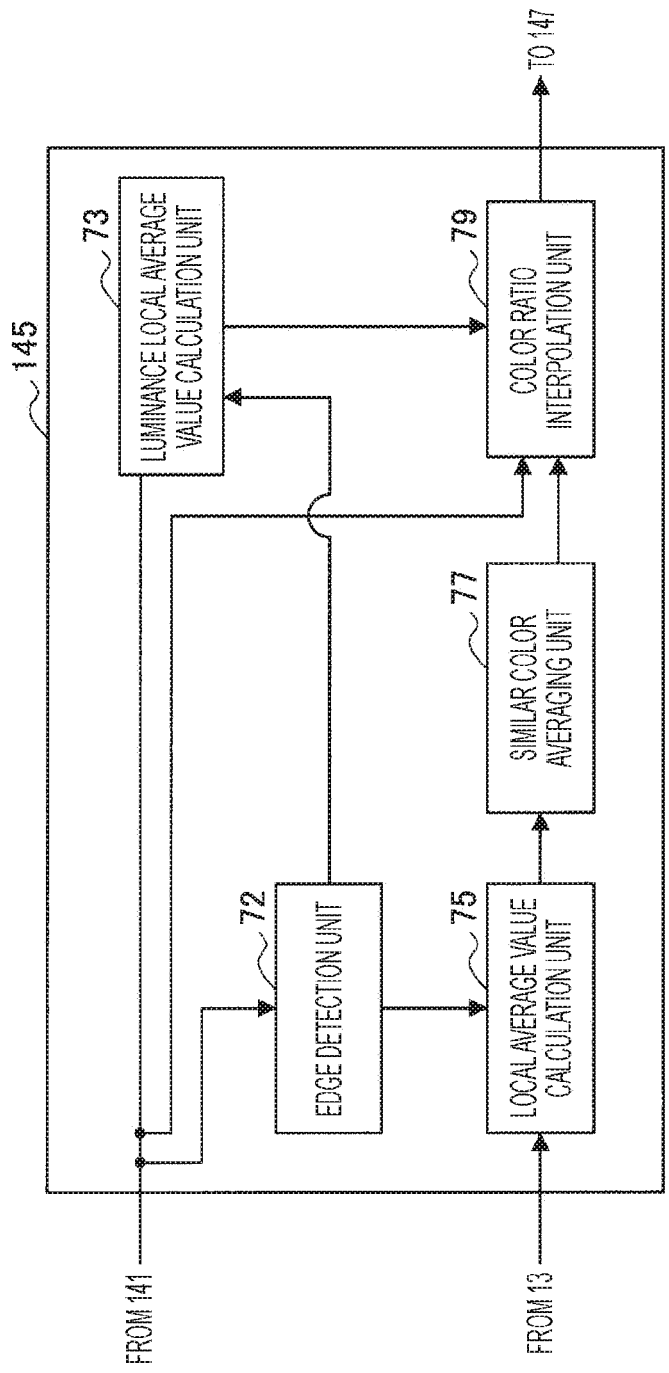
FIG. 19 is a block diagram showing a configuration of a second demosaic processing unit 145.

Further, the second demosaic processing unit 143 applies the demosaic processing to the mosaic image having the first number of colors M provided from the memory 13, thereby generating a multispectral image having the second number of colors N more than three but less than the first number of colors M. FIG. 19 is a block diagram showing a configuration of the second demosaic processing unit 145.

Further, among the configurations shown in FIGS. 18 and 19, configurations having substantially the same functional configuration as the configurations shown in FIGS. 6 and 9 will be denoted by the same reference signs, and description thereof will be appropriately omitted. Referring to FIGS. 18 and 19, the demosaic processing unit included in the signal processing unit 14B does not include the luminance generation unit 71, which is different from the demosaic processing unit included in the signal processing unit 14A shown in FIGS. 6 and 9. In other words, as compared to the signal processing unit 14A, the signal processing unit 14B can perform common processing regarding generation of luminance signals. This reduces a processing load.

Referring back to FIG. 17, description of the signal processing unit 14B will be continued. The combination processing unit 149, as well as the combination processing unit 148 described with reference to FIGS. 6 and 12, performs combination processing of the first RGB image generated by the first linear matrix processing unit 146 and the second RGB image generated by the second linear matrix processing unit 147. However, the combination processing unit 149 is different from the combination processing unit 148 in that the combination processing unit 149 performs the combination processing on the basis of the luminance signals generated by the luminance generation unit 141. Hereinafter, a detailed configuration of the combination processing unit 149 will be described with reference to FIG. 20.

Figure 20:
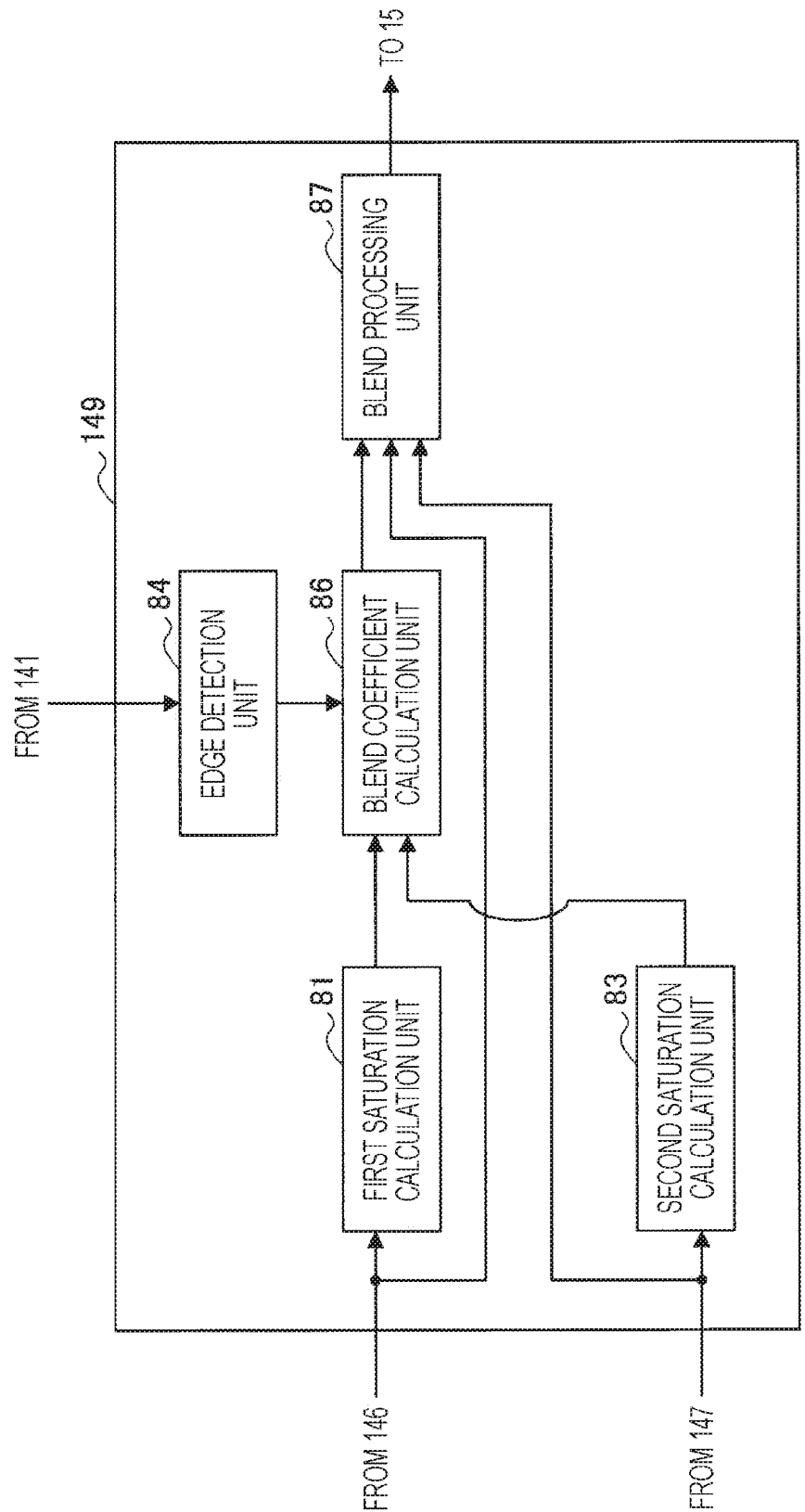
FIG. 20 is a block diagram showing a detailed configuration of a combination processing unit 149.

FIG. 20 is a block diagram showing the detailed configuration of the combination processing unit 149. As shown in FIG. 20, the combination processing unit 149 includes the first saturation calculation unit 81, the second saturation calculation unit 83, an edge detection unit 84, a blend coefficient calculation unit 86, and the blend processing unit 87. Note that processing performed by the first saturation calculation unit 81, the second saturation calculation unit 83, the edge detection unit 84, the blend coefficient calculation unit 86, and the blend processing unit 87 will be collectively referred to as combination processing performed by the combination processing unit 149. Further, among the configurations shown in FIG. 20, configurations having substantially the same functional configurations as the configurations shown in FIG. 12 will be denoted by the same reference signs, and description thereof will be appropriately omitted.

The edge detection unit 84 performs edge detection by using the luminance signals generated by the luminance generation unit 141, thereby obtaining edge information. As described above, the edge information may include the information indicating presence or absence of the edge and the information indicating the strength of the edge. The edge detection unit 84 supplies the edge information to the blend coefficient calculation unit 86.

The blend coefficient calculation unit 86, as well as the blend coefficient calculation unit 85 in FIG. 12, calculates (determines) a blend coefficient to be used in the blend processing performed by the blend processing unit 87. However, the blend coefficient calculation unit 86 may calculate (determine) the blend coefficient on the basis of not only the first saturation calculated by the first saturation calculation unit 81 and the second saturation calculated by the second saturation calculation unit 83 but also the edge information supplied from the edge detection unit 84.

As described above, the edge information indicates high-frequency components existing in the image, and a region where the edge exists contains a large number of high-frequency components, and more high-frequency components are contained as the strength of the edge is higher. Referring to Table 1, the second RGB image generated by reducing the number of colors in a pseudo manner is advantageous in a region containing high-frequency components, and the first RGB image generated without reducing the number of colors is advantageous in a region containing no high-frequency components. Thus, the blend coefficient calculation unit 86 may calculate the blend coefficient so that, for example, the second RGB image is prioritized in a case where the edge exists and the first RGB image is prioritized in a case where no edge exists. Alternatively, the blend coefficient calculation unit 86 may calculate the blend coefficient in accordance with the strength of the edge so that the second RGB image is prioritized more as the edge is stronger.

With such a configuration, regarding pixels containing high-frequency components, the second RGB image in which generation of a false color is suppressed is preferentially used for the blend processing. Further, regarding pixels containing no high-frequency components, the first RGB image having high color reproduction is preferentially used for the blend processing.

Note that the method of calculating the blend coefficient performed by the blend coefficient calculation unit 86 may be a calculation method obtained by appropriately combining the method of calculating a blend coefficient based on saturations and the method of calculating a blend coefficient based on edge information. For example, the blend coefficient calculation unit 86 may calculate the blend coefficient by statistically processing (e.g., averaging) a value obtained by the method of calculating a blend coefficient based on saturations and a value obtained by the method of calculating a blend coefficient based on edge information. Alternatively, the blend coefficient calculation unit 86 may calculate the blend coefficient so as to prioritize the first RGB image in a case where a value obtained by subtracting the second saturation from the first saturation is equal to or smaller than a predetermined threshold and no edge exists and prioritize the second RGB image in other cases.

Operation Example

Figure 21:
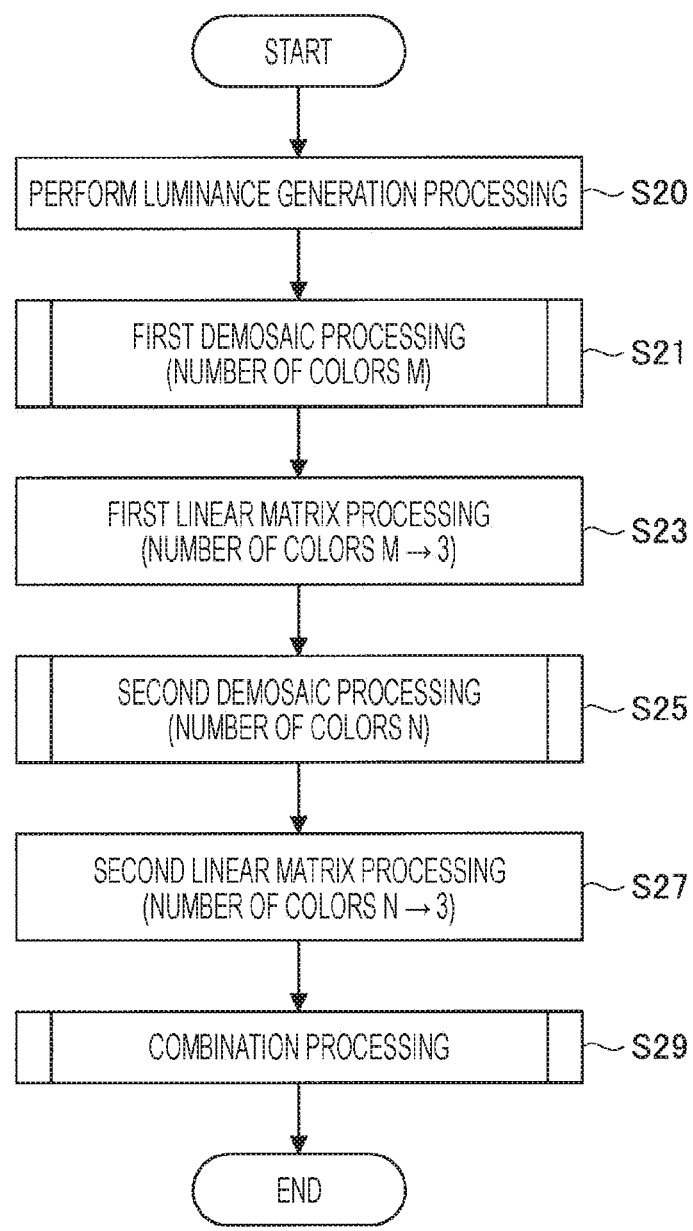
FIG. 21 is a flowchart showing an example of operation of the signal processing unit 14B.

Hereinabove, the configuration example of the signal processing unit 14B has been described. Next, an operation example of the signal processing unit 14B will be described with reference to FIGS. 21 and 22. FIG. 21 is a flowchart showing an example of operation of the signal processing unit 14B.

First, the luminance generation unit 141 generates luminance signals for generating luminance signals from a mosaic image having the first number of colors M (S20).

Then, the first demosaic processing unit 142 applies the first demosaic processing to the mosaic image having the first number of colors M to generate a multispectral image having the first number of colors M (S21). Note that the first demosaic processing in step S21 is processing obtained by eliminating the luminance generation processing in step S111 from the first demosaic processing in step S11 described with reference to FIG. 14, and thus detailed description thereof will be omitted.

Then, the first linear matrix processing unit 146 applies the first linear matrix processing to the multispectral image having the first number of colors M generated in step S21 to generate a first RGB image having three colors of R, G, and B (S23).

Further, the second demosaic processing unit 145 applies the second demosaic processing to the mosaic image having the first number of colors M to generate a multispectral image having the second number of colors N (S25). Note that the second demosaic processing in step S25 is processing obtained by eliminating the luminance generation processing in step S151 from the second demosaic processing in step S15 described with reference to FIG. 15, and thus detailed description thereof will be omitted.

Then, the second linear matrix processing unit 147 applies the second linear matrix processing to the multispectral image having the second number of colors N generated in step S25 to generate a second RGB image having three colors R, G, and B (S27).

Then, the combination processing unit 149 performs combination processing of the first RGB image generated in step S23 and the second RGB image generated in step S27 to generate an RGB image to be supplied to the output unit 15 (S29). Details of the combination processing in step S29 will be described below with reference to FIG. 22.

Hereinabove, the operation example of the signal processing unit 14B has been described. Note that the order in which the processing in steps S21 to S23 and the processing in steps S25 to S27 described above are executed is arbitrary, and the processing may be executed in parallel.

Figure 22:
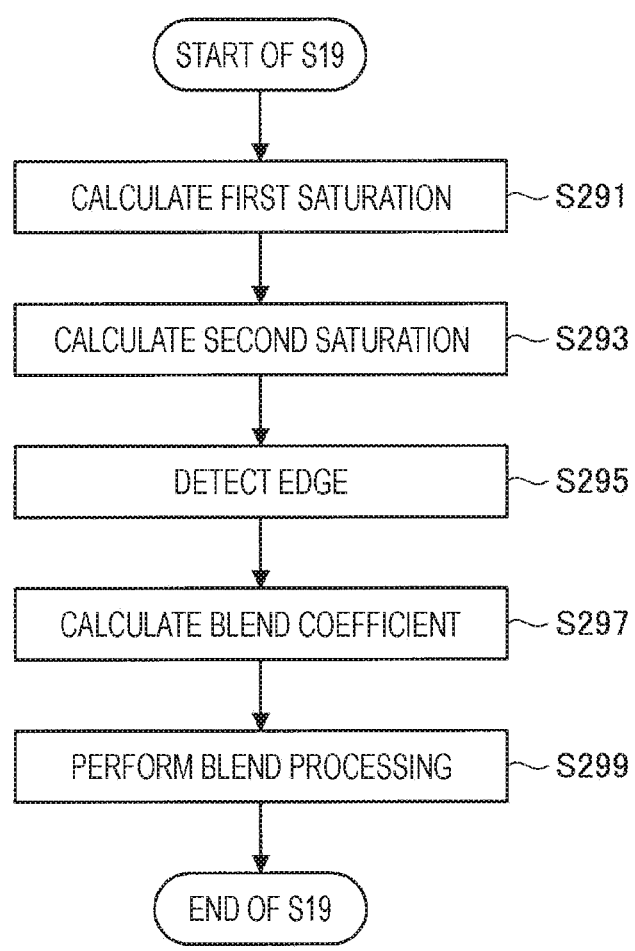
FIG. 22 is a flowchart showing details of combination processing in step S29.

Next, details of the combination processing in step S29 shown in FIG. 21 will be described with reference to FIG. 22. FIG. 22 is a flowchart showing the details of the combination processing in step S29.

First, the first saturation calculation unit 81 of the combination processing unit 149 calculates a saturation of the first RGB image (first saturation) generated in step S23 of FIG. 21 (S291). Further, the second saturation calculation unit 83 of the combination processing unit 149 calculates a saturation of the second RGB image (second saturation) generated in step S27 of FIG. 21 (S293).

Then, the edge detection unit 84 of the combination processing unit 149 performs edge detection by using the luminance signal generated in step S20 of FIG. 21 to obtain edge information (S295).

Then, the blend coefficient calculation unit 86 of the combination processing unit 149 calculates a blend coefficient on the basis of the first saturation calculated in step S291, the second saturation calculated in step S293, and the edge information calculated in step S295 (S297).

Further, the blend processing unit 87 performs blend processing of blending the first RGB image and the second RGB image in accordance with the blend coefficient calculated in step S297 (S299).

Hereinabove, the details of the combination processing in step S29 have been described. Note that the order in which the processing in step S291, the processing in step S293, and the processing in step S295 described above are executed is arbitrary, and the processing may be executed in parallel.

(Effects)

Hereinabove, the configuration and operation of the signal processing unit 14B that is the second example of the signal processing unit 14 according to this embodiment have been described. As described above, according to the signal processing unit 14B, it is possible to suppress a processing amount by performing common processing regarding generation of luminance signals. Further, it is also possible to achieve both improvement in color reproduction and suppression of generation of a false color with higher accuracy by combining the first RGB image and the second RGB image on the basis of not only saturations but also edge information.

3-3. Modification Examples

Hereinabove, the signal processing unit 14A and the signal processing unit 14B have been described as examples of the signal processing unit 14 according to this embodiment. However, this embodiment is not limited to such examples. Hereinafter, some modification examples of the signal processing unit 14 according to this embodiment will be described. Note that each of the modification examples described below may be applied to this embodiment independently or in combination. Further, each modification example may be applied instead of the above-described configurations, or may be additionally applied to the above-described configurations.

Modification Example 1

The above description provides an example where luminance signals are generated by applying a predetermined filter to a mosaic image has been described. However, this embodiment is not limited to such an example. For example, it is also possible to generate luminance by using color ratio interpolation.

As described above in the description regarding the color ratio interpolation unit 78, in a case where color signals have a strong positive correlation, a ratio between average values of two signals in a local region is substantially equal to a ratio between the two signals. In a case where a pixel value $C_1(x)$ of a color $C_1$ at a pixel position x has already been obtained, a pixel value $C_2(x)$ of a color $C_2$ having a high spectral sensitivity correlation with the color $C_1$ at the pixel position x can be interpolated as in Expression (3) below. Note that, in Expression (3), a local average value of the color $C_1$ at the pixel position x is denoted by $mC_1(x)$, and a local average value of the color $C_2$ at the pixel position x is denoted by $mC_2(x)$.

[Math. 3]

$$C_2(x) = C_1(x)\frac{mC_2(x)}{mC_1(x)} \quad (3)$$

A luminance signal in which pixel values of all colors are averaged is generated at each pixel position by repeatedly identifying a pixel value of an unknown color at each pixel position and averaging the respective obtained pixel values with the use of a combination of similar colors (colors having a high correlation of spectral sensitivity) as in Expression (3).

With such a configuration, a more accurate luminance signal can be generated.

Modification Example 2

Further, the above description provides an example where the second demosaic processing unit calculates a local average value for each color and then averages similar colors. However, averaging of similar colors and calculation of a local average may be simultaneously performed.

For example, in calculation of the local average value, a local average value averaged for each similar color is calculated by adding and averaging pixel values without distinguishing similar colors.

Modification Example 3

Further, the above description provides an example where the second number of colors N is set in advance. However, this embodiment is not limited to such an example. For example, the second number of colors N may be automatically determined in accordance with an image.

As shown in Table 1, it is desirable to reduce the number of colors in a pseudo manner in a case where a subject contains high-frequency components, and it is desirable not to reduce the number of colors in view of color reproduction in a case where the subject contains no high-frequency components. Therefore, the second number of colors N may be determined on the basis of edge information obtained by edge detection or the like so that the second number of colors N is reduced in a case where an image contains a large number of high-frequency components and the second number of colors N is increased in a case where the image contains a small number of high-frequency components. In such a case, the coefficient of the linear matrix used by the second linear matrix processing unit 147 may also be automatically determined, and, for example, a linear matrix corresponding to the number of colors may be selected from a plurality of prepared linear matrices.

With such a configuration, the number of colors to be reduced in a pseudo manner is determined in accordance with high-frequency components contained in an image, and thus it is possible to achieve both improvement in color reproduction and suppression of generation of a false color with higher accuracy.

Modification Example 4

The above description provides an example where demosaic processing is performed by color ratio interpolation. However, the demosaic processing may include other interpolation processing such as color difference interpolation instead of or in addition to the color ratio interpolation. Further, the signal processing unit 14 may perform signal processing other than the above signal processing. For example, the signal processing unit 14 may perform processing such as noise reduction and white balance adjustment.

4. IMAGING ELEMENT

Hereinabove, the signal processing unit 14 according to the embodiment of the present disclosure has been described. Next, the imaging element 12 according to the embodiment of the present disclosure will be described with reference to FIGS. 23 to 35.

4-1. Example of Color Filter Array of Imaging Element

The above description provides an example where the present technology is applied to the color filter array CFA81 shown in FIG. 1. However, the present technology is not limited to a specific color filter array and is applicable to various color filter arrays. A color filter array in a case where the number of colors is larger than three on the basis of the Bayer array will be described as an example.

FIGS. 23 and 24 are explanatory diagrams showing examples of the color filter array of the imaging element 12. Color filter arrays CFA41 to CFA43 shown in FIG. 23 are examples of a color filter array in a case where a color filter has four colors. As shown in FIG. 23, one of filters of four different colors C1 to C4 is allocated to each pixel position in the color filter arrays CFA41 to CFA43.

Further, the color filter arrays CFA51 to CFA53 shown in FIG. 23 are examples of a color filter array in a case where a color filter has five colors. As shown in FIG. 23, one of filters of five different colors C1 to C5 is allocated to each pixel position in the color filter arrays CFA51 to CFA53.

Further, the color filter array CFA61 shown in FIG. 24 is an example of a color filter array in a case where a color filter has six colors. As shown in FIG. 24, one of filters of six different colors C1 to C6 is allocated to each pixel position in the color filter array CFA61.

Further, color filter arrays CFA101 and CFA102 shown in FIG. 24 are examples of a color filter array in a case where a color filter has ten colors. As shown in FIG. 24, one of filters of ten different colors C1 to C10 is allocated to each pixel position in the color filter arrays CFA101 and CFA102.

Further, color filter arrays CFA121 and CFA122 shown in FIG. 24 are examples of a color filter array in a case where a color filter has twelve colors. As shown in FIG. 24, one of filters of twelve different colors C1 to C12 is allocated to each pixel position in the color filter arrays CFA121 and CFA122.

Further, a color filter array CFA161 shown in FIG. 24 is an example of a color filter array in a case where a color filter has sixteen colors. As shown in FIG. 24, one of filters of sixteen different colors C1 to C16 is allocated to each pixel position in the color filter array CFA61.

Note that, as described above, the present technology is not limited to the examples shown in FIGS. 23 and 24, and is also applicable to still another color filter array.

4-2. Configuration Example of Circuit of Imaging Element

Figure 25:
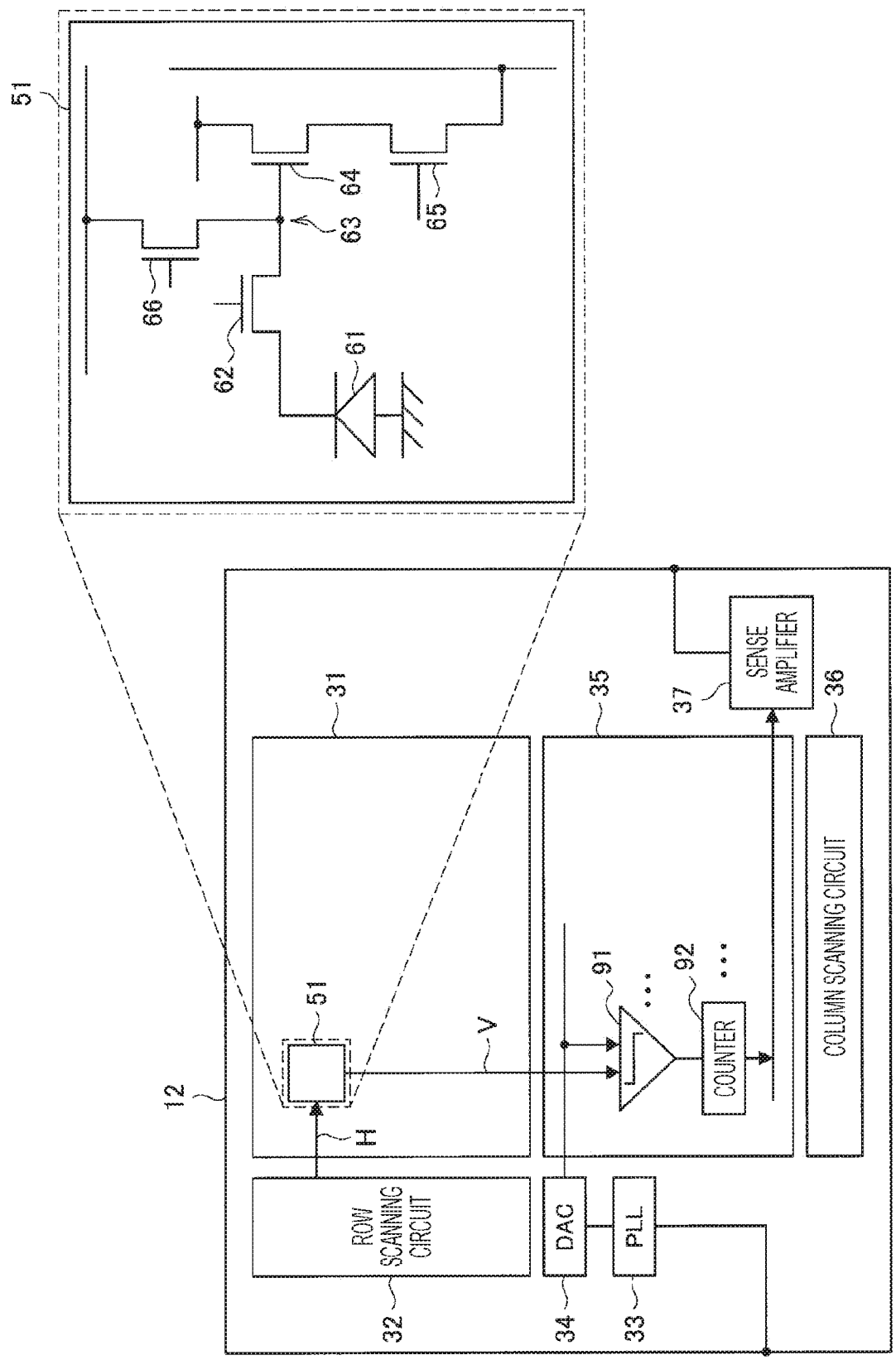
FIG. 25 is a block diagram showing a configuration example of a circuit of the imaging element 12 in FIG. 4.

Next, a configuration example of a circuit of the imaging element 12 will be described with reference to FIG. 25. FIG. 25 is a block diagram showing the configuration example of the circuit of the imaging element 12 in FIG. 4.

The imaging element 12 includes a pixel array 31, a row scanning circuit 32, a phase locked loop (PLL) 33, a digital analog converter (DAC) 34, a column analog digital converter (ADC) circuit 35, a column scanning circuit 36, and a sense amplifier 37.

In the pixel array 31, a plurality of pixels 51 is two-dimensionally arrayed.

Each pixel 51 is disposed at a point where a horizontal signal line H connected to the row scanning circuit 32 and a vertical signal line V connected to the column ADC circuit 35 intersect, and includes a photodiode 61 for performing photoelectric conversion and several kinds of transistors for reading accumulated signals. That is, as shown in an enlarged part on the right side of FIG. 25, the pixel 51 includes the photodiode 61, a transfer transistor 62, a floating diffusion 63, an amplification transistor 64, a selection transistor 65, and a reset transistor 66.

Charges accumulated in the photodiode 61 are transferred to the floating diffusion 63 via the transfer transistor 62. The floating diffusion 63 is connected to a gate of the amplification transistor 64. When the pixel 51 becomes a target from which a signal is read, the selection transistor 65 is turned on from the row scanning circuit 32 via the horizontal signal line H, and a signal of the selected pixel 51 is read to the vertical signal line V as a pixel signal corresponding to an amount of the charges accumulated in the photodiode 61 by source follower driving the amplification transistor 64. Further, the pixel signal is reset by turning on the reset transistor 66.

The row scanning circuit 32 sequentially outputs drive signals for driving (e.g., transferring, selecting, resetting or the like) the pixels 51 of the pixel array 31 in each row.

The PLL 33 generates and outputs a clock signal having a predetermined frequency required for driving each unit of the imaging element 12 on the basis of a clock signal supplied from the outside.

The DAC 34 generates and outputs a ramp signal having a shape (substantially saw shape) in which a voltage drops from a predetermined voltage value at a predetermined gradient and then returns to the predetermined voltage value.

The column ADC circuit 35 includes comparators 91 and counters 92 corresponding to the number of columns of the pixels 51 in the pixel array 31, and extracts signal levels from the pixel signals output from the pixels 51 by correlated double sampling (CDS) operation and outputs pixel data. That is, each comparator 91 compares the ramp signal supplied from the DAC 34 with the pixel signal (luminance value) output from the pixel 51, and supplies a comparison result signal obtained as a result thereof to the counter 92. Then, the counter 92 counts a counter clock signal having a predetermined frequency in accordance with the comparison result signal output from the comparator 91, thereby A/D converting the pixel signal.

The column scanning circuit 36 sequentially supplies signals for causing the counters 92 to output the pixel data to the counters 92 of the column ADC circuit 35 at a predetermined timing.

The sense amplifier 37 amplifies the pixel data supplied from the column ADC circuit 35 and outputs the amplified pixel data to the outside of the imaging element 12.

4-3. First Configuration Example of Imaging Element

Figure 26:
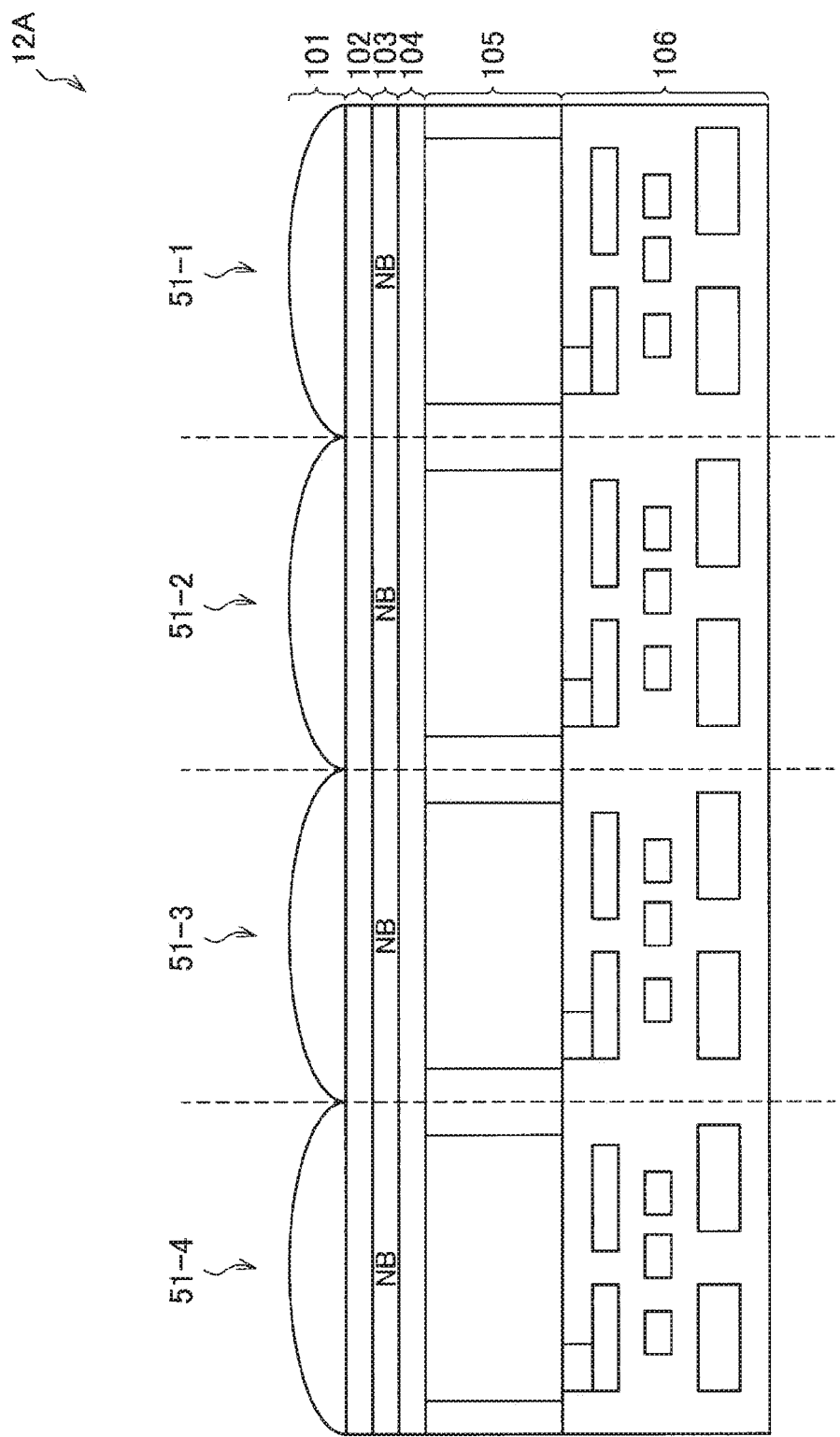
FIG. 26 schematically shows a cross section of an imaging element 12A that is a first configuration example of the imaging element 12 in FIG. 4.

FIG. 26 schematically shows a cross section of an imaging element 12A that is a first configuration example of the imaging element 12 in FIG. 4. FIG. 26 shows a cross section of four pixels 51-1 to 51-4 of the imaging element 12. Note that, hereinafter, the pixels 51-1 to 51-4 will be simply referred to as pixels 51 in a case where it is unnecessary to individually distinguish the pixels 51-1 to 51-4.

In each pixel 51, an on-chip microlens 101, an interlayer film 102, a narrowband filter layer 103, an interlayer film 104, a photoelectric conversion element layer 105, and a signal wiring layer 106 are laminated in order from the top. That is, the imaging element 12 includes a back-illuminated CMOS image sensor in which the photoelectric conversion element layer 105 is disposed on the light incident side of the signal wiring layer 106.

The on-chip microlens 101 is an optical element for condensing light on the photoelectric conversion element layer 105 of each pixel 51.

The interlayer films 102 and 104 are made from a dielectric such as SiO2. As described below, a dielectric constant of the interlayer films 102 and 104 is desirably as low as possible.

A narrowband filter NB, which is an optical filter for transmitting narrowband light in a predetermined narrow wavelength band (narrowband), is provided in the narrowband filter layer 103 of each pixel 51. For example, a plasmon filter using surface plasmons, which is a kind of a metal thin film filter including a thin film made from a metal such as aluminum, may be used for the narrowband filter NB. Further, a transmission band of the narrowband filter NB is set for each pixel 51. The number of kinds (the number of bands, i.e., the number of colors) of transmission bands of the narrowband filter NB is arbitrary, and may be, for example, larger than three as described above.

Herein, the narrowband refers to, for example, a wavelength band narrower than transmission bands of conventional color filters of red (R), green (G), and blue (B), or yellow (Y), magenta (M), and cyan (C). Further, hereinafter, a pixel that receives narrowband light transmitted through the narrowband filter NB will be referred to as multispectral pixel or MS pixel.

The photoelectric conversion element layer 105 includes, for example, the photodiode 61 in FIG. 25 and the like, receives light (narrowband light) transmitted through the narrowband filter layer 103 (narrowband filter NB), and converts the received light into charges. Further, the photoelectric conversion element layer 105 is configured so that the pixels 51 are electrically separated by an element separation layer.

In the signal wiring layer 106, a wiring for reading charges accumulated in the photoelectric conversion element layer 105, and the like are provided.

(Regarding Plasmon Filter)

Next, the plasmon filter that can be used for the narrowband filter NB will be described with reference to FIGS. 27 to 31.

Figure 27:
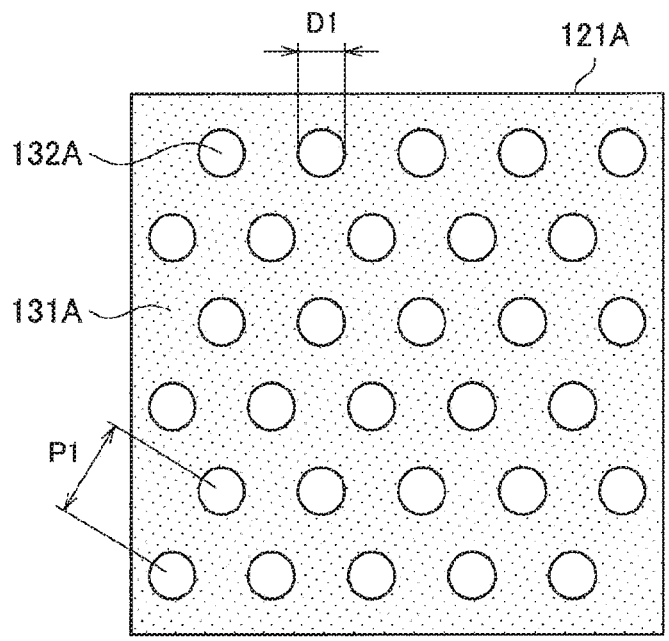
FIG. 27 shows a configuration example of a plasmon filter 121A having a hole array structure.

FIG. 27 shows a configuration example of a plasmon filter 121A having a hole array structure.

The plasmon filter 121A includes a plasmon resonator in which holes 132A are arranged in a honeycomb shape in a thin film (hereinafter, referred to as conductor thin film) 131A including a metal.

Each hole 132A penetrates the conductor thin film 131A and functions as a waveguide. The waveguide generally has a cutoff frequency and a cutoff wavelength that are determined depending on a shape such as a length of a side and a diameter, and has a property of not propagating light having a frequency lower than the cutoff frequency (having a wavelength higher than the cutoff wavelength). The cutoff wavelength of the hole 132A mainly depends on an opening diameter D1, and the cutoff wavelength is shorter as the opening diameter D1 is smaller. Note that the opening diameter D1 is set to a value smaller than a wavelength of light to be transmitted.

Meanwhile, when light enters the conductor thin film 131A in which the holes 132A are periodically formed at a short period equal to or less than the wavelength of light, the phenomenon in which light having a wavelength longer than the cutoff wavelength of the holes 132A is transmitted therethrough occurs. This phenomenon is called anomalous transmission phenomenon of plasmons. This phenomenon occurs when surface plasmons are excited at a boundary between the conductor thin film 131A and the interlayer film 102 thereon.

Note that transmittance of the plasmon filter 121A is mainly determined on the basis of the opening diameter D1 of the hole 132A. As the opening diameter D1 is increased, the transmittance is improved, but color mixture tends to occur. It is generally desirable to set the opening diameter D1 so that an aperture ratio is 50% to 60% of a hole pitch P1.

Further, as described above, each hole 132A of the plasmon filter 121A functions as a waveguide. Therefore, not only a wavelength component transmitted due to surface plasmon resonance (wavelength component in a plasmon mode) but also a wavelength component transmitted through the hole 132A (waveguide) (wavelength component in a waveguide mode) is increased in the spectral characteristics depending on a hole array pattern of the plasmon filter 121A in some cases.

As described above, the cutoff wavelength mainly depends on the opening diameter D1 of the hole 132A, and the cutoff wavelength is shorter as the opening diameter D1 is smaller. In addition, a wavelength resolution characteristic of the plasmon filter 121A is improved as a difference between the cutoff wavelength and a peak wavelength in the plasmon mode is increased.

Further, a surface plasma frequency of the conductor thin film 131A is increased as a plasma frequency of the conductor thin film 131A is increased. Further, the surface plasma frequency is increased as the dielectric constant of the interlayer film 102 is reduced. In addition, as the surface plasma frequency is increased, a higher resonance frequency of plasmons can be set, and the transmission band of the plasmon filter 121A (resonance wavelength of plasmons) can be set to a shorter wavelength band.

Therefore, the transmission band of the plasmon filter 121A can be set to a shorter wavelength band by using a metal having a lower plasma frequency for the conductor thin film 131A. For example, aluminum, silver, gold, and the like are suitable as the metal used for the conductor thin film 131A. However, in a case where the transmission band is set to a long wavelength band such as infrared light, copper and the like can be used for the conductor thin film 131A.

Further, the transmission band of the plasmon filter 121A can be set to a shorter wavelength band by using a dielectric having a smaller dielectric constant for the interlayer film 102. For example, SiO2, Low-K, and the like are suitable as the dielectric used for the interlayer film 102.

Other Examples of Plasmon Filter

Figure 28:
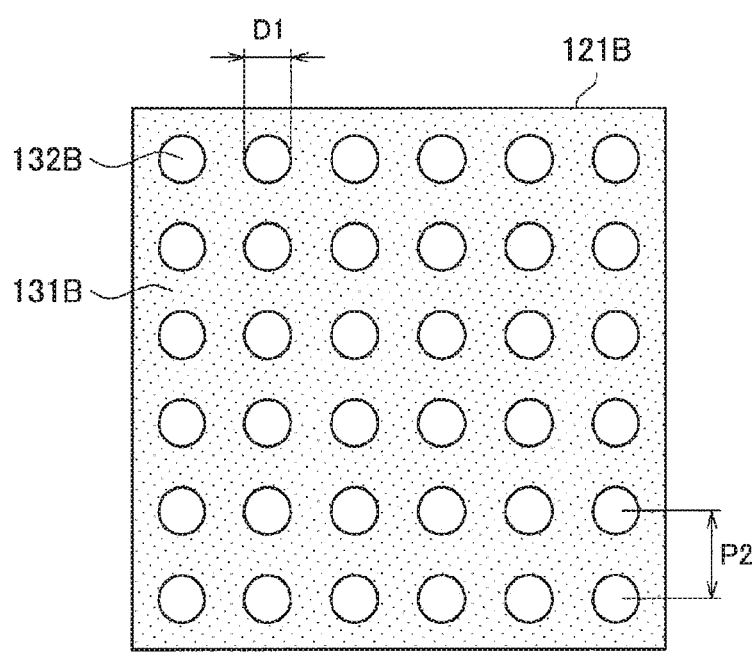
FIG. 28 shows another configuration example of the plasmon filter having the hole array structure.

Next, other examples of the plasmon filter will be described with reference to FIGS. 28 to 33. FIG. 28 shows another configuration example of the plasmon filter having the hole array structure.

A plasmon filter 121B in FIG. 28 includes a plasmon resonator in which holes 132B are arranged in an orthogonal matrix in a conductor thin film 131B. In the plasmon filter 121B, for example, the transmission band changes depending on a pitch P2 between adjacent holes 132B.

Figure 29:
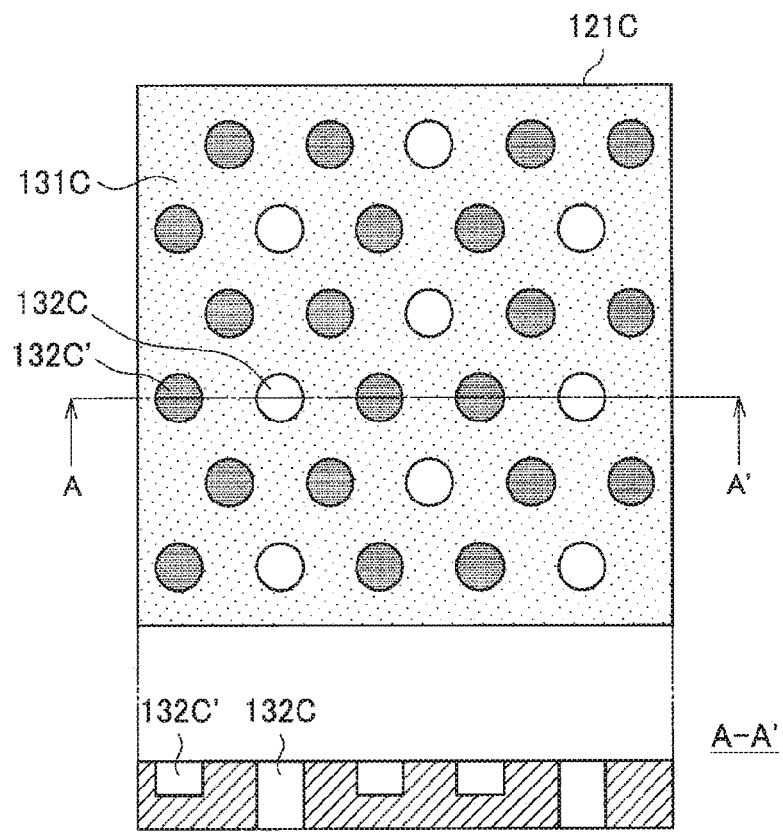
FIG. 29 shows still another configuration example of the plasmon filter having the hole array structure.

Further, in the plasmon resonator, not all holes need to penetrate the conductor thin film, and the plasmon resonator functions as a filter even in a case where some holes are non-through holes that do not penetrate the conductor thin film. FIG. 29 shows still another configuration example of the plasmon filter having the hole array structure.

For example, FIG. 29 shows a plan view and a cross-sectional view (cross-sectional view taken along the line A-A' in the plan view) of a plasmon filter 121C including a plasmon resonator in which holes 132C serving as through holes and holes 132C' serving as non-through holes are arranged in a honeycomb shape in a conductor thin film 131C. That is, the holes 132C serving as the through holes and the holes 132C' serving as the non-through holes are periodically arranged in the plasmon filter 121C.

Figure 30:
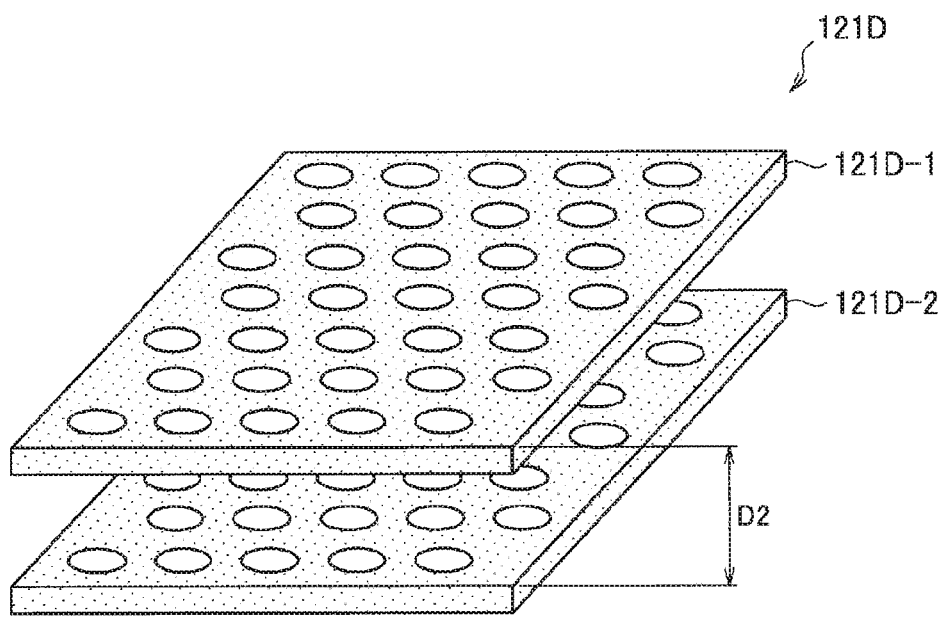
FIG. 30 shows a configuration example of a plasmon filter having a two-layer structure.

Further, the above description provides examples of the plasmon filter including a single-layer plasmon resonator. However, for example, the plasmon filter also may include a two-layer plasmon resonator. FIG. 30 shows a configuration example of a plasmon filter having a two-layer structure.

For example, a plasmon filter 121D shown in FIG. 30 includes two layers of plasmon filters 121D-1 and 121D-2. The plasmon filter 121D-1 and the plasmon filter 121D-2, as well as the plasmon resonator forming the plasmon filter 121A in FIG. 27, have a structure in which holes are arranged in a honeycomb shape.

Further, an interval D2 between the plasmon filter 121D-1 and the plasmon filter 121D-2 is preferably about ¼ of the peak wavelength of the transmission band. Further, considering a degree of design freedom, the interval D2 is more preferably equal to or less than ½ of the peak wavelength of the transmission band.

Note that the holes may be arranged in the same pattern in the plasmon filter 121D-1 and the plasmon filter 121D-2 as in the plasmon filter 121D, or, for example, the holes may be arranged in patterns similar to each other in a two-layer plasmon resonator structure. Further, in the two-layer plasmon resonator structure, holes and dots may be arranged in such a pattern that a hole array structure and a dot array structure (described below) are reversed. Furthermore, the plasmon filter 121D has a two-layer structure, but can have three or more layers.

Further, the above description provides configuration examples of the plasmon filter including the plasmon resonator having the hole array structure. However, a plasmon resonator having the dot array structure may be adopted as the plasmon filter.

Figure 31:
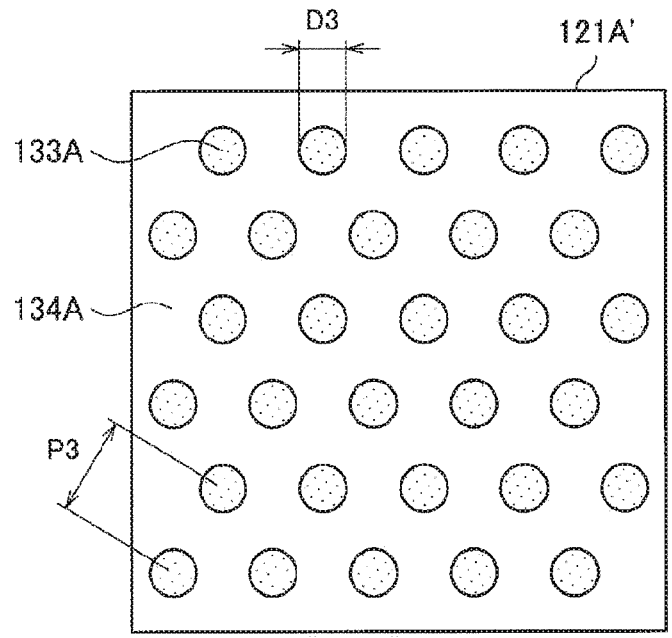
FIG. 31 shows a configuration example of a plasmon filter having a dot array structure.
Figure 32:
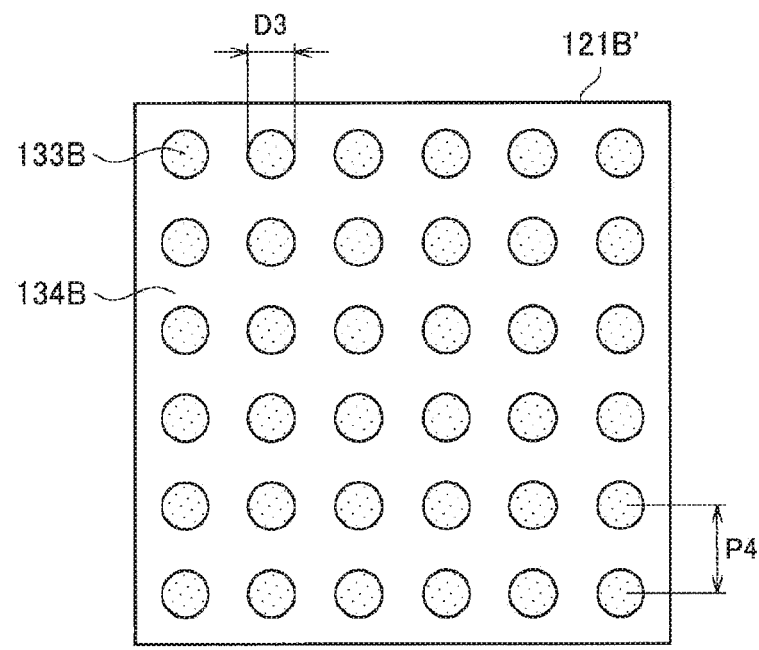
FIG. 32 shows a configuration example of a plasmon filter having a dot array structure.

Next, the plasmon filter having the dot array structure will be described with reference to FIGS. 31 and 32. FIGS. 31 and 32 show configuration examples of the plasmon filter having the dot array structure.

A plasmon filter 121A' in FIG. 31 includes a plasmon resonator having a structure in which the plasmon resonator of the plasmon filter 121A in FIG. 27 is negative-positive inverted, i.e., in which dots 133A are arranged in a honeycomb shape in a dielectric layer 134A. The dielectric layer 134A fills a space between the dots 133A.

The plasmon filter 121A' absorbs light in a predetermined wavelength band and is therefore used as a complementary color filter. A wavelength band of the light absorbed by the plasmon filter 121A' (hereinafter, referred to as absorption band) changes depending on a pitch (hereinafter, referred to as dot pitch) P3 between adjacent dots 133A, or the like. Further, a diameter D3 of the dot 133A is adjusted in accordance with the dot pitch P3.

A plasmon filter 121B' in FIG. 32 has a structure in which the plasmon resonator of the plasmon filter 121B in FIG. 28 is negative-positive inverted, i.e., a plasmon resonator structure in which dots 133B are arranged in an orthogonal matrix in a dielectric layer 134B. The dielectric layer 134B fills a space between the dots 133B.

An absorption band of the plasmon filter 121B' changes depending on a dot pitch P4 between adjacent dots 133B, or the like. Further, the diameter D3 of the dot 133B is adjusted in accordance with the dot pitch P4.

Note that, in both the plasmon filters having the hole array structure and the dot array structure, the transmission band or absorption band can be adjusted only by adjusting the pitch of the holes or dots in a planar direction. Therefore, for example, the transmission band or absorption band can be individually set for each pixel only by adjusting the pitch of the holes or dots in a lithography step, and thus it is possible to provide a multicolored filter with fewer steps.

Further, the plasmon filter has a thickness of about 100 to 500 nm, which is substantially the similar to that of an organic-material type color filter, and has high affinity of the process.

Figure 33:
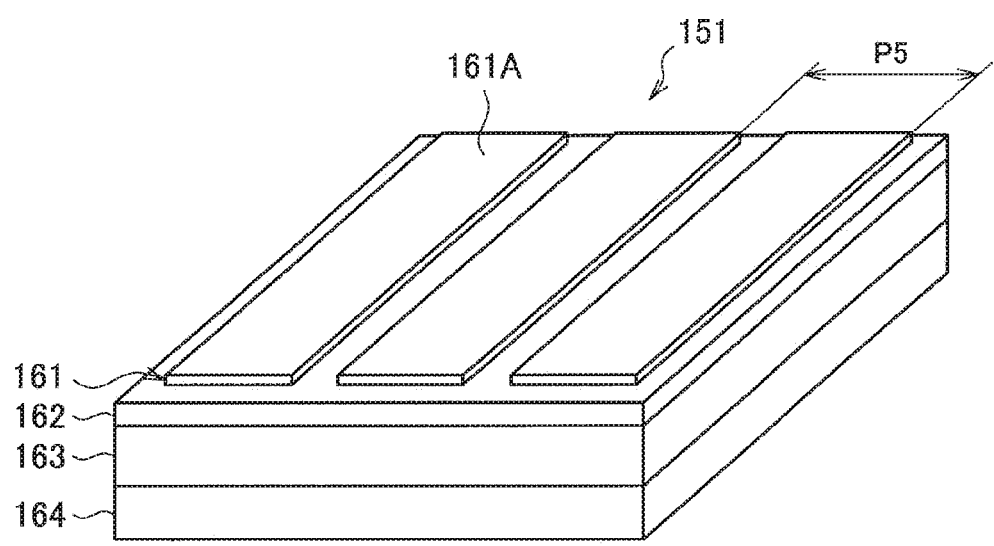
FIG. 33 shows a configuration example of a plasmon filter using GMR.

Further, a plasmon filter using guided mode resonant (GMR) can be used for the narrowband filter NB. FIG. 33 shows a configuration example of a plasmon filter using GMR.

In a plasmon filter 151, a conductor layer 161, a SiO2 film 162, a SiN film 163, and a SiO2 substrate 164 are laminated in order from the top. The conductor layer 161 is included in, for example, the narrowband filter layer 103 in FIG. 26, and the SiO2 film 162, the SiN film 163, and the SiO2 substrate 164 are included in, for example, the interlayer film 104 in FIG. 26.

On the conductor layer 161, rectangular conductor thin films 161A made from, for example, aluminum are arranged at a predetermined pitch P5 so that long sides of the conductor thin films 161A are adjacent to each other. Then, a transmission band of the plasmon filter 151 changes depending on the pitch P5 or the like.

The plasmon filter 151 using GMR, as well as the plasmon filters having the hole array structure and the dot array structure described above, has a high affinity with an organic-material type color filter.

4-4. Second Configuration Example of Imaging Element

Next, a second configuration example of the imaging element 12 in FIG. 27 will be described with reference to FIG. 34.

Figure 34:
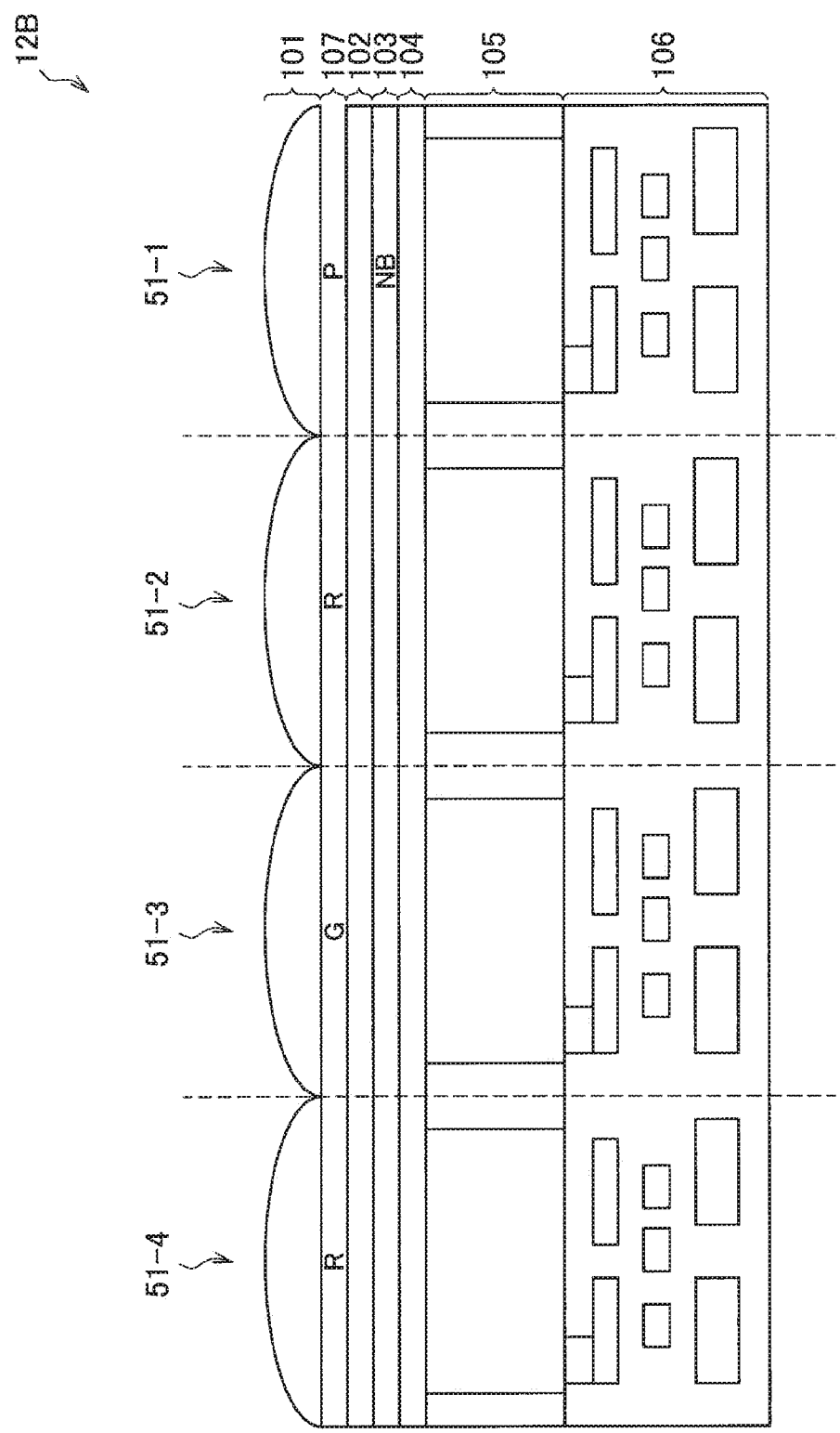
FIG. 34 schematically shows a cross section of an imaging element 12B that is a second configuration example of the imaging element 12.

FIG. 34 schematically shows a cross section of an imaging element 12B that is a second configuration example of the imaging element 12. Note that, in FIG. 34, portions corresponding to the portions in the imaging element 12A in FIG. 26 are denoted by the same reference signs, and description thereof will be appropriately omitted.

The imaging element 12B is different from the imaging element 12A in that a color filter layer 107 is laminated between the on-chip microlens 101 and the interlayer film 102.

In the narrowband filter layer 103 of the imaging element 12B, the narrowband filter NB is provided only in some pixels 51, not in all the pixels 51. The kind (number of bands) of the transmission bands of the narrowband filter NB is arbitrary, and is set to, for example, one or more.

A color filter is provided in the color filter layer 107 of each pixel 51. For example, in the pixel 51 in which no narrowband filter NB is provided, one of a general red filter R, green filter G, and blue filter B (not shown) is provided. Therefore, for example, an R pixel provided with a red filter R, a G pixel provided with a green filter G, a B pixel provided with a blue filter, and an MS pixel provided with the narrowband filter NB are arrayed in the pixel array 31.

Further, a transmission filter P is provided in the color filter layer 107 of the pixel 51 in which the narrowband filter NB is provided. As described below, the transmission filter P includes an optical filter (low-pass filter, high-pass filter, or band-pass filter) that transmits light in a wavelength band including the transmission band of the narrowband filter NB of the same pixel 51.

Note that the color filter provided in the color filter layer 107 may be either an organic-material type color filter or an inorganic-material type color filter.

Examples of the organic-material type color filter encompass a dyeing-and-coloring type color filter using a synthetic resin or natural protein and a coloring-matter-containing type color filter using pigment coloring matters or dye coloring matters.

For example, materials such as TiO2, ZnS, SiN, MgF2, SiO2, and Low-k are used for the inorganic-material type color filter. Further, for forming the inorganic-material type color filter, for example, techniques such as vapor deposition, sputtering, and chemical vapor deposition (CVD) film formation are used.

Further, the interlayer film 102 is set to have a film thickness capable of preventing the color filter layer 107 from influencing surface plasmons at an interface between the interlayer film 102 and the narrowband filter layer 103.

Further, the transmission filter P provided in the color filter layer 107 suppresses occurrence of flare.

For example, as described above, in a case where the narrowband filter NB of the narrowband filter layer 103 of the imaging element 12A in FIG. 25 includes a plasmon filter, a conductor thin film made from a metal is formed on the plasmon filter. This conductor thin film has a high reflectance and therefore tends to reflect light having a wavelength out of the transmission band. Then, in the imaging apparatus 10 including the imaging element 12A, a part of the light reflected by the conductor thin film may be reflected by an optical member included in the imaging apparatus 10 (e.g., a filter, a lens, or the like included in the optical system 11), and may be re-incident on the imaging element 12A. Such re-incident light causes flare. In particular, the plasmon filter having the hole array structure has a low aperture ratio and therefore tends to cause flare.

In order to prevent this reflected light, for example, it is conceivable to use an antireflection film made from a metal different from the conductor thin film or a material having a high dielectric constant. However, the plasmon filter uses surface plasmon resonance, and thus, if such an antireflection film is brought into contact with a surface of the conductor thin film, characteristics of the plasmon filter may be deteriorated, or a desired characteristic may be hardly obtained.

Meanwhile, as described above, in the imaging element 12B, the transmission filter P is provided above (on the light incident side of) the narrowband filter NB. Therefore, in the imaging apparatus 10 including the imaging element 12B, light incident on the imaging element 12B is incident on the narrowband filter NB after a predetermined wavelength band is cut off by the transmission filter P. This reduces an amount of light incident on the narrowband filter NB. As a result, an amount of light reflected by the conductor thin film of the narrowband filter NB (plasmon filter) is also reduced. This reduces flare.

Note that, in a case where the transmission band of the red filter R, the green filter G, or the blue filter B includes the transmission band of the lower narrowband filter NB, those filters may be used as the transmission filter P.

Further, FIG. 34 shows an example where the narrowband filters NB are provided only in some pixels 51. However, the narrowband filters NB may also be provided in all the pixels 51. In this case, the transmission filter P having a transmission band including the transmission band of the narrowband filter NB of the pixel 51 is only required to be provided in the color filter layer 107 of each pixel 51.

Further, a combination of colors of the color filters in the color filter layer 107 is not limited to the example described above, and can be arbitrarily changed.

Further, in a case where the above-described countermeasures against flare are unnecessary, for example, the transmission filter P may not be provided or a dummy filter that transmits light of all wavelengths may be provided above the narrowband filter NB.

Next, a third embodiment of the imaging element 12 in FIG. 4 will be described with reference to FIG. 35.

4-5. Third Configuration Example of Imaging Element

Figure 35:
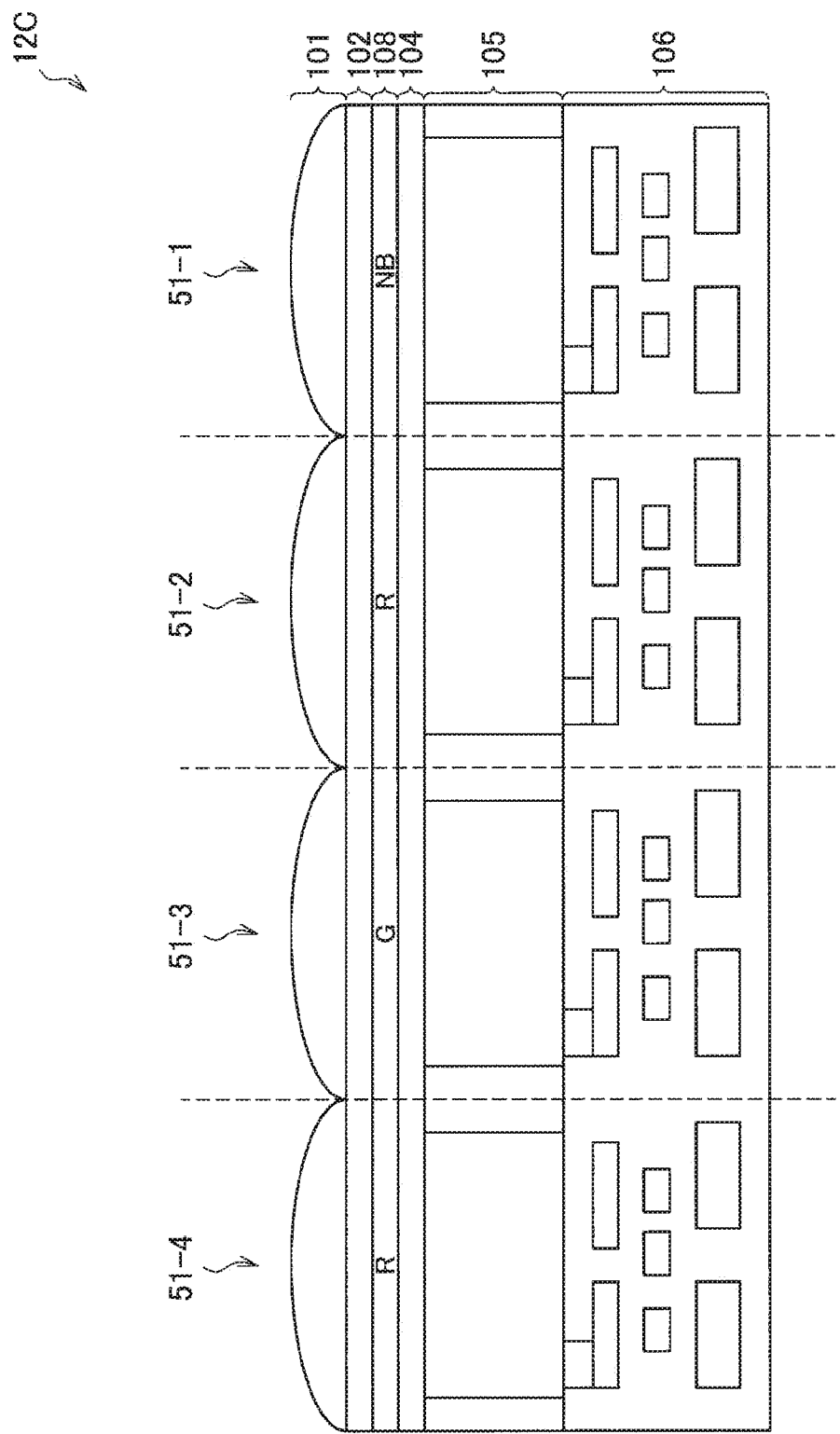
FIG. 35 schematically shows a cross section of an imaging element 12C that is a third configuration example of the imaging element 12.

FIG. 35 schematically shows a cross section of an imaging element 12C that is a third configuration example of the imaging element 12. Note that, in FIG. 34, portions corresponding to the portions in the imaging element 12A in FIG. 26 are denoted by the same reference signs, and description thereof will be appropriately omitted.

The imaging element 12C is different from the imaging element 12A in that a filter layer 108 is provided instead of the narrowband filter layer 103. Further, the imaging element 12C is different from the imaging element 12B in FIG. 34 in that the narrowband filter NB and the color filters (e.g., the red filter R, the green filter G, and the blue filter B) are provided in the same filter layer 108.

Therefore, in a case where the R pixel, the G pixel, the B pixel, and the MS pixel are arranged in the pixel array 31 of the imaging element 12C, the color filter layer 107 can be omitted.

Note that, in a case where an organic-material type color filter is used, in order to prevent damage and the like of the color filter caused by heat, for example, the narrowband filter NB is first formed, and then the color filter is formed after a final heat treatment at a high temperature is performed, such as sintering. Meanwhile, in a case where an inorganic-material type color filter is used, the above restriction on the formation order is basically unnecessary.

Further, in a case where the countermeasures against flare are taken as in the imaging element 12B in FIG. 34, a color filter layer may be laminated between the on-chip microlens 101 and the interlayer film 102 as in the imaging element 12B. In this case, the transmission filter P described above is provided in the color filter layer of the pixel 51 in which the narrowband filter NB is provided in the filter layer 108. Meanwhile, in the pixel 51 in which the color filter is provided in the filter layer 108, no filter is provided in the color filter layer, or a dummy filter that transmits light of all wavelengths or a color filter having the same color as that of the filter layer 108 is provided.

Hereinabove, the configuration example of the imaging element 12 that is an example of the imaging unit according to this embodiment has been described. However, the present technology is not limited to such an example. For example, the imaging element 12 is only required to acquire a mosaic image having more than three colors, and may be an imaging element including a metal thin film filter including a metal thin film other than the plasmon filter.

5. APPLICATION EXAMPLES

Next, application examples of the technology according to the present disclosure (present technology) will be described. The present technology is applicable to various products.

5-1. Example of Application to Endoscopic Surgery System

For example, the present technology may be applied to an endoscopic surgery system.

Figure 36:
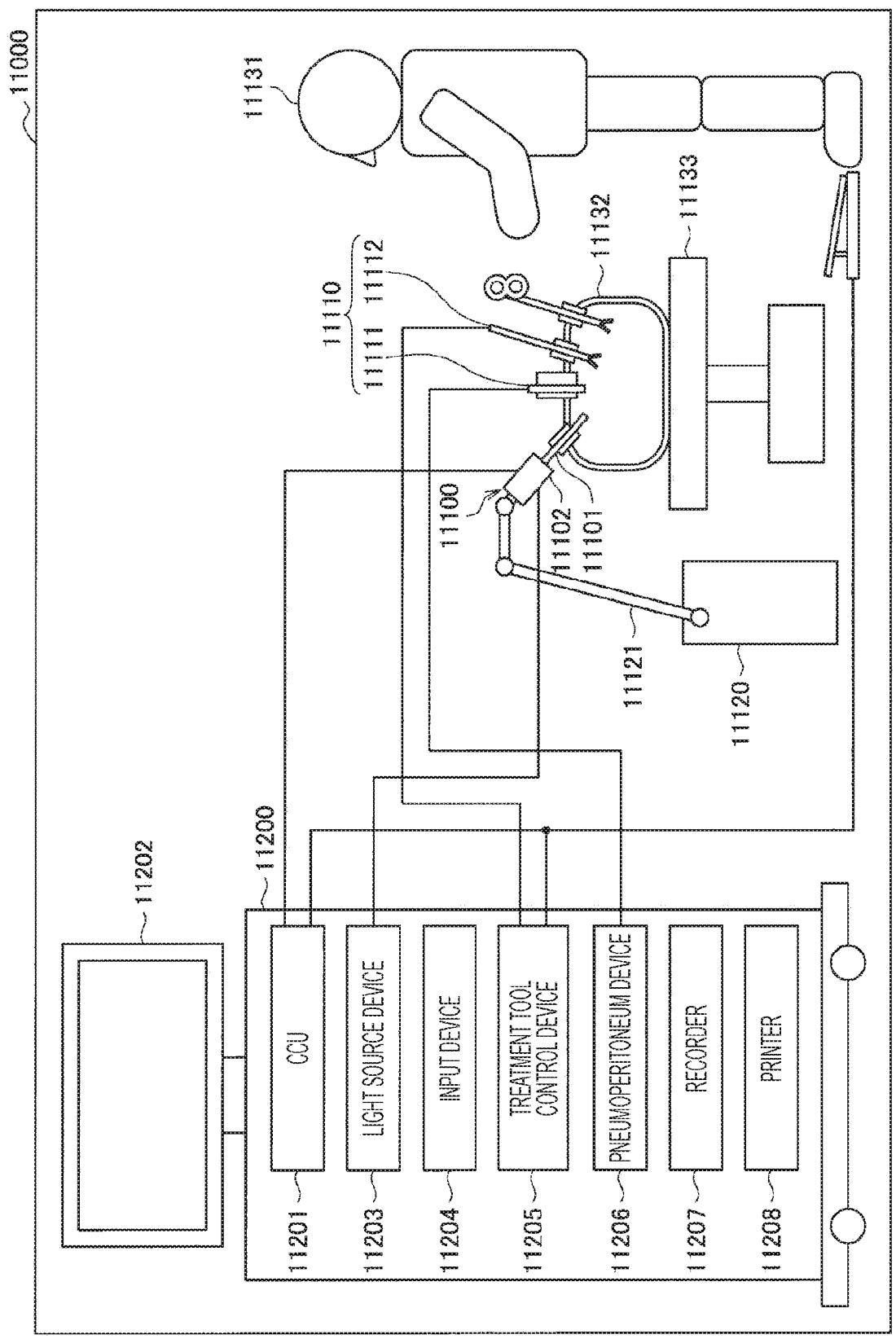
FIG. 36 shows an example of a schematic configuration of an endoscopic surgery system.

FIG. 36 shows an example of a schematic configuration of an endoscopic surgery system to which the technology according to the present disclosure (present technology) is applicable.

FIG. 36 shows a state in which an operator (doctor) 11131 performs surgery on a patient 11132 on a patient bed 11133 by using an endoscopic surgery system 11000. As shown FIG. 36, the endoscopic surgery system 11000 includes an endoscope 11100, other surgical instruments 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 whose region having a predetermined length from its tip end is inserted into a body cavity of the patient 11132 and a camera head 11102 connected to a proximal end of the lens barrel 11101. The example in FIG. 36 shows the endoscope 11100 configured as a so-called rigid endoscope having the rigid lens barrel 11101. However, the endoscope 11100 may be configured as a so-called flexible endoscope having a flexible lens barrel.

The tip end of the lens barrel 11101 has an opening into which an objective lens is fitted. The endoscope 11100 is connected to a light source device 11203, and light generated by the light source device 11203 is guided to the tip end of the lens barrel 11101 by a lightguide extending toward the inside of the lens barrel, and an observation target in the body cavity of the patient 11132 is irradiated with the light via the objective lens. Note that the endoscope 11100 may be a forward-viewing endoscope, an oblique-viewing endoscope, or a side-viewing endoscope.

An optical system and an imaging element are provided in the camera head 11102, and reflected light (observation light) from the observation target is condensed on the imaging element by the optical system. The observation light is photoelectrically converted by the imaging element, and thus an electrical signal corresponding to the observation light, i.e., an image signal corresponding to an observation image is generated. The image signal is transmitted to a camera control unit (CCU) 11201 as RAW data.

The CCU 11201 includes a central processing unit (CPU), a graphics processing unit (GPU), and the like, and comprehensively controls operation of the endoscope 11100 and a display device 11202. Further, the CCU 11201 receives an image signal from the camera head 11102, and performs various kinds of image processing for displaying an image based on the image signal, such as development processing (demosaic processing), for example, on the image signal.

Under the control of the CCU 11201, the display device 11202 displays an image based on the image signal that has been subjected to the image processing by the CCU 11201.

The light source device 11203 includes, for example, a light source such as a light emitting diode (LED), and supplies irradiation light for imaging a surgical site or the like to the endoscope 11100.

An input device 11204 is an input interface for the endoscopic surgery system 11000. A user can input various kinds of information and instructions to the endoscopic surgery system 11000 via the input device 11204. For example, the user inputs an instruction to change imaging conditions (the kind of irradiation light, magnification, a focal length, and the like) of the endoscope 11100, and the like.

A treatment tool control device 11205 controls driving of the energy treatment tool 11112 for ablation of tissue, incision, sealing of blood vessels, and the like. In order to inflate the body cavity of the patient 11132 for the purpose of securing a visual field for using the endoscope 11100 and securing a work space for the operator, a pneumoperitoneum device 11206 sends gas into the body cavity via the pneumoperitoneum tube 11111. A recorder 11207 is a device capable of recording various kinds of information regarding surgery. A printer 11208 is a device capable of printing the various kinds of information regarding the surgery in various formats such as text, images, or graphs.

Note that the light source device 11203 that supplies irradiation light used for imaging the surgical site to the endoscope 11100 can include, for example, an LED, a laser light source, or a white light source configured by a combination thereof. In a case where the white light source is configured by a combination of RGB laser light sources, it is possible to control an output intensity and output timing of each color (each wavelength) with high accuracy. Thus, white balance of a captured image can be adjusted in the light source device 11203. Further, in this case, it is also possible to capture images corresponding to RGB in time division by irradiating the observation target with laser light beams from the respective RGB laser light sources in time division and controlling driving of the imaging element of the camera head 11102 in synchronization with a timing of the irradiation. According to this method, a color image can be obtained without providing a color filter in the imaging element.

Further, driving of the light source device 11203 may be controlled to change an intensity of light to be output every predetermined time period. By controlling driving of the imaging element of the camera head 11102 in synchronization with a timing of the change in the intensity of the light to acquire images in time division and combining the images, it is possible to generate a so-called high dynamic range image having no blocked-up shadows or blown-out highlights.

Further, the light source device 11203 may be configured to supply light in a predetermined wavelength band corresponding to special light observation. In special light observation, for example, predetermined tissue such as a blood vessel in a mucous membrane surface layer is imaged with high contrast, i.e., so-called narrowband imaging is performed by emitting light in a band narrower than that of irradiation light during normal observation (i.e., white light) with the use of wavelength dependence of light absorption in body tissue. Alternatively, in special light observation, there may be performed fluorescence observation in which an image is obtained by using fluorescence generated by emitting excitation light. In fluorescence observation, for example, it is possible to obtain a fluorescence image by irradiating body tissue with excitation light and observing fluorescence from the body tissue (autofluorescence observation) or by locally injecting a reagent such as indocyanine green (ICG) into body tissue and irradiating the body tissue with excitation light corresponding to a fluorescence wavelength of the reagent. The light source device 11203 can be configured to supply narrowband light and/or excitation light corresponding to such special light observation.

Figure 37:
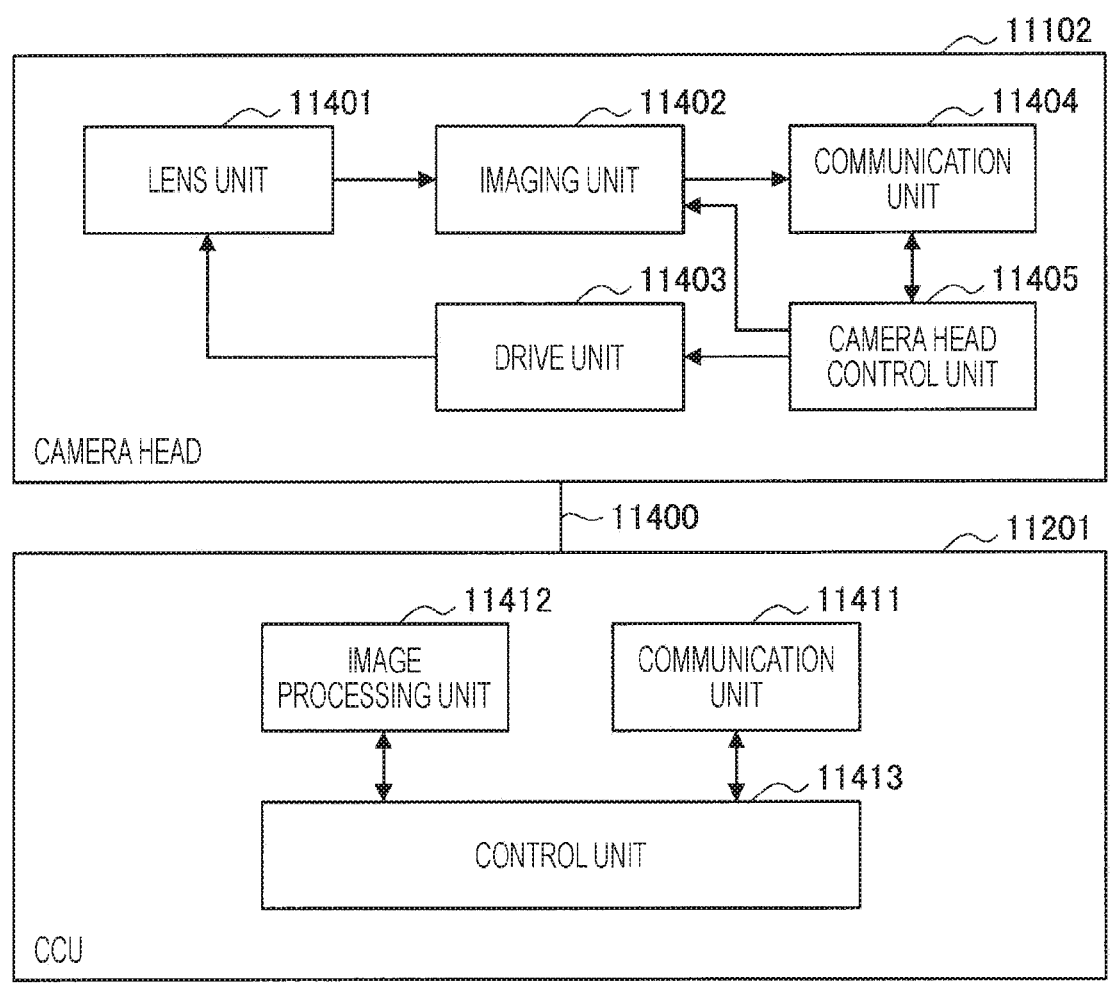
FIG. 37 is a block diagram showing an example of a functional configuration of a camera head and a CCU.

FIG. 37 is a block diagram showing an example of a functional configuration of the camera head 11102 and the CCU 11201 shown in FIG. 36.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. Observation light taken in from the tip end of the lens barrel 11101 is guided to the camera head 11102 to be incident on the lens unit 11401. The lens unit 11401 is configured by combining a plurality of lenses including a zoom lens and a focus lens.

One (so-called single-plate) or a plurality of (so-called multi-plate) imaging elements may be included in the imaging unit 11402. In a case of the multi-plate imaging unit 11402, for example, a color image may be obtained by generating image signals corresponding to each of RGB by using the respective imaging elements and combining the image signals. Alternatively, the imaging unit 11402 may include a pair of imaging elements for acquiring respective right-eye and left-eye image signals corresponding to three-dimensional (3D) display. When 3D display is performed, the operator 11131 can grasp a depth of living tissue in the surgical site more accurately. Note that, in a case of the multi-plate imaging unit 11402, a plurality of lens units 11401 may be provided so as to correspond to the respective imaging elements.

Further, the imaging unit 11402 is not necessarily provided in the camera head 11102. For example, the imaging unit 11402 may be provided inside the lens barrel 11101 immediately behind the objective lens.

The drive unit 11403 includes an actuator, and moves the zoom lens and the focus lens of the lens unit 11401 by a predetermined distance along an optical axis under the control of the camera head control unit 11405. Therefore, it is possible to appropriately adjust magnification and a focus of an image to be captured by the imaging unit 11402.

The communication unit 11404 includes a communication device for transmitting/receiving various kinds of information to/from the CCU 11201. The communication unit 11404 transmits the image signal obtained from the imaging unit 11402 as the RAW data to the CCU 11201 via the transmission cable 11400.

Further, the communication unit 11404 receives a control signal for controlling driving of the camera head 11102 from the CCU 11201 and supplies the control signal to the camera head control unit 11405. The control signal includes, for example, information regarding imaging conditions, such as information that specifies a frame rate of an image to be captured, information that specifies an exposure value at the time of capturing the image, and/or information that specifies magnification and a focus of the image to be captured.

Note that the above imaging conditions such as the frame rate, the exposure value, the magnification, and the focus may be appropriately specified by the user, or may be automatically set by the control unit 11413 of the CCU 11201 on the basis of the acquired image signal. In the latter case, the endoscope 11100 has a so-called auto exposure (AE) function, auto focus (AF) function, and auto white balance (AWB) function.

The camera head control unit 11405 controls driving of the camera head 11102 on the basis of the control signal received from the CCU 11201 via the communication unit 11404.

The communication unit 11411 includes a communication device for transmitting/receiving various kinds of information to/from the camera head 11102. The communication unit 11411 receives the image signal transmitted from the camera head 11102 via the transmission cable 11400.

Further, the communication unit 11411 transmits a control signal for controlling driving of the camera head 11102 to the camera head 11102. The image signal and the control signal can be transmitted by electrical communication, optical communication, or the like.

The image processing unit 11412 performs various kinds of image processing on the image signal serving as the RAW data transmitted from the camera head 11102.

The control unit 11413 performs various kinds of control regarding imaging the surgical site or the like using the endoscope 11100 and displaying the captured image obtained by imaging the surgical site or the like. For example, the control unit 11413 generates a control signal for controlling driving of the camera head 11102.

Further, the control unit 11413 causes the display device 11202 to display the captured image showing the surgical site or the like on the basis of the image signal subjected to the image processing by the image processing unit 11412. At this time, the control unit 11413 may recognize various objects in the captured image by using various image recognition technologies. For example, the control unit 11413 detects a shape, color, and the like of an edge of an object included in the captured image, thereby recognizing surgical instruments such as forceps, specific biological parts, bleeding, mist at the time of using the energy treatment tool 11112, and the like. When the control unit 11413 causes the display device 11202 to display the captured image, the control unit 11413 may display various kinds of surgery support information superimposed on the image of the surgical site by using a result of the recognition. By performing superimposing display of the surgery support information to present the surgery support information to the operator 11131, it is possible to reduce a burden on the operator 11131 and allow the operator 11131 to reliably perform surgery.

The transmission cable 11400 that connects the camera head 11102 and the CCU 11201 is an electrical signal cable corresponding to electric signal communication, an optical fiber corresponding to optical communication, or a composite cable thereof.

Herein, in the example shown in FIG. 37, wired communication is performed by using the transmission cable 11400. However, wireless communication may be performed between the camera head 11102 and the CCU 11201.

Hereinabove, an example of the endoscopic surgery system to which the technology according to the present disclosure is applicable has been described. The technology according to the present disclosure is applicable to, for example, the imaging unit 11402, the image processing unit 11412, and the like of the endoscope 11100 among the configurations described above. Specifically, the imaging element 12 shown in FIG. 4 is applicable to the imaging unit 11402, and the signal processing unit 14 shown in FIG. 4 is applicable to the image processing unit 11412. When the technology according to the present disclosure is applied to the imaging unit 11402 and the image processing unit 11412, it is possible to obtain an image of a surgical site in which generation of a false color is suppressed while color reproduction is being improved. Therefore, the operator can surely check the surgical site.

Note that, herein, the endoscopic surgery system has been described as an example. However, the technology according to the present disclosure may also be applied to, for example, a microscope surgery system or the like.

5-2. Example of Application to Moving Object

Further, for example, the present technology may be realized as an apparatus mounted on any type of moving object such as an automobile, an electric vehicle, a hybrid electric vehicle, a motorcycle, a bicycle, a personal mobility, an airplane, a drone, a ship, or a robot.

Figure 38:
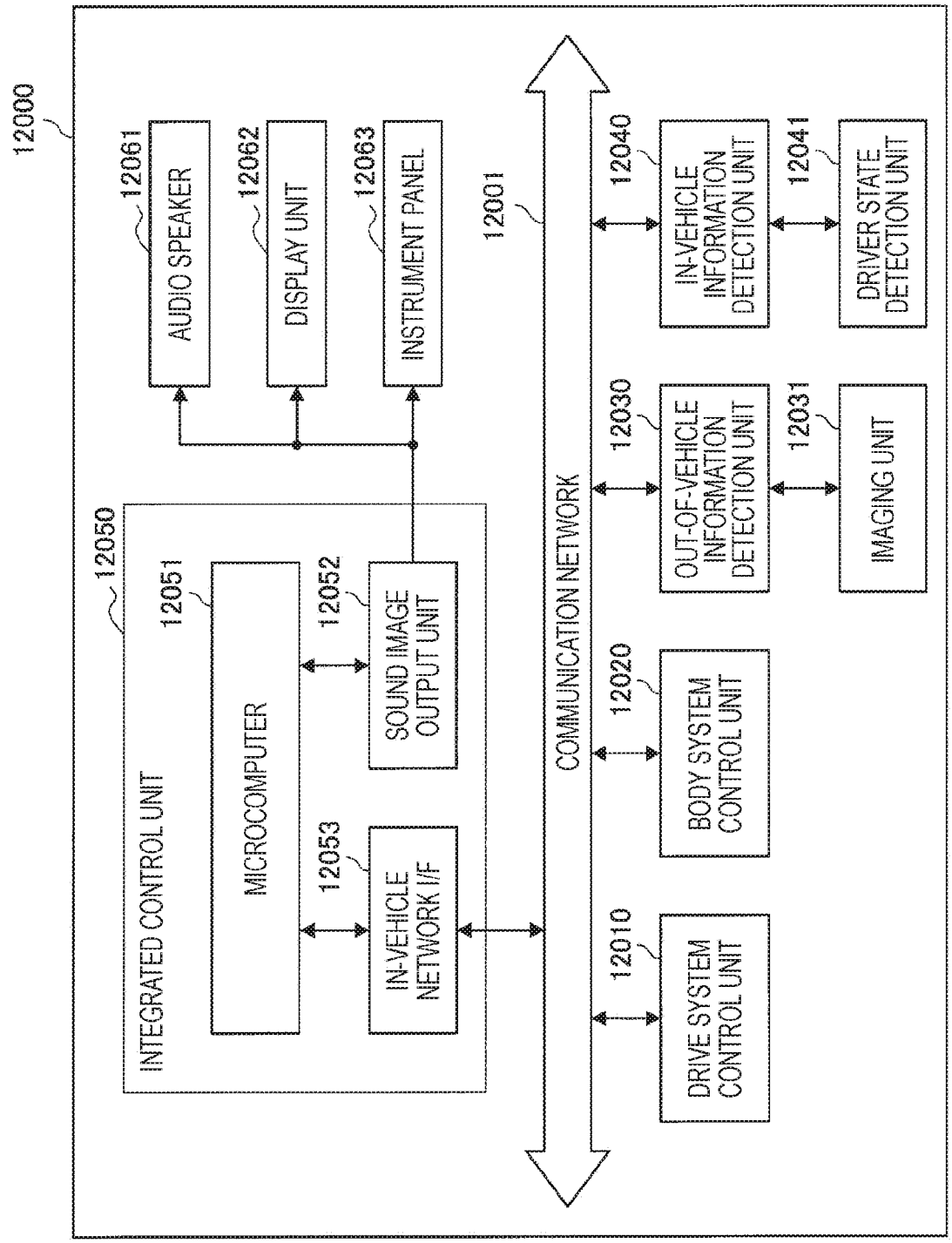
FIG. 38 is a block diagram showing an example of a schematic configuration of a vehicle control system.

FIG. 38 is a block diagram showing a schematic configuration example of a vehicle control system that is an example of a moving object control system to which the technology according to the present disclosure is applicable.

A vehicle control system 12000 includes a plurality of electronic control units connected via a communication network 12001. In the example shown in FIG. 38, the vehicle control system 12000 includes a drive system control unit 12010, a body system control unit 12020, an out-of-vehicle information detection unit 12030, an in-vehicle information detection unit 12040, and an integrated control unit 12050. Further, FIG. 38 shows a microcomputer 12051, a sound image output unit 12052, and an in-vehicle network interface (I/F) 12053 as functional configurations of the integrated control unit 12050.

The drive system control unit 12010 controls operation of devices related to a drive system of a vehicle in accordance with various programs. For example, the drive system control unit 12010 functions as a control device for a driving force generator for generating driving force of the vehicle, such as an internal combustion engine or a driving motor, a driving force transmission mechanism for transmitting the driving force to wheels, a steering mechanism for adjusting a steering angle of the vehicle, a braking device for generating braking force of the vehicle, and the like.

The body system control unit 12020 controls operation of various devices mounted on a vehicle body in accordance with various programs. For example, the body system control unit 12020 functions as a control device for a keyless entry system, a smart key system, a power window device, or various lamps such as a headlamp, a back lamp, a brake lamp, a blinker, and a fog lamp. In this case, the body system control unit 12020 can receive radio waves transmitted from a portable device substituted for a key or signals from various switches. The body system control unit 12020 accepts input of those radio waves or signals and controls a door lock device, the power window device, the lamps, and the like of the vehicle.

The out-of-vehicle information detection unit 12030 detects information regarding the outside of the vehicle on which the vehicle control system 12000 is mounted. For example, the out-of-vehicle information detection unit 12030 is connected to an imaging unit 12031. The out-of-vehicle information detection unit 12030 causes the imaging unit 12031 to image the outside of the vehicle and receives the captured image. The out-of-vehicle information detection unit 12030 may perform object detection processing or distance detection processing of a person, a vehicle, an obstacle, a sign, a character on a road surface, or the like on the basis of the received image.

The imaging unit 12031 is an optical sensor that receives light and outputs an electrical signal corresponding to an amount of the received light. The imaging unit 12031 can output the electrical signal as an image, or can also output the electrical signal as distance measurement information. Further, the light received by the imaging unit 12031 may be visible light or invisible light such as infrared rays.

The in-vehicle information detection unit 12040 detects information regarding the inside of the vehicle. For example, the in-vehicle information detection unit 12040 is connected to a driver state detection unit 12041 that detects a state of a driver. The driver state detection unit 12041 includes, for example, a camera that captures an image of the driver. The in-vehicle information detection unit 12040 may calculate a degree of fatigue or concentration of the driver or determine whether or not the driver falls asleep on the basis of the detection information input from the driver state detection unit 12041.

The microcomputer 12051 can calculate a control target value of the driving force generator, the steering mechanism, or the braking device on the basis of the information regarding the inside or outside of the vehicle acquired by the out-of-vehicle information detection unit 12030 or the in-vehicle information detection unit 12040, and output a control command to the drive system control unit 12010. For example, the microcomputer 12051 can perform cooperative control for the purpose of realizing functions of an advanced driver assistance system (ADAS) including collision avoidance or impact attenuation of vehicles, following traveling based on a following distance, vehicle speed maintenance traveling, vehicle collision warning, or vehicle lane departure warning.

Further, the microcomputer 12051 can perform cooperative control for the purpose of autonomous driving in which the vehicle autonomously travels without depending on the driver's operation or other purposes by controlling the driving force generator, the steering mechanism, the braking device, or the like on the basis of information regarding surroundings of the vehicle acquired by the out-of-vehicle information detection unit 12030 or the in-vehicle information detection unit 12040.

Further, the microcomputer 12051 can output a control command to the body system control unit 12020 on the basis of the information regarding the outside of the vehicle acquired by the out-of-vehicle information detection unit 12030. For example, the microcomputer 12051 can perform cooperative control for the purpose of glare protection by, for example, controlling the headlamp in accordance with a position of a preceding vehicle or oncoming vehicle detected by the out-of-vehicle information detection unit 12030 to switch a high beam to a low beam.

The sound image output unit 12052 transmits an output signal of at least one of sound or image to an output device capable of visually or aurally notifying a vehicle passenger or the outside of the vehicle of information. FIG. 38 shows an audio speaker 12061, a display unit 12062, and an instrument panel 12063 as examples of the output device. The display unit 12062 may include, for example, at least one of an on-board display or a head-up display.

Figure 39:
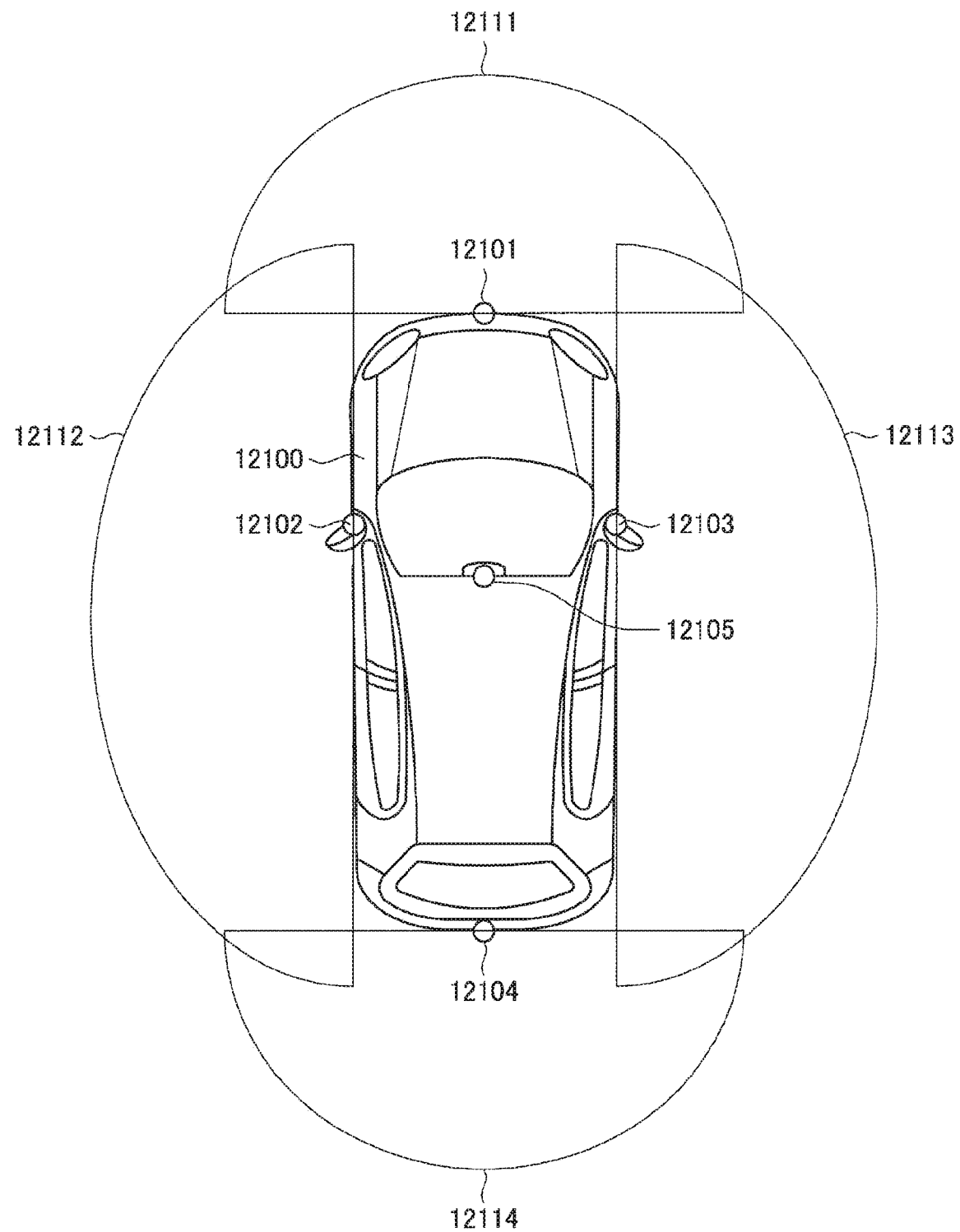
FIG. 39 is an explanatory diagram showing an example of installation positions of an out-of-vehicle information detection unit and an imaging unit.

FIG. 39 shows an example of an installation position of the imaging unit 12031.

In FIG. 39, the imaging unit 12031 includes imaging units 12101, 12102, 12103, 12104, and 12105.

The imaging units 12101, 12102, 12103, 12104, and 12105 are provided at, for example, positions such as a front nose, a side mirror, a rear bumper, a back door, and an upper portion of a windshield in a vehicle interior of the vehicle 12100. The imaging unit 12101 provided at the front nose and the imaging unit 12105 provided at the upper portion of the windshield in the vehicle interior mainly acquire images in front of the vehicle 12100. The imaging units 12102 and 12103 provided at the side mirrors mainly acquire images of sides of the vehicle 12100. The imaging unit 12104 provided at the rear bumper or back door mainly acquires an image behind the vehicle 12100. The imaging unit 12105 provided at the upper portion of the windshield in the vehicle interior is mainly used for detecting a preceding vehicle, a pedestrian, an obstacle, a traffic light, a traffic sign, a lane, or the like.

Note that FIG. 39 shows examples of imaging ranges of the imaging units 12101 to 12104. An imaging range 12111 indicates the imaging range of the imaging unit 12101 provided at the front nose. Imaging ranges 12112 and 12113 indicate the respective imaging ranges of the imaging units 12102 and 12103 provided at the side mirrors. An imaging range 12114 indicates the imaging range of the imaging unit 12104 provided at the rear bumper or back door. For example, an overhead image of the vehicle 12100 viewed from above is obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element including pixels for phase difference detection.

For example, the microcomputer 12051 obtains a distance from each three-dimensional object within the imaging ranges 12111 to 12114 and a temporal change in this distance (relative speed to the vehicle 12100) on the basis of distance information obtained from the imaging units 12101 to 12104 and can therefore particularly extracts, as a preceding vehicle, the closest three-dimensional object existing on a traveling path of the vehicle 12100 and travelling at a predetermined speed (e.g., 0 or more km/h) in substantially the same direction as that of the vehicle 12100. Further, the microcomputer 12051 can set a following distance from the preceding vehicle to be secured in advance and perform automatic brake control (including following stop control), automatic acceleration control (including following start control), and the like. Thus, it is possible to perform cooperative control for the purpose of autonomous driving in which the vehicle autonomously travels without depending on the driver's operation or other purposes.

For example, the microcomputer 12051 classifies three-dimensional object data regarding the three-dimensional objects into two-wheeled vehicles, standard vehicles, large vehicles, pedestrians, and other three-dimensional objects such as power poles, on the basis of the distance information obtained from the imaging units 12101 to 12104, and extracts the three-dimensional object data, and can therefore use the three-dimensional object data in order to automatically avoid obstacles. For example, the microcomputer 12051 identifies obstacles around the vehicle 12100 as obstacles that are noticeable for the driver of the vehicle 12100 and obstacles that are hardly noticeable therefor. In addition, the microcomputer 12051 determines a collision risk indicating a risk of collision with each obstacle, and, when the collision risk is equal to or larger than a set value, i.e., in a state in which collision may occur, the microcomputer 12051 can perform driving assistance for collision avoidance by outputting an alarm to the driver via the audio speaker 12061 or the display unit 12062 or by performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian exists in the captured images of the imaging units 12101 to 12104. Such recognition of the pedestrian is carried out by performing, for example, a procedure for extracting feature points in the captured images of the imaging units 12101 to 12104 serving as infrared cameras and a procedure for performing pattern matching processing on a sequence of feature points indicating an outline of an object and determining whether or not the object is a pedestrian. When the microcomputer 12051 determines that a pedestrian exists in the captured images of the imaging units 12101 to 12104 and recognizes the pedestrian, the sound image output unit 12052 controls the display unit 12062 so that a rectangular outline for emphasis is displayed to be superimposed on the recognized pedestrian. Further, the sound image output unit 12052 may control the display unit 12062 so that an icon or the like indicating the pedestrian is displayed at a desired position.

Hereinabove, an example of the vehicle control system to which the technology according to the present disclosure is applicable has been described. The technology according to the present disclosure is applicable to, for example, the out-of-vehicle information detection unit 12030, the imaging unit 12031, and among the configurations described above. Specifically, for example, the imaging element 12 in FIG. 4 is applicable to the imaging unit 12031, and the signal processing unit 14 is applicable to the outside-of-vehicle information detection unit 12030. By applying the technology according to the present disclosure to the out-of-vehicle information detection unit 12030 and the imaging unit 12031, it is possible to obtain an image of the outside of the vehicle in which generation of a false color is suppressed while color reproduction is being further improved. This makes it possible to achieve improvement in safety in autonomous driving and the like.

5-3. Other Application Examples

Furthermore, the present technology is applicable to various cases where light such as visible light, infrared light, ultraviolet light, and X rays is sensed as described below.

- Devices for capturing images for viewing, such as digital cameras and mobile devices having a camera function
- Devices used for traffic, such as in-vehicle sensors for imaging the front, back, surroundings, inside, and the like of an automobile in order to perform safe driving such as automatic stop, recognition of a state of a driver, and the like, surveillance cameras for monitoring running vehicles and roads, and distance measurement sensors for measuring a distance between vehicles
- Devices used in home appliances such as TVs, refrigerators, and air conditioners, for imaging gestures of a user and performing device operation in accordance with the gestures
- Devices used for medical and health care, such as endoscopes and devices for imaging blood vessels by receiving infrared light
- Devices used for security, such as surveillance cameras for crime prevention and cameras for person authentication
- Devices used for beauty, such as a skin measuring instrument for imaging skin and a microscope for imaging scalps
- Devices used for sports, such as action cameras and wearable cameras for sports applications
- Devices used for agriculture, such as cameras for monitoring conditions of fields and crops A wavelength band of light detected by each pixel 51 of the imaging apparatus 10 (hereinafter, referred to as detection band) can be adjusted by adjusting the transmission band of the narrowband filter NB of each pixel 51 of the imaging apparatus 10 in FIG. 4. In addition, the imaging apparatus 10 can be used for various purposes by appropriately setting the detection band of each pixel 51.

For example, the imaging apparatus 10 can be used for detecting taste and freshness of food, detecting sugar content and moisture of fruits, and detecting poly ethylene terephthalate (PET) to separate plastics. Further, for example, the present technology is applicable to freshness management of cut flowers. Furthermore, for example, the present technology is applicable to inspection of foreign substances mixed in food. Still further, for example, the present technology is applicable to detection of a normalized difference vegetation index (NDVI) that is an index of vegetation. Further, for example, the present technology is applicable to human detection on the basis of one of a spectral shape having wavelengths around 580 nm derived from hemoglobin of human skin and a spectral shape having wavelengths around 960 nm derived from melanin pigment contained in human skin, or both of them. Furthermore, for example, the present technology is applicable to biometric detection (biometric authentication), user interface, prevention and monitoring of forgery of signatures or the like, and the like.

Note that the above description provides an example where both a multispectral image and an RGB image are generated. However, the imaging apparatus 10 does not necessarily need to generate an RGB image in the application examples of the present technology described above, and may realize the above application examples by using a multispectral image.

Further, the multispectral image and the RGB image may be displayed on different displays (output units), respectively. Note that, in a case where a multispectral image is displayed, for example, the multispectral image may be displayed as separate images for individual colors of the multispectral image, or may be displayed as an RGB image in which three colors extracted from the colors of the multispectral image are allocated to R, G, and B, respectively.

Further, a characteristic region may be detected by using a multispectral image to perform image processing such as enlarging or highlighting display of the RGB image in accordance with a result of the detection. Such a detection may be, for example, the detection of human skin described above.

6. HARDWARE CONFIGURATION EXAMPLE

Hereinabove, the embodiment of the present disclosure has been described. Note that the present technology is applicable to a non-stacked solid-state imaging apparatus or a stacked solid-state imaging apparatus.

In a case where the present technology is applied to a non-stacked solid-state imaging apparatus, for example, not only a pixel area in which pixels are arranged in an array but also a control circuit for performing control of driving of the pixels and other various kinds of control and a logic circuit for performing signal processing can be mounted on a single die. In addition, the logic circuit may have the function of the signal processing unit 14 described above, and the control circuit may have the function of the control unit 16.

Further, in a case where the present technology is applied to a stacked solid-state imaging apparatus, the stacked solid-state imaging apparatus may be configured as a single semiconductor chip by stacking two dies, i.e., a sensor die and a logic die, to electrically connect the two dies. For example, the pixel area and the control circuit having the function of the control unit 16 may be mounted on the sensor die, and the logic circuit having the function of the signal processing unit 14 may be mounted on the logic die. Alternatively, for example, the pixel area may be mounted on the sensor die, and the logic circuit having the function of the signal processing unit 14 and the control circuit having the function of the control unit 16 may be mounted on the logic die.

Further, the above description provides an example where the present technology is applied to a solid-state imaging apparatus (an example of the image processing apparatus). However, the present technology is not limited to such an example. For example, a mosaic image acquired by the imaging apparatus including the imaging element described above may be transmitted to another image processing apparatus and be subjected to the above-described demosaic processing, linear matrix processing, and combination processing in a signal processing unit of the image processing apparatus. For example, in a case where an imaging apparatus mounted on a moving object such as a drone includes the above-described imaging element, it is considered that a power source of the moving object may be limited, and an output unit (display) may exist in a place other than the moving object. Therefore, a mosaic image acquired by the imaging apparatus mounted on the moving object may be transmitted to the image processing apparatus, and the image processing apparatus that has received the mosaic image may perform the above-described demosaic processing, linear matrix processing, combination processing, and the like. Note that the image processing apparatus may be an apparatus that the user has in hand, or may be an apparatus that the user does not have in hand, such as a cloud.

Further, all of the above-described demosaic processing, linear matrix processing, and combination processing do not need to be performed by a single device. For example, an image generated by applying at least a part of a series of the above-described processing may be transmitted to another device and be subjected to the remaining processing in the another device.

Figure 40:
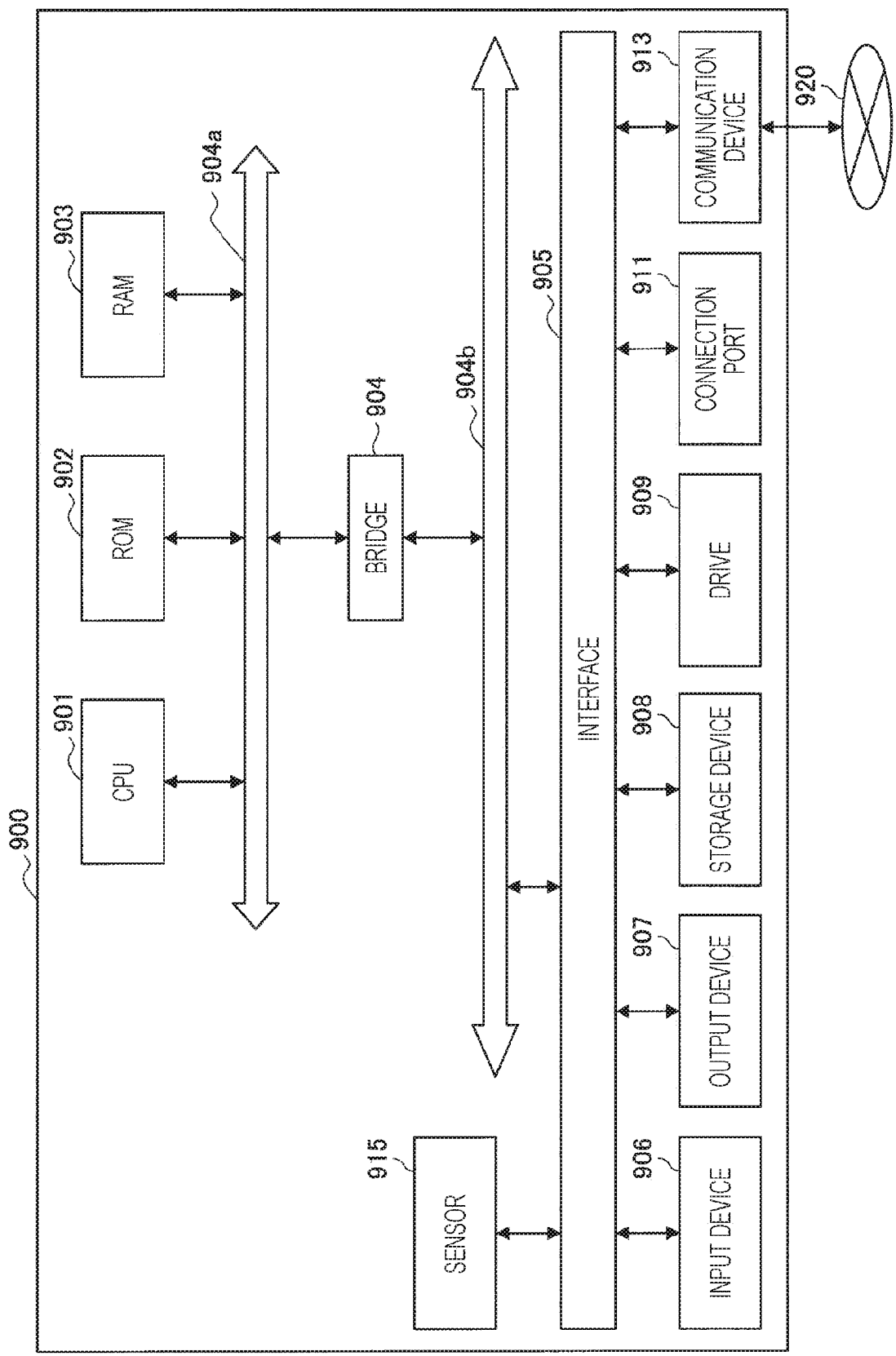
FIG. 40 is an explanatory diagram showing a hardware configuration example.

Further, the processing performed by the signal processing unit 14, such as the above-described demosaic processing, linear matrix processing, and combination processing, can be realized by hardware, or can be realized by cooperation between software and hardware. FIG. 40 is a block diagram showing a hardware configuration example of an information processing apparatus 900 that is an example of the image processing apparatus according to the embodiment of the present disclosure obtained in a case where the above-described processing is realized by cooperation between software and hardware. The information processing such as the above-described demosaic processing, linear matrix processing, and combination processing can be realized by cooperation between software and hardware included in the information processing apparatus 900 described below.

As shown in FIG. 40, the information processing apparatus 900 includes a central processing unit (CPU) 901, a read only memory (ROM) 902, a random access memory (RAM) 903, and a host bus 904a. Further, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC in place of or in addition to the CPU 901.

The CPU 901 functions as an arithmetic processing unit and a control device, and controls the overall operation in the information processing apparatus 900 in accordance with various programs. Further, the CPU 901 may be a microprocessor. The ROM 902 stores programs, calculation parameters, and the like used by the CPU 901. The RAM 903 temporarily stores programs used in execution of the CPU 901, parameters that appropriately change during the execution, and the like. The CPU 901 may form, for example, the signal processing unit 14.

The CPU 901, the ROM 902, and the RAM 903 are connected to each other by the host bus 904a including a CPU bus and the like. The host bus 904a is connected to the external bus 904b such as a peripheral component interconnect/interface (PCI) bus via the bridge 904. Note that the host bus 904a, the bridge 904, and the external bus 904b are not necessarily configured separately, and a single bus may have those functions.

The input device 906 is realized by a device to which the user inputs information, such as a mouse, a keyboard, a touchscreen, a button, a microphone, a switch, and a lever. Further, the input device 906 may be, for example, a remote control device using infrared rays or other radio waves, or may be an external connection device in response to operation of the information processing apparatus 900, such as a mobile phone or a PDA. Furthermore, the input device 906 may include, for example, an input control circuit that generates an input signal on the basis of information input by the user by using the above input means and outputs the input signal to the CPU 901, and the like. By operating the input device 906, the user of the information processing apparatus 900 can input various kinds of data to the information processing apparatus 900 and instruct the information processing apparatus 900 to perform processing operation.

The output device 907 includes a device capable of visually or aurally notifying the user of acquired information. Examples of such a device encompass display devices such as a CRT display, a liquid crystal display, a plasma display, an EL display, and a lamp, sound output devices such as a speaker and headphones, and printer devices. The output device 907 outputs, for example, results of various kinds of processing performed by the information processing apparatus 900. Specifically, the display device visually displays the results of the various kinds of processing performed by the information processing apparatus 900 in various formats such as text, images, tables, and graphs. Meanwhile, the sound output device converts audio signals including reproduced sound data, acoustic data, and the like into analog signals and aurally outputs the analog signals.

The storage device 908 is a data storage device provided as an example of a storage unit of the information processing apparatus 900. The storage device 908 is realized by, for example, a magnetic storage unit device such as an HDD, a semiconductor storage device, an optical storage device, a magneto-optical storage device, or the like. The storage device 908 may include a storage medium, a recording device that records data on the storage medium, a reading device that reads data from the storage medium, a deletion device that deletes data recorded on the storage medium, and the like. The storage device 908 stores programs and various kinds of data executed by the CPU 901, various kinds of data acquired from the outside, and the like.

The drive 909 is a storage medium reader/writer, and is included in or externally attached to the information processing apparatus 900. The drive 909 reads information recorded on a removable storage medium such as an attached magnetic disk, an optical disk, a magneto-optical disk, or a semiconductor memory, and outputs the information to the RAM 903. Further, the drive 909 can also write information into the removable storage medium.

The connection port 911 is an interface connected to an external device, and is, for example, a connection port with an external device to which data can be transmitted by a universal serial bus (USB) or the like.

The communication device 913 is a communication interface including, for example, a communication device to be connected to the network 920, and the like. The communication device 913 is, for example, a communication card for a wired or wireless local area network (LAN), long term evolution (LTE), Bluetooth (registered trademark), or wireless USB (WUSB), or the like. Further, the communication device 913 may be an optical communication router, an asymmetric digital subscriber line (ADSL) router, various communication modems, or the like. The communication device 913 can transmit/receive signals and the like to/from, for example, the Internet and other communication devices in accordance with a predetermined protocol such as TCP/IP.

The sensor 915 includes various sensors such as an acceleration sensor, a gyro sensor, a geomagnetic sensor, an optical sensor, a sound sensor, a distance measurement sensor, and a force sensor. The sensor 915 acquires information regarding a state of the information processing apparatus 900 itself, such as a posture and moving speed of the information processing apparatus 900, and information regarding a surrounding environment of the information processing apparatus 900, such as luminance and noise around the information processing apparatus 900. Further, the sensor 915 may also include a GPS sensor that receives GPS signals to measure latitude, longitude, and altitude of the device.

Note that the network 920 is a wired or wireless transmission path for information transmitted from a device connected to the network 920. For example, the network 920 may include public networks such as the Internet, a telephone network, and a satellite communication network, various local area networks (LANs) including Ethernet (registered trademark), wide area networks (WANs), and the like. Further, the network 920 may include a dedicated network such as the Internet protocol-virtual private network (IP-VPN).

Hereinabove, there has been described the hardware configuration example capable of realizing the functions of the information processing apparatus 900 according to the embodiment of the present disclosure. Each of the above components may be realized by using general-purpose members, or may be realized by hardware specialized for the function of each component. Therefore, it is possible to appropriately change the hardware configuration to be used in accordance with a technological level at the time of implementing the embodiment of the present disclosure.

Note that a computer program for realizing each function of the information processing apparatus 900 according to the embodiment of the present disclosure as described above can be created and be mounted on a PC or the like. Further, a computer-readable recording medium storing such a computer program can be provided. The recording medium is, for example, a magnetic disk, an optical disk, a magneto-optical disk, a flash memory, or the like. Further, the above computer program may be distributed via, for example, a network, without using a recording medium.

7. CONCLUSION

As described above, according to the embodiment of the present disclosure, it is possible to suppress generation of a false color while improving color reproduction.

Hereinabove, the preferred embodiment of the present disclosure has been described in detail with reference to the accompanying drawings. However, the technical scope of the present disclosure is not limited to such examples. It is obvious that a person having ordinary knowledge in the technical field of the present disclosure may find various changes or modifications within the scope of the technical idea described in the claims. As a matter of course, it is understood that those changes and modifications also belong to the technical scope of the present disclosure.

Further, the effects described in this specification are merely illustrative or exemplary and are not limited. In other words, the technology according to the present disclosure can have other effects that are apparent to those skilled in the art from the description of this specification in addition to or instead of the above effects.

Note that the following configurations also belong to the technical scope of the present disclosure.

(1)

An image processing apparatus including a demosaic processing unit configured to apply demosaic processing to a mosaic image having a first number of colors to generate a multispectral image having a second number of colors equal to or more than three but less than the first number of colors.

(2)

The image processing apparatus according to (1) described above, in which the demosaic processing applied to the mosaic image by the demosaic processing unit includes processing of calculating a local average value in each pixel of the mosaic image for each color and interpolating a pixel value in each pixel by using the local average value.

(3)

The image processing apparatus according to (2) described above, in which the local average value is calculated for each color obtained by averaging a plurality of colors included in the first number of colors so as to correspond to the second number of colors.

(4)

The image processing apparatus according to (3) described above, in which a correlation of spectral sensitivity between the plurality of colors is higher than a correlation of spectral sensitivity between other colors included in the first number of colors.

(5)

The image processing apparatus according to (3) or (4) described above, in which the demosaic processing unit generates the multispectral image on the basis of a luminance signal generated on the basis of the mosaic image.

(6)

The image processing apparatus according to (5) described above, in which the demosaic processing unit calculates the local average value for each color on the basis of the luminance signal.

(7)

The image processing apparatus according to (6) described above, in which the demosaic processing unit calculates the local average value on the basis of edge information obtained by edge detection using the luminance signal.

(8)

The image processing apparatus according to any one of (1) to (7) described above, in which the demosaic processing unit applies the demosaic processing to the mosaic image having the first number of colors to further generate a multispectral image having the first number of colors.

(9)

The image processing apparatus according to (8) described above, further including a linear matrix processing unit configured to apply linear matrix processing to each of the multispectral image having the first number of colors and the multispectral image having the second number of colors to generate a first image having a third number of colors less than the second number of colors and a second image having the third number of colors.

(10)

The image processing apparatus according to (9) described above, further including a combination processing unit configured to perform combination processing of the first image and the second image.

(11)

The image processing apparatus according to (10) described above, in which the combination processing performed by the combination processing unit includes blend processing of blending the first image and the second image in accordance with a blend coefficient.

(12)

The image processing apparatus according to (11) described above, in which the combination processing unit determines the blend coefficient on the basis of a saturation of the first image and a saturation of the second image.

(13)

The image processing apparatus according to (11) or (12) described above, in which the combination processing unit performs the combination processing on the basis of a luminance signal generated on the basis of the mosaic image.

(14)

The image processing apparatus according to (13) described above, in which the combination processing unit determines the blend coefficient on a basis of edge information obtained by edge detection using the luminance signal.

(15)

The image processing apparatus according to any one of (5) to 7, 13, and 14 described above, in which the luminance signal is generated by applying a predetermined filter to the mosaic image.

(16)

The image processing apparatus according to (15) described above, in which the predetermined filter is a box filter of 2×2 pixels.

(17)

An image processing method including, by a processor, applying demosaic processing to a mosaic image having a first number of colors to generate a multispectral image having a second number of colors equal to or more than three but less than the first number of colors.

(18)

An imaging apparatus including:

an imaging unit including a color filter in which one of a plurality of kinds of filters having different spectral characteristics is allocated to each pixel position and configured to acquire a mosaic image having a first number of colors that is the same as the number of kinds of the filters; and a demosaic processing unit configured to apply demosaic processing to the mosaic image to generate a multispectral image having a second number of colors equal to or more than three but less than the first number of colors.

REFERENCE SIGNS LIST

10 Imaging apparatus
11 Optical system
12 Imaging element
13 Memory
14 Signal processing unit
15 Output unit
16 Control unit
51 Pixel
71, 141 Luminance generation unit
103 Narrowband filter layer
107 Color filter layer
121, 151 Plasmon filter
142, 144 First demosaic processing unit
143, 145 Second demosaic processing unit
146 First linear matrix processing unit
147 Second linear matrix processing unit
148, 149 Combination processing unit

The invention claimed is:

1. An image processing apparatus, comprising:
a demosaic processing unit configured to:
process, based on demosaic processing, a mosaic image having a first number of colors;
generate a first multispectral image based on the processed mosaic image, wherein the first multispectral image has the first number of colors;
generate a second multispectral image based on the processed mosaic image, wherein the second multispectral image has a second number of colors equal to or more than three but less than the first number of colors; and
generate a luminance signal based on application of a specific filter to the mosaic image;
a linear matrix processing unit configured to apply linear matrix processing to each of the first multispectral image and the second multispectral image to generate a first image and a second image, wherein the first image has a third number of colors less than the second number of colors and the second image has the third number of colors; and
a combination processing unit configured to combine the first image and the second image based on the luminance signal.

2. The image processing apparatus according to claim 1, wherein the demosaic processing unit is further configured to:
calculate a local average value in each pixel of the mosaic image for each color of the mosaic image; and
interpolate a pixel value in each pixel based on the local average value.

3. The image processing apparatus according to claim 2, wherein the demosaic processing unit is further configured to calculate the local average value for each color of the mosaic image based on average of a plurality of colors in the first number of colors so as to reduce the first number of colors to the second number of colors.

4. The image processing apparatus according to claim 3, wherein a correlation of spectral sensitivity between the plurality of colors is higher than a correlation of spectral sensitivity between other colors included in the first number of colors.

5. The image processing apparatus according to claim 3, wherein the demosaic processing unit is further configured to generate the first multispectral image and the second multispectral image based on the luminance signal the mosaic image.

6. The image processing apparatus according to claim 5, wherein the demosaic processing unit is further configured to calculate the local average value for each color of the mosaic image based on the luminance signal.

7. The image processing apparatus according to claim 6, wherein the demosaic processing unit is further configured to:
obtain edge information based on edge detection of the luminance signal; and
calculate the local average value based on the edge information.

8. The image processing apparatus according to claim 1, wherein the combination processing unit is further configured to blend the first image and the second image based on a blend coefficient.

9. The image processing apparatus according to claim 8, wherein the combination processing unit is further configured to determine the blend coefficient based on a saturation of the first image and a saturation of the second image.

10. The image processing apparatus according to claim 1, wherein
the demosaic processing unit is further configured to obtain edge information based on edge detection of the luminance signal, and
the combination processing unit is further configured to determine a blend coefficient based on the edge information.

11. The image processing apparatus according to claim 1, wherein the specific filter is a box filter of 2×2 pixels.

12. An image processing method, comprising:
- processing, by demosaic processing, a mosaic image having a first number of colors;
- generating a first multispectral image based on the processed mosaic image, wherein the first multispectral image has the first number of color;
- generating a second multispectral image based on the processed mosaic image, wherein the second multispectral image has a second number of colors equal to or more than three but less than the first number of colors;
- generating a luminance signal based on application of a specific filter to the mosaic image;
- applying linear matrix processing to each of the first multispectral image and the second multispectral image to generate a first image and a second image, wherein the first image has a third number of colors less than the second number of colors and the second image has the third number of colors; and
- combining the first image and the second image based on the luminance signal.

13. An imaging apparatus, comprising:
- an imaging unit includes a color filter in which one of a plurality of kinds of filters has different spectral characteristics, wherein
- the color filter is allocated to each pixel position, and
- the imaging unit is configured to acquire a mosaic image having a first number of colors that is same as a number of kinds of the filters; and
- a demosaic processing unit configured to:
  - process, based on demosaic processing, a mosaic image having the first number of colors,
  - generate a first multispectral image based on the processed mosaic image, wherein the first multispectral image has the first number of colors, and
  - generate a second multispectral image based on the processed mosaic image, wherein the second multispectral image has a second number of colors equal to or more than three but less than the first number of colors;
- generate a luminance signal based on application of a specific filter to the mosaic image;
- a linear matrix processing unit configured to apply linear matrix processing to each of the first multispectral image and the second multispectral image to generate a first image and a second image, wherein the first image has a third number of colors less than the second number of colors and the second image has the third number of colors; and
- a combination processing unit configured to combine the first image and the second image based on the luminance signal.

* * * * *